United States Patent [19]
Woest et al.

[11] Patent Number: 5,243,595
[45] Date of Patent: Sep. 7, 1993

[54] COMBINED CONNECTIONLESS AND CONNECTION-ORIENTED NETWORK CONTROL SYSTEM

[75] Inventors: Karen L. Woest; James K. Stark, both of Wauwatosa; David E. Rasmussen, Wales, all of Wis.

[73] Assignee: Johnson Service Company, Milwaukee, Wis.

[21] Appl. No.: 696,635

[22] Filed: May 7, 1991

Related U.S. Application Data
[62] Division of Ser. No. 472,647, Jan. 30, 1990.

[51] Int. Cl.⁵ .............................................. H04J 3/02
[52] U.S. Cl. ................................. 370/85.13; 370/94.1
[58] Field of Search ...................... 370/85.13, 60, 94.1, 370/100.1, 85.15, 16, 105.1, 105.4, 105.5, 106, 108; 340/825.05, 825.5, 825.8; 375/114, 116

[56] References Cited

U.S. PATENT DOCUMENTS

| | | | |
|---|---|---|---|
| 4,471,466 | 9/1984 | Stollberger | 370/100.1 |
| 4,596,012 | 6/1986 | Reed | 370/16 |
| 4,700,184 | 10/1987 | Noirel et al. | 370/94.1 |
| 4,725,834 | 2/1988 | Chang et al. | 340/825.5 |
| 4,845,706 | 7/1989 | Franaszek | 370/62 |
| 4,897,841 | 1/1990 | Gang, Jr. | 370/85.15 |
| 4,929,939 | 5/1990 | Varoni et al. | 340/825.8 |
| 4,942,571 | 7/1990 | Moller et al. | 370/85.13 |
| 5,014,265 | 5/1991 | Hahne et al. | 370/60 |
| 5,088,091 | 2/1992 | Schroeder et al. | 370/85.13 |

FOREIGN PATENT DOCUMENTS
0315158 11/1989 European Pat. Off. .
PCT/US82/-00865 6/1992 PCT Int'l Appl. .

OTHER PUBLICATIONS
Stallings, Is There an OSI Session Protocol in Your Future, *Data Communications*, 12:147–159 (1987).
Baratz et al., Reliable Link Initialization Procedures, *IEEE Transactions on Communications*, 2:144–152 (1988).
Piscitello et al., Internetworking in an OSI Environment, *Data Communications*, No. 5 (1986).
Albanese et al., An Architecture for Transparent Man-/LAN Gateways, *IEEE*, 1255–1259 (1986).
Melendez et al., The Upper Layers of the ISO/OSI Reference Model (Part II), *Computer Standards & Interfaces*, 2:65–77 (1986).

*Primary Examiner*—Douglas W. Olms
*Assistant Examiner*—Dang Ton
*Attorney, Agent, or Firm*—Foley & Lardner

[57] ABSTRACT

A network control system controls the receipt and transmission of messages at one node of a communication network which includes a plurality of nodes coupled together on a bi-directional bus. Both short messages having a length less than a predetermined number of bytes and long messages having a length greater than the predetermined number of bytes may be conveyed between nodes. The network control system incudes a connectionless network control portion for controlling the receipt and transmission of the short messages and a connection-oriented network control portion for controlling the receipt and transmission of the long messages including establishing a connection between its node and another node before a long message is transmitted.

31 Claims, 48 Drawing Sheets

COMBINED CONNECTIONLESS AND CONNECTION-ORIENTED NETWORK CONTROL SYSTEM

This is division, of application Ser. No. 07/472,647, filed Jan. 30, 1990.

BACKGROUND OF THE INVENTION

The present invention is directed to an improved network control system and method for use in a communication network of the type including a plurality of nodes coupled to a bi-directional bus. The network control system and method is arranged to control the receipt and transmission of messages and provide control and supervisory functions at one of the network nodes. In a preferred network, each node is associated with a network control system of the present invention which correspondingly implements the method of the present invention.

Communication networks find application in virtually every environment wherein information is conveyed from one point to another. There are essentially two types of communication networks, connection-oriented networks, connectionless networks. In connection-oriented networks, a connection is established between like protocol stages of the network from the originating point of a message to the destination point of the message. A telecommunications network is one example of a connection-oriented network. A connectionless network, in contrast, is a network wherein there is no prior coordination between any of the like protocol stages from the origination point of a message to the destination point of the message. In addition, in a connectionless network, each message is transmitted independently of the previously or subsequently transmitted messages.

Connection-oriented networks are best suited for applications wherein a large amount of information is conveyed at any one time and wherein there are minimal time constraints on the system. This is due to the fact that the establishment of each connection between like protocol stages of the network requires considerable connection reliability and the establishment of all the required connections across the network consumes considerable time. Hence, a large amount of overhead is required in connection-oriented networks for conveying a message from one point to another. This is justified when a large amount of information is conveyed at any one time.

While there are many applications for communication networks, such networks have not been utilized in the field of controls, and more particularly, in facility management systems. Such systems are employed in office buildings, manufacturing facilities, and the like, for controlling the internal environment of the facility and/or for monitoring security systems such as fire and burglar alarms. These systems, have been arranged in master-slave configuration for acting, on a real-time basis, on security system alarms and controlling field devices such as heaters, dampers, fans and the like. Hence, these systems have not required communication networks to provide their required function.

A new and improved facility management system has been recently developed which has taken a clear departure from the master-slave configurations of the past. This new system is distributed in configuration, but still must function on a real-time basis. This requires short messages to be conveyed within the system and under certain time constraint. Because this system is distributed in configuration, it requires a communication network unlike prior master-slave systems.

Although traditional connection-oriented networks are more common, they are not well-suited for such an application. Because this system is a distributed system, many connections would have to be established to convey a message from one point of the system to another point in the system. Since the messages within this facility management system are generally short, due to the required real-time operation, the overhead associated with establishing the required connections would not be justified.

There is, therefore, a need in the art for a connectionless network control system which is distributed in its architecture to correspond to the distributed configuration of a control system, such as a facility management system. The present invention provides such a network control system and method which is distributed in architecture and which provides high reliability. The present invention further provides such a network control system which includes a connection-oriented network control portion for use in controlling the transmission and receipt of messages containing a large amount of information between one point in the network and another.

It is therefore a general object of the present invention to provide a connectionless network control system and method for use in a communication network.

It is a further object of the present invention to provide a connectionless network control system and method for use in a communication network which exhibits high reliability.

It is a further object of the present invention to provide such a connectionless network control system and method which may be utilized in a facility management system.

It is a still further object of the present invention to provide a network control system which includes a connectionless network control portion for controlling the receipt and transmission of short messages combined with a connection-oriented network control portion for controlling the transmission and receipt of long messages.

SUMMARY OF THE INVENTION

The invention therefore provides a network control system for use in a communication network of the type including a first plurality of nodes coupled to a first link of a bi-directional bus for controlling the transmission and reception of messages at one node of the first plurality of nodes, wherein the network control system is coupled between a plurality of application modules and the first link of the bi-directional bus, and wherein each application module has a unique address and at least some of the application modules are arranged to originate a message and to provide therewith the address for which the originated messages is destined. The network control system includes a transport stage coupled to each of the application modules for conveying messages received at the one node and destined for the application modules at the one node to the application modules and receiving messages originating at the one node by the application modules. The network control system further includes a network stage coupled to the transport stage for conveying the messages received at the one node and destined for the application modules at the one node to the transport stage and for receiving from the transport stage messages originated by the application modules at the one node. The network stage is responsive to the destination addresses of the messages to be transmitted from the one node for establishing the routing of the messages to be transmitted from the one node. The network control system further includes a data link stage coupled between the network stage and the first link of the bus for conveying messages received at the one node to the network stage and for receiving from the network stage messages to be transmitted from the one node on the first link of the bus.

The present invention further provides such a control system wherein the network includes a second link of the bi-directional bus, a bridging node coupling the first link to the second link, and a second plurality of nodes coupled to the second link and wherein the transport stage includes confirmation means for confirming receipt of messages between the one node and any one of the second plurality of nodes.

The present invention further provides such a network control system wherein the network is arranged for synchronous transmission and reception of messages between the nodes and wherein the data link stage includes reset means for resynchronizing the one node with any one of the other nodes when the one node is not in synchronism with any one of the other nodes.

The present invention still further provides such a network control system wherein the data link stage includes limiting means for limiting the number of received messages that the one node can process at any one time.

The present invention still further provides such a network control system wherein the data link stage includes suspend means responsive to a suspend request message for suspending the one node to preclude the one node from transmitting messages onto the bus.

The present invention further provides such a network control system wherein the network is capable of carrying messages having a length of up to a predetermined number of bytes and wherein the system further includes a connection-oriented session stage coupled between the application modules and the transport stage of the one node for providing a session service including dividing a long message having a length greater than the predetermined number of bytes into message parts having lengths less than a predetermined number of bytes and for conveying the message parts in sequence to the transport stage.

The present invention further provides a method for use in a communication network of the type including a first plurality of nodes coupled to a first link of a bi-directional bus for controlling the transmission and reception of messages at one node of the first plurality of nodes, wherein the one node is associated with a plurality of application modules, wherein each application module has a unique address, and wherein at least some of the application modules are arranged to originate a message and to provide therewith the address for which the originated messages are destined. The method includes the steps of providing a transport stage and coupling the transport stage to the application modules, conveying messages received at the one node and destined for the application modules at the one node through the transport stage to the application modules and conveying messages originated at the one node by the application modules to the transport stage, providing a network stage and coupling the network stage to the transport stage, and conveying the messages received at the one node and destined for the application modules at the one node from the network stage to the transport stage and conveying to the network stage from the transport stage messages originated by the application modules at the one node. The method further includes the steps of establishing at the network stage the routing of the messages to be transmitted from the one node responsive to the destination addresses of the messages to be transmitted from the one node, providing a data link stage and coupling the data link stage between the network stage and the first link of the bus, and conveying messages received from the first link for the one node through the data link stage to the network stage and conveying from the network stage to the data link stage messages to be transmitted from the one node. The method further includes transmitting from the data link stage onto the first link of the bus the messages to be transmitted from the one node.

The present invention further provides such a method, wherein the network includes a second link of the bi-directional bus, a bridging node coupling the first link to the second link, and a second plurality of nodes coupled to the second link, which includes the further step of confirming at the transport stage the receipt of messages between the one node and any one of the second plurality of nodes.

The present invention still further provides such a method wherein the network is arranged for synchronous transmission and reception of messages between the nodes, which includes the further step of resynchronizing at the data link stage, the one node with any one of the other nodes.

The present invention still further provides a method which includes the further step of limiting at the data link stage the number of received messages that the one node can process at any one time.

The present invention still further provides a method which includes the further step of suspending the one node at the data link stage to preclude the one node from transmitting messages onto the bus responsive to a suspend request message.

The present invention still further provides such a method, wherein the network is capable of conveying messages having a length up to a predetermined number of bytes which includes the further steps of providing the one node with a session stage coupled between the application modules and the transport stage and providing a session service at the session stage including dividing a long message having a length greater than the predetermined number of bytes into message parts having lengths less than the predetermined number of bytes and conveying the message parts in sequence to the transport stage.

The present invention also provides a network control system for use in a communication network for controlling the receipt and transmission of messages between at least a pair of nodes of the network, wherein the messages include short messages having a length less than a predetermined number of bytes and long messages having a length greater than the predetermined number of bytes and wherein the network control system is located at least at one of the nodes. The network control system includes a connectionless network control portion for controlling the receipt and transmission of the short messages and a connection-oriented network control portion coupled to the connectionless network control portion for establishing a connection with the other node for controlling the transmission and receipt of the long messages between the pair of nodes.

The present invention further provides a data link stage for use in a network control system of one node of a connectionless communication network, wherein the communication network is of the type including a plurality of synchronized nodes distributed on a bi-directional bus, and wherein each node is arranged to acknowledge receipt of received messages. The data link stage includes means for causing a message to be sent from the one node to another one of the nodes to be transmitted onto the bus, means for causing the message to be retransmitted onto the bus in the absence of a received acknowledgement from the another node, and means for resynchronizing the one node with the another node after the message is retransmitted a given number of times.

The invention further provides a data link stage for use in a network control system of one node of a connectionless communication network, wherein the communication network is of the type including a plurality of nodes distributed on a bi-directional bus for conveying messages between the nodes, and wherein the network control system includes storage means. The data link stage includes means for storing messages received at the one node in the storage means and limiting means for limiting the number of messages that the one node can process responsive to the number of messages stored in the storage means reaching a maximum number of stored messages.

The invention still further provides a data link stage for use in a network control system of one node of a connectionless communication network, the communication network being of the type including a plurality of nodes distributed on a bi-directional bus for conveying messages between the nodes, and wherein the network control system includes storage means for storing messages to be transmitted onto the bus. The data link stage includes suspend means responsive to a suspend request message for suspending the one node to preclude the one node from transmitting messages onto the bus and clearing means for clearing from the storage means the stored messages to be transmitted onto the bus responsive to the suspension of the one node.

The present invention still further provides a session handling system for use in a communication network including a plurality of nodes distributed on a bi-directional bus for conveying messages between the nodes, wherein the messages on the bus are limited to a given length, and wherein the session system provides a session service including dividing long messages greater in length than the given length into message parts having a length less than the given length for transmission on the bus. The session system includes a session stage at least at a pair of the nodes, each session stage being arranged for initiating a session connection with the other session stage for transmitting a plurality of message parts from its node to the other session stage of the other node. Each session stage includes means for determining which of the pair of nodes is a priority node in response to each session stage simultaneously initiating a session connection with the other session stage to thereby permit completion of the session by the priority node first, and each session stage further including session connection maintaining means for enabling the completion of the non-priority node session immediately after the completion of the priority node session and before the session connection is terminated.

The present invention further provides a network control system, for use in a communication network including a plurality of nodes distributed on a bi-directional bus, for controlling the reception and transmission of messages at one node of the plurality of nodes. The network control system is coupled between a plurality of application modules and a transmit/receive module which is in turn coupled to the bi-directional bus. Each application module has a unique address and at least some of the application modules are arranged to originate a message and to provide therewith the address for which the originated message is destined and a memory location address. The network control system includes a buffer pool for storing messages to be transmitted from the one node at memory locations corresponding to the memory location addresses, a data link stage coupled to the application modules for receiving the memory location address of a message to be transmitted from the one node, and a timer manager including timing means for timing a time period up to a predetermined time period after the message to be transmitted is transmitted. The transmit/receive module is coupled to the data link stage for receiving the memory location address of the message to be transmitted, coupled to the buffer pool for obtaining the message to be transmitted for transmitting the message onto the bus, and coupled to the timer manager for starting the timing means responsive to transmitting the message onto the bus.

The invention still further provides a method for use in a communication network including a plurality of nodes distributed on a bi-directional bus, for controlling the reception and transmission of messages at one node of the plurality of nodes. The one node includes a plurality of application modules and a transmit/receive module which is coupled to the bi-directional bus. Each application module has a unique address and at least some of the application modules are arranged to originate a message and to provide therewith the address for which the originated message is destined and a memory location address. The method includes the steps of providing a buffer pool, storing messages to be transmitted from the one node in the buffer pool at memory locations corresponding to the memory location addresses, providing a data link stage, conveying to the data link stage from the application modules the memory location address of a message to be transmitted from the one node, providing a timer manager timing means for timing a time period up to a predetermined time period, conveying from the data link stage to the transmit/receive module the memory location address of the message to be transmitted, causing the transmit/receive module to obtain from the buffer pool the message to be transmitted, causing the transmit/receive module to transmit the message onto the bus, and causing the transmit/receive module to start the timing means responsive to transmitting the message onto the bus.

The present invention still further provides a timer manager for use in a network control system of one node of a connectionless communication network, the communication network being of the type including a plurality of nodes distributed on a bi-directional bus for conveying messages between the nodes, and wherein the network control system includes a buffer pool for storing messages to be transmitted from the one node and a data link stage for receiving the buffer pool storage address of a message to transmitted from the one node and causing the message to be transmitted from the one node and causing the message to be accessed and transmitted onto the bus. The timer manager is coupled to the buffer pool and to the data link stage and includes means for accessing the buffer pool for establishing a table including a plurality of entry slots, each slot having an associated timer entry index and being arranged for storing the buffer pool storage address of a message to be transmitted from the one node, means responsive to an add timer request from the data link stage for locating an available entry slot in the table for a message to be transmitted, and means for obtaining the buffer pool storage address of the message from the data link stage. The time manager further includes means for storing the buffer pool storage address in the entry slot, means for conveying to the data link stage the index of the entry slot, timing means associated with the entry slot, and starting means for starting the timing means responsive to the message being transmitted onto the bus.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals indicate identical elements, and wherein:

DESCRIPTION OF THE PREFERRED EMBODIMENT

Figure 1:
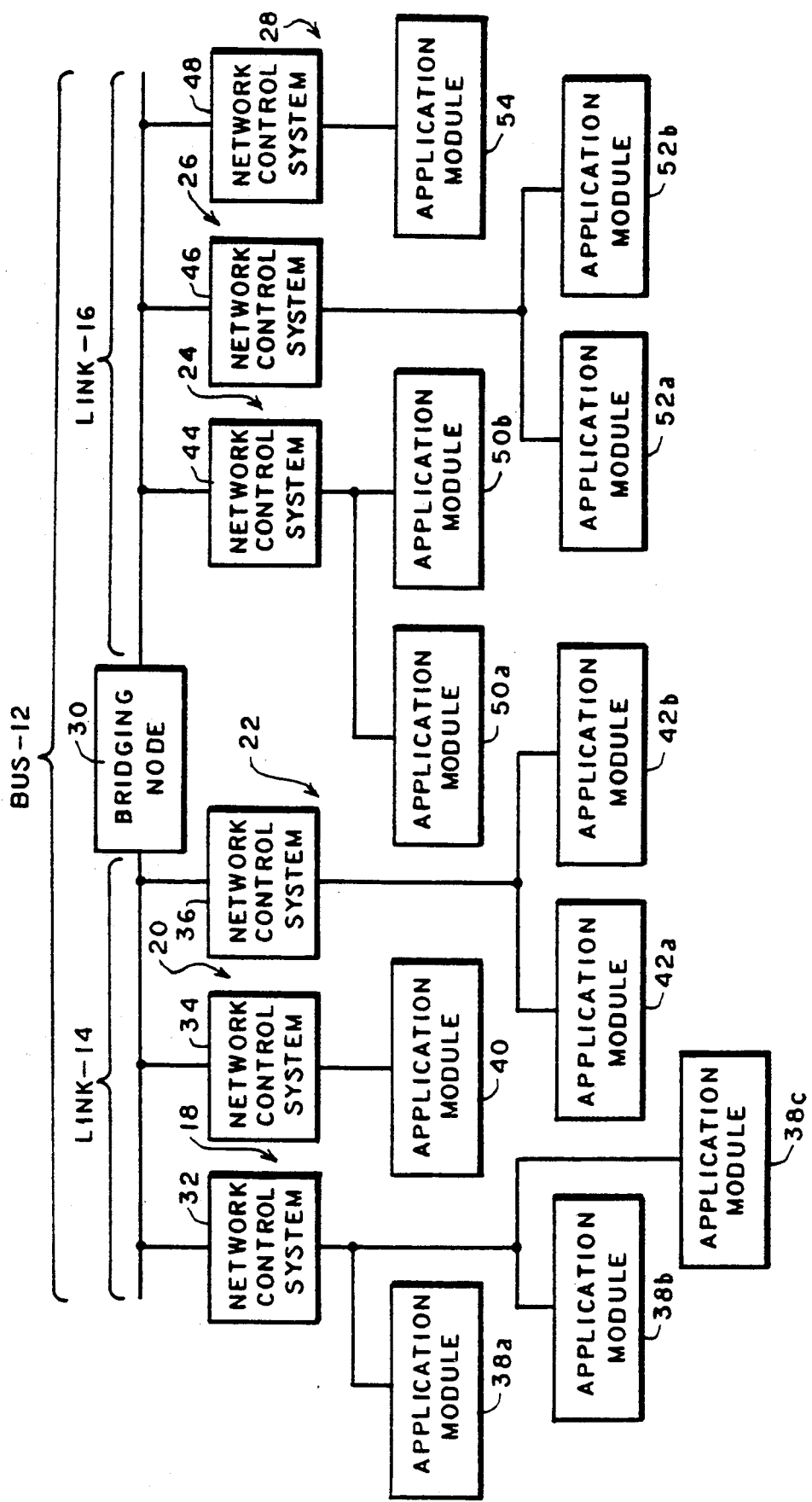
FIG. 1 is a schematic representation of a communication network which may embody the present invention to advantage.

Referring now to FIG. 1, it illustrates a communication network 10 which may embody the present invention. The network 10 includes a bi-directional bus 12 which is divided into a first link 14 and a second link 16. The network 10 further includes a first plurality of nodes 18, 20, and 22 associated with the first link 14 and a second plurality of nodes 24, 26, and 28 associated with the second link 16. The communication network 10 further includes a bridging node 30 which couples the first link 14 and the second link 16.

Each of the first plurality of nodes 18, 20 and 22 includes a network control system 32, 34 and 36 respectively which preferably correspond to the network control system of the present invention. In addition, each of the first plurality of nodes 18, 20 and 22 includes at least one application module coupled to its respective network control systems. To that end, node 18 includes application modules 38a, 38b and 38c coupled to network control system 32, node 20 includes an application module 40 coupled to network control system 34, and node 22 includes application modules 42a and 42b coupled to network control system 36. Each of the network control systems 32, 34 and 36 is coupled to the first link 14 of the bi-directional bus 12. As will be seen hereinafter with respect to FIG. 3, the network control systems 32, 34 and 36 are coupled to the first link 14 through a transmit/receive module.

Figure 3:
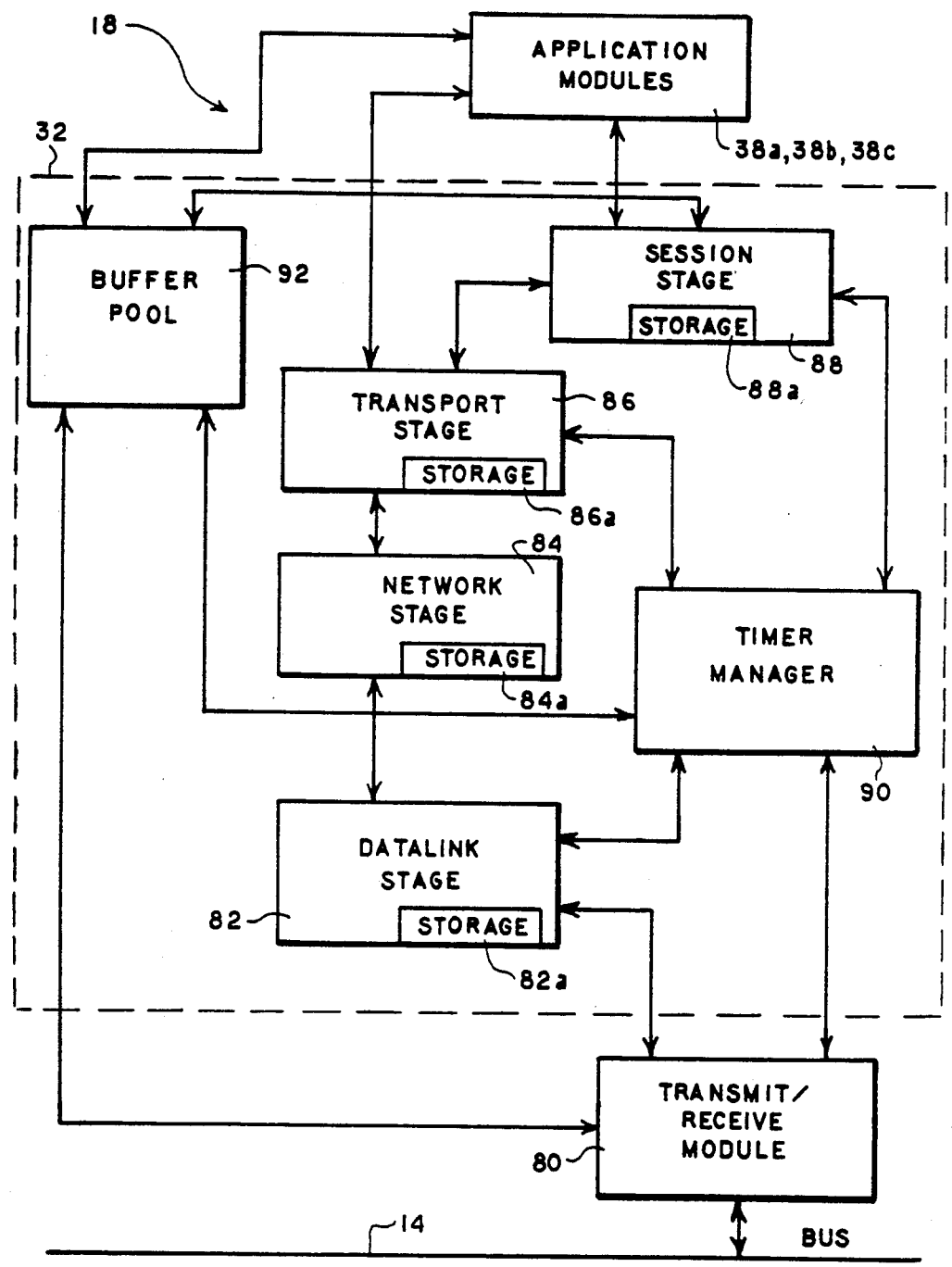
FIG. 3 is a block diagram of a network control system embodying the present invention and which is capable of correspondingly implementing the method of the present invention.

The second plurality of nodes 24, 26 and 28 similarly include network control systems 44, 46 and 48 which, again, preferably correspond to the network control system of the present invention. Node 24 includes application modules 50a and 50b coupled to network control system 44, node 26 includes application modules 52a and 52b coupled to network control system 46 and node 28 includes application module 54 coupled to network control system 48. The network control system 44, 46 and 48 of the second plurality of nodes are coupled to the second link 16 through a transmit/receive module as illustrated in FIG. 3.

The bus 12 is illustrated as being divided into the first link 14 and the second link 16 to illustrate that a limited number of nodes may be coupled to a bus. When the number of nodes exceeds the number of nodes which may be coupled to a bus, it is necessary to subdivide the bus into links as illustrated and to couple the links together with bridging nodes, such as bridging node 30. Bridging node 30 could be either a bridge or a gateway. A bridge is a bridging node which couples two links together which utilize the same network protocol. A gateway is a bridging node which couples two links together wherein the network protocol of one link is different from the network protocol of the other link. Such bridges and gateways are well known in the art.

The communication network 10 utilizes a protocol known in the art as a sliding window protocol. Each of the nodes of the communication network include a window which contains 16 frames numbered 0 through 15, each frame of which corresponding to a separate message. The protocol requires that, when any one of the nodes is communicating with any other node, the two nodes by synchronized together to permit proper reception of a message. Such synchronization requires that the transmitting node maintain a list of consecutive sequence numbers corresponding to the frames. It is permitted to send messages in the "sender's window". The receiving node similarly maintains a list of consecutive sequence numbers corresponding to the frames it is permitted to accept in the "receiver's window". For example, if node 18 is sending a message destined for node 22 out on bus 12 in its frame number 2, node 22 must have in its receive window for node 18 the number 2 to insure proper receipt and processing of the message. When node 22 receives the message in its window frame number 2, it will acknowledge receipt of the message and process the message. If node 22 instead receives frame number 4, it will treat the received message as being received out of order, and store the message without acknowledging receipt of the message or processing the message.

The sliding window protocol also limits the number of unacknowledged messages that any one node can transmit at one time to a predetermined number of messages. In accordance with this preferred embodiment, the number of unacknowledged messages which may be transmitted from any one node is eight. For example, if node 18 has 10 messages to send out onto bus 12 and has sent 8 of those messages with only one message being acknowledged as received by a destined node, node 18 may send only one additional message. This limits the number of messages which may be processed in the communication network at any one time and serves to provide flow control. Also, the communication network 10 is arranged so that only one node can be transmitting messages out onto the bus at any one time. Each node takes its turn in transmitting messages. This precludes the possibility of two messages being sent out on the bus 12 in opposite directions and the potential interference which may be caused to each message by the other.

As previously mentioned, each window contains 16 frames numbered 0 through 15 with each frame corresponding to a separate message. Each frame includes a header comprising a number of boxes which are arranged to contain information which coordinates the transmission and receipt of the messages and which, as will be seen in conjunction with FIG. 3 and the flow diagrams of FIGS. 4 through 50, are used to denote particular services to be provided to the messages by the various stages of the network control system.

The first box of each frame header is for the address of the source which originated the message. The source address includes the link, the node and the application module or network control system stage which originated the message.

The next or second box of the header is for the address of the application module or control system stage for which the message is ultimately destined. The destination address includes the link, the node and the application module or the network control system stage to ultimately receive the message.

The third box of the header is for the address of an intermediary source. As will be discussed hereinafter, if a message is to be sent from a node on one link to a node on another link, the message is actually conveyed from the originating node to the destined node in hops through intermediary nodes. For example, if node 18 is sending a message to node 28, the message may first be sent from node 18 to, for example, the bridging node 30. The message thereafter will be transmitted from bridging node 30 to node 28. In this case, when bridging node 30 transmits the message to node 28, it will place in the third box of the message header its address as an intermediary source. The intermediary source address will contain the link, the node and the data link stage of the intermediary source node.

The fourth box of the header is for the address of an intermediary destination node of the message. This address also includes the link, node and data link stage of the intermediary node. In the above example, when node 18 transmits its message destined for node 28, it will include in the fourth box of its header the address of node 30 as the intermediary destination node.

If a message is transmitted from one node to another node which are both on the same link, then there would not be an intermediary source node or an intermediary destination node. In this case, the node transmitting the message will provide its address for the intermediary source address and the destination address for the intermediary address. Hence, in this last case, the source and destination addresses are duplicated by connection to avoid confusion within the network.

As will be seen hereinafter, the network control system of the present invention includes a session stage, a transport stage, a network stage, and a data link stage. As a message to be transmitted is processed through the various network control system stages, each stage of the system fills in its own header information into various boxes provided in the header. These stages will set a bit in the message header if they are required to provide a service to the message.

There are three different types of messages which are conveyed from one point to another within the communication network 10. These message types are control messages or frames, supervisory messages or frames, and data messages or frames. A box is also provided in each frame header for indicating the type of message being conveyed. For example, a "1" may be provided in the box to indicate that the message is a data frame, a "2" may be placed in the box to indicate that the message is a control frame, and a "3" may be placed in the box to indicate that the message is a supervisory frame.

The header in each frame or message is relatively short and comprises on the order of 4 bytes. If the bus 12 is an ARCNET bus, each message may contain up to 512 bytes of information. As a result, 508 bytes of the message are allocated to the message itself, with 4 bytes being allocated for the header. As will be referred to hereinafter, the communication network 10 is arranged for conveying short messages of less than 508 bytes. However, messages having a length greater than 508 bytes may also be conveyed from one point to another within the communication network 10 through the use of a connection-oriented session stage.

Figure 2:
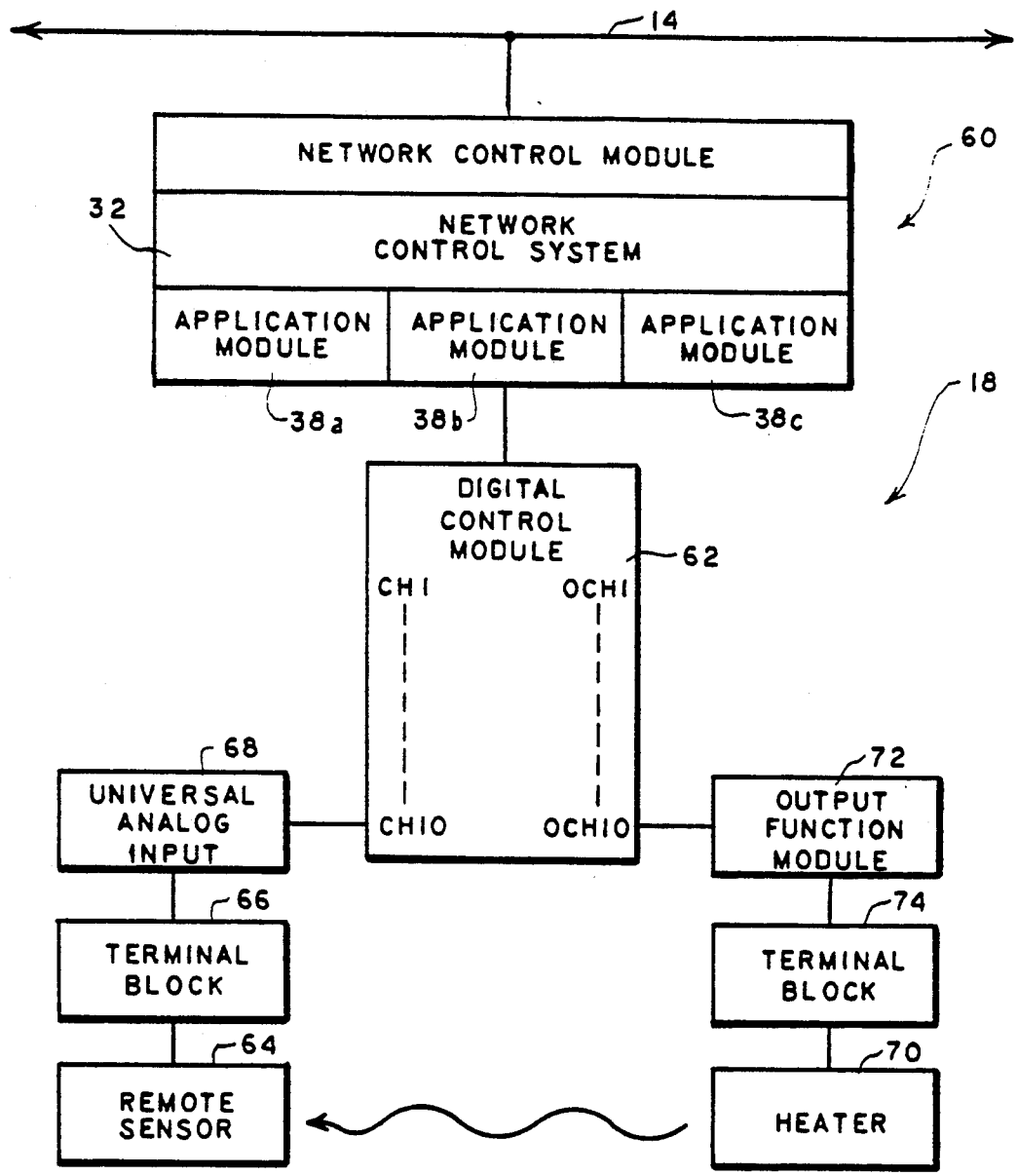
FIG. 2 is a block diagram of a representative node of the communication network illustrated in FIG. 1.

Referring now to FIG. 2, it illustrates in block diagram form the configuration that a node, such as node 18, may take when the network control system of the present invention is embodied in a facility management system. More specifically, the node 18 takes the form of a control system for controlling the internal environment of a portion of an office building, for example. As illustrated, the node or control system 18 is coupled to the link 14 of the bi-directional bus. The control system includes a network control module 60 which includes the network control system 32 and the application modules 38a, 38b and 38c. The control system further includes a digital control module 62 coupled to the network control module 60.

The main function of the network control module 60 is to communicate with other network control modules of the system on an equal basis as a pear in accordance with the protocol established by the network control system 32 and to control its associated digital control module 62 under its own assigned protocol through the application modules 38a, 38b and 38c. Such a protocol may include setting temperature control setpoints, heating schedules, lighting schedules, etc. The network control module, in accordance with its protocol, sends high-level commands through its application modules to the digital control module which then executes on those commands by performing closed-loop operations by issuing a suitable control signal at its outputs responsive to sensed input conditions at its inputs provided by remote sensors.

The control signals issued by the digital control module can be both in digital or analog form. A digital control signal can be used to activate relays to in turn activate fan motor starter windings or to turn on heaters. An analog control signal can be used to power a damper motor to set a damper at a desired position. Hence, the digital control module performs decision-making processes, gathers information from its remote sensors, digitizes the information, and executes control functions to satisfy the high-level commands of the network control module.

The digital control module 62 thus processes digital information for performing various different types of closed-loop control operations within the system. In order to provide closed-loop control, the digital control module 62 may include 10 input channels designated CH1 through CH10. These input channels receive various different kinds of information from remote sensors from within the system, which remote sensors provide information of various types indicative of the conditions being sensed. For example, a remote sensor which senses a temperature may take the form of a temperature dependent resistance so that the temperature sensor provides a resistance having a magnitude which is indicative of the temperature being sensed.

In furtherance of providing closed-loop control, the digital control module further includes 10 output channels designated OCH1 through OCH10. From these output channels, the digital control module issues control signals which are utilized to turn on heaters, start fan motors, or adjust dampers, for example. Since the digital control module includes 10 input channels and 10 output channels, it may perform up to 10 closed-loop control functions.

One such closed-loop control operation is illustrated in FIG. 2 in connection with the 10th output channel, OCH10, and the 10th input channel, CH10. The input channel CH10 is coupled to a remote sensor 64, which may be a temperature sensor, through a terminal block 66 and a universal analog input circuit (IAU) 68. The output channel OCH10 is coupled to a heater 70 through an output function module 72 and a terminal block 74. The output function module 72 may be of many different types, and for purposes of this description, will be assumed to be a relay. When the relay of the output function module 72 closes, the heater 32 is turned on for heating an internal space such as a room of a building.

In performing the closed-loop control operation associated with the 10th input channel CH10 and the 10th output channel OCH10, the temperature of the room is sensed by the remote sensor 64 which provides, through the terminal block 66 and the IAU 68, information in the form of a resistance having a magnitude indicative of the temperature being sensed. When the resistance of the remote sensors 64 indicates that the room being heated by the heater 70 is at a desired temperature dictated by the high-level command of the network control module, the digital control module 62, through output channel OCH10, will open the relay of the output function module 72 to turn off the heater 70. When the room temperature falls below the desired temperature, that condition is sensed by the remote sensor 64, and causes the digital control module to close the relay of the output function module 72 to once again turn on heater 70. The foregoing closed-loop process continues until it is interrupted by either an operator, manually placing the output function module 72 into a manual mode, or by a command from the network control module 60. Such a command may be initiated under software control, for example, when the heat provided to portions of an office building is to be turned off at night or over weekends.

As can be appreciated from the foregoing, information must be conveyed from one point to another in a facility management system to assure proper control of the internal environment of a building. Messages must be conveyed from one network control module to another network control module. For example, if one node is to shed loads for power conservation purposes and has no loads it can shed, it may transmit a message originated by one of its application modules to another node telling it to shed a certain amount of load. As another example, a building zone may be too warm and the network control module controlling that zone may be doing everything it can do to cool its zone whereas another zone may be too cold. In this case, a first network control module may transmit a message to another for information as to the other node's setpoints and request the other node to change its setpoints so that the first node may have more capacity to reduce the temperature of its zone. In all of these cases, the messages would be data messages, since they would be sent between an application module of one node to an application module of another node.

In addition to the foregoing data messages, control and supervisory messages must be conveyed between nodes to maintain proper control of the communication system. Control messages may take the form of reset, suspend, restart, resume, and reject messages. The functions of these messages which will be described in detail hereinafter. Supervisory messages may be response messages such as acknowledgements. These messages are used to acknowledge receipt of messages to provide point-to-point and end-to-end reliability.

Referring now to FIG. 3, it illustrates, in block diagram form, a network control system such as network control system 32 of FIGS. 1 and 2 embodying the present invention. The network control system 32 is coupled to the first link 14 of the bus by a transmit/-receive module 80 and to the plurality of application modules 38a, 38b and 38c. As a result, the network control system 32 is coupled between the application modules and the bi-directional bus.

The network control system 32 generally includes a data link stage 82, a network stage 84, a transport stage 86, a session stage 88, a timer manager 90, and a buffer pool 92. The data link stage 82, the network stage 84, the transport stage 86, and the session stage 88 each includes its own internal storage for storing information which is unique to the processes performed within the stages. To that end, data link stage 82 includes storage 82a, network stage 84 includes storage 84a, transport stage 86 includes storage 86a, and session stage 88 includes storage 88a.

The buffer pool 92 is utilized for storing data messages to be transmitted from the network control system 32 onto the bus and certain data messages received from the bus. The buffer pool 92 also includes a dedicated portion which is utilized by the timer manager 90 for maintaining an accurate account of the data messages to be transmitted from the network control system. Each data message originated by the application modules is stored in the buffer pool 92 at a corresponding address location within the buffer pool 92 designated by the application modules in the header of the messages. Only the address of the message is passed from stage to stage within the network control system. Ultimately, the header is received at the data link stage which provides the buffer pool address to the timer manager. The timer manager uses its dedicated portion of the buffer pool to set up a table including a plurality of entries. It will locate an available entry and store the buffer pool address of the message in the table and provide the various stages with the index of the entry. The stages then store the index in their own storage. Whenever a stage thus requires the message buffer pool address, it will send its index to the timer manager and receive from the timer manager the buffer pool address of the message. The foregoing is depicted in FIG. 3 with the data link stage 82, transport stage 86, and session stage 88, all being coupled to the timer manager 90 and the timer manager being coupled to the buffer pool 92. As a result, the buffer pool provides a single location wherein messages are stored to conserve memory so that each of the aforementioned stages need not require memory for this purpose.

The data link stage 82 is coupled to the network stage 84, the network stage 84 is coupled to the transport stage 86, and the transport stage 86 is coupled to the session stage 88. The application modules 38a, 38b and 38c are coupled directly to the transport stage 86 and to the session stage 88. As will become apparent hereinafter, some of the messages originated by the application modules may require a session service to be performed by the session stage. As a result, the message address for those messages are transferred to the session stage before they are transferred to the transport stage. When session services are not required, the message headers for the messages originated by the application modules to be transmitted onto the bus are conveyed directly to the transport stage.

The network control system 32 is configured so that each of the various stages of the system are arranged to provide services to those stages which precede it. As a result, the session stage may be required to provide services to the application modules, the transport stage may be required to provide services to either the application modules or the session stage, the network stage may be required to provide services to the transport stage, and the data link stage may be required to provide services to the network stage. Each stage is configured to provide its own unique service or services within the system. Hence, there is no duplication of services within the system.

The transport stage 86 is arranged to receive message headers for messages to be transmitted over the bus either directly from the application modules or from the application modules through the session stage 88. The application modules, when originating a message, use the resources of the shared buffer pool and provide their address as the source address and the address of the destined node within the header of the message or frame. The application modules are the generators of all data messages. The application modules only originate and receive data messages.

The transport stage 86 is arranged to provide end-to-end reliability when a message is conveyed from the link to which the network control system 32 is coupled to a destined node which is coupled to a different link. As a result, when a message is sent from the node which includes the network control system 32 to another node which is also coupled to link 14, the transport stage is not called upon to provide end-to-end confirmation. In providing the end-to-end confirmation, the transport stage utilizes its storage 86a for storing the entry index provided by the timer manager and sets a bit in the header indicating that the message requires end-to-end confirmation. The transport stage 86 by setting its bit in the header notifies the timer manager to set a transport time period during which it expects to receive an acknowledgement from the receiving node on another link. As will be seen hereinafter, if the transport stage does not receive an acknowledgement from the destined node within the transport time-out period, it will notify the application module originating the message that the message failed to reach the destined node. If however, the transport stage receives an acknowledgement within the transport time period, it will cause the timer manager to delete its timer associated with the message.

The transport stage 86 is also arranged to communicate directly with the transport stage of another node. To that end, the transport stage is not only arranged to receive acknowledgements from the transport stages of other nodes on other links, but in addition, is arranged to format acknowledgements for the transport stages on other links as well.

The transport stage also conveys the buffer pool address of a received message to the application modules. The transport stage receives the address from the network stage and causes the appropriate module to obtain its received message from the buffer pool.

The transport stage also time-stamps messages to be transmitted which it processes. It provides the header with two time-stamps. The first is the time-stamp of the last message transmitted to the destined node (the old time-stamp). The second time-stamp is the time-stamp of the current message (the new time-stamp). The time-stamps are used by the transport stage of the receiving node to determine if a message has been received out of order and hence, if a prior message was lost.

The network stage 84 provides routing for the messages which are transmitted from its node. The network stage 84 includes a routing table within its internal storage 84a to determine the address of the node to which a message must be sent in order for that message to reach its final destination. The routing table consists of a directory or routing table wherein each node in the network is listed in an entry along with a corresponding address to which a message must be sent to enable the message to reach its final destination. For example, if a message is to be sent to a node on the same link, and in accordance with this preferred embodiment, to a node on link 14, the network stage 84, responsive to the destination address in the message header, will determine from its routing table that it should duplicate the destination address in portion of the header that is provided for an intermediary address. On the other hand, if the message is destined for a node on another link, the network stage will determine from its routing table that it should provide an intermediary node address different than the destination address in the header and provide the appropriate intermediary node address in the header. In both of these cases, since the message originated at its node, the network stage will provide in the space of the header allotted for the intermediary source, the source address of its application module which originated the message.

If the message to be transmitted from the node 18 is a message originated at another node and destined for a node on its link, the network stage in response to the destination address in the header and its routing table will provide in the header the final destination address in the intermediary node address portion of the header and its address in the intermediary source portion of the header. If the message is received from another node and is destined for a node in another link, the network stage, in response to its routing table, will provide the message header with the intermediary address of the next node to receive the message and will provide its address in the intermediary node source portion of the header.

In providing the addresses as discussed above, the network stage 84 utilizes its routing table within the storage 84a to determine to which node the message ought to be sent in response to the destination address in the header of the message. The network stage storage 84a may also include alternative routing information to permit the network stage 84 to select an alternate routing path should an alternate routing path be necessary. The routing table within the network storage 84a is preferably a dynamic table which is constantly being updated due to the fact that certain nodes including bridging nodes of the network may be brought on-line or off-line at any time.

The network stage also conveys to the transport stage the message addresses of messages received from other nodes which are destined for application modules of its node. The network stage receives those message addresses from the data link stage 82. As previously mentioned, the buffer pool addresses for those messages are conveyed to the application modules which then obtain the messages from the buffer pool.

Even though the physical link is a broadcast media wherein all messages may be heard by every node on the same link, since only one node is addressed in the message header, only that one node will receive and process the message. This fact, together with the routing table of the network stage, serves to establish logical virtual circuit connections within the network. One form of transmission, referred to herein as a broadcast transmission, permits a node to send a message to more than one node at any one time. Such a broadcast transmission will be described herein with respect to the flow diagrams.

The data link stage 82 provides a number of different functions within the network control system 32 which provide for the basic reliability of the network control system 32. The data link stage 82, for example, assures that its node is in synchronism with another node with which its node is attempting to communicate. As will be more fully disclosed hereinafter, the storage 82a of the data link stage 82 includes a dynamic table which lists each node and the receiving window and sending window for each node on the link. The data link stage 82 will retransmit messages sent from its node a given number of times in the absence of an acknowledgement from the node to which the message is destined. If the message is retransmitted a given number of times without an acknowledgement being received from the destined node, the data link stage 82 will assume that it is not in sync with the other node and format a reset message to the destined node for the purpose of resynchronizing its node with the destined node. The reset message is a control message sent without a frame number. When the other node receives the reset message, it will acknowledge receipt of the reset message and the two nodes will then reset their control tables to corresponding receiving and sending windows. During the reset process, the data link stage 82 will preclude the messages to be transmitted which are stored in the buffer pool 92 from being cleared so that if its node becomes resynchronized with the other node, the messages will be available for retransmission. During the reset procedure, the data link stage suspends the transmission of all messages from its node except for the reset messages. If the data link stage does not receive an acknowledgement from the destined node to confirm receipt of the reset messages after retransmitting the message a given number of times, the data link stage will thereafter cause the stored messages to be cleared from the buffer pool 92.

The data link stage 82 also provides for limiting the number of received messages that its node can process at any one time. As previously mentioned, received data messages are stored in the buffer pool 92. When the number of received data messages stored in the buffer pool equals a maximum number of stored received messages, the data link stage 82 will take measures to reduce the message flow to its node. If this occurs, the data link stage will permit its node to process control messages and supervisory messages, but will not receive data messages from other nodes unless the data messages are of critical priority which may relate to, for example, fire alarm and security related messages. When the data link stage receives a data message which is not of critical priority, it will send to the originating node a reject message to inform the node that it should not send to it any non-critical messages. It will also store the originating node's address in its storage 82a. When the number of stored messages falls below the maximum number of stored messages and when the originating node sends another message, the data link stage will thereafter send to the originating node a resume message to inform it that all messages are once again being received. The data link stage then removes the originating node's address from the stored list.

The data link stage 82 also provides for the suspension of its nodes responsive to receiving a suspend request message. If the data link stage 82 receives a suspend request message, it suspends its node by precluding its node from transmitting messages onto the bus. During the suspension of the node, the data link stage clears from the buffer pool all of the stored messages to be transmitted from its node. To clear the buffer pool of the messages to be transmitted, the data link stage obtains from the its storage the entry index of the messages one at a time and then requests timer manager 90 each time to access the buffer pool at the storage addresses of the messages and clear the stored messages to be transmitted from the buffer pool. The data link stage also sends a failure message to those application modules which originated messages to be transmitted so that they are advised of the failure of their transmission request.

The foregoing suspension of a node by its data link stage enables a node to be taken off-line. This, however, is accomplished without physically decoupling the node from the communication bus. The suspension request may come from an operator, such as service personnel, in the event that a node is not properly placing messages onto the bus and is interfering with the communication taking place on the bus.

The data link stage 82 also provides for the restarting of a node in response to a restart request after the node has been suspended. In restarting its node, the data link stage 82 sends a reset message to all of the nodes with which it has communicated to thereby cause those nodes to be resynchronized with the node being restarted. The data link stage keeps track of the nodes with which it has communicated by storing the addresses of those nodes in its storage 82a. When it sends a reset request to one of those nodes, the node address of that node is then cleared from the storage 82a. In this manner, the data link stage is able to restart its node for active participation on the communication bus.

The data link stage 82 also provides for point-to-point reliability in the network. Point-to-point reliability or confirmation of receipt of messages occurs within the communication network for messages sent between nodes which are coupled to the same link of the communication bus. The data link stage formats acknowledgement messages to acknowledge receipt of data messages and control messages. Supervisory messages such as acknowledgements are not acknowledged.

In providing the point-to-point reliability, before a message is sent out onto the bus, the data link stage requests that the timer manager 90 associate a timer with the message to be transmitted. When the message is transmitted, the timer associated with the message is started. After receipt of the message by the receiving node, its data link stage will send back to the data link stage of the transmitting node an acknowledgement that a message has been received. If the acknowledgement is received within a predetermined time period, the timer manager is then requested by the data link stage to delete the timer. However, if an acknowledgement is not received within the predetermined time period, the timer manager will notify the data link stage that the timer has timed-out. The data link will thereafter cause the message to be retransmitted onto the bus. After the message is retransmitted a given number of times without a received acknowledgement, the data link stage then will send a reset message to the receiving node for resynchronizing the two nodes.

Hence, the data link stage 82 is arranged for both transmitting acknowledgement messages to acknowledge receipt of received messages and for retransmitting messages which are not acknowledged as received by a receiving node. In this manner, point-to-point reliability is provided within the communication network utilizing the network control system of the present invention.

In causing a message to be transmitted out onto the bus, the data link stage 82 conveys the buffer pool address location of the message to be transmitted to the transmit/receive module 80. The transmit/receive module 80, in response to receiving the message storage address, obtains the message from the buffer pool and combines a header portion of the message with the message portion of the message and places the message out onto the bus. As previously mentioned, each frame or message is limited to a given length of 512 bytes comprising 508 bytes of message information and four bytes of header information. To enable messages longer than 512 bytes to be transmitted from one node to another, the session stage 88 provides a session service for long messages greater than the given length of 512 bytes. The session stage 88 is the connection-oriented portion of the network control system. Before providing its session services, the session stage sets up a session connection with the session stage of the receiving node with which it is to communicate.

When a session service by the session stage commences, the long message is conveyed from the application module originating the long message to the buffer pool where it is stored. It notifies the session stage through its message headers that it has a long message to be sent and requires session services by the session stage 88. The session stage 88 originates a connect request to the session stage of the receiving node. The session stage 88 then waits to receive a connect response from the session stage of the receiving node. If it receives a positive connect response, the session stage 88 proceeds to break-up the long message into message parts wherein each message part is a separate message. It then associates a header with each message part and transmits the message parts in series to the session stage of the receiving node and waits for a data acknowledgement. The session stage of the receiving node, which preferably is configured identically to the session stage 88 of FIG. 3, in response to the connect request obtains sufficient memory from its buffer pool to store the message being sent by the transmitting node. When it receives the message, the message is stored in its buffer pool and the receiving session stage originates a data acknowledgement message. It also re-combines the message parts into the original long message and conveys the long message to the application module for which it is ultimately destined.

The transmitting session stage, after receiving the data acknowledgement, initiates a close request message. When the close request message is received by the receiving node, it originates a hang-up message which is transmitted back to the original transmitting session stage. At the receipt of the close request, the session stage then disassembles the connection between itself and the receiving node.

Hence, the session stage is a connection-oriented portion of the network control system. It establishes a connection between itself and the session stage of the receiving node before breaking the long message up into message parts and having that message transmitted onto the bus.

As will become apparent hereinafter with respect to the detailed flow diagrams, the session stage 88 is capable of maintaining more than one session at any one time. In addition, when it originates a connection request to another node when the another node is simultaneously initiating a connection request to it, the session stages respond according to a preset priority so that the priority session stage completes its session first and thereafter, the non-priority session stage completes its session. This is accomplished in main part by the hang-up message and a special message which is recognized by the priority session stage as a continue connect request.

The timer manager 90 is utilized in the system for keeping track of the location of the messages to be transmitted from its node. As previously mentioned, the timer manager 90 maintains a dedicated portion of the buffer pool 92 wherein it maintains a table containing a plurality of entries with each entry including buffer pool storage address of a message and an entry index. The timer manager provides various stages of the network control system with its entry index for its messages so that only the timer manager need keep track of the buffer pool storage addresses of the messages to be transmitted.

The timer manager also provides timers for timing messages after they have been transmitted. The timer manager responsive to an add timer request will associate a timer with the appropriate entry in its table. the timer manager is responsive to add timer requests from the data link stage, transport stage, and session stage. It will associate a separate timer for each request but, when a message requires both a transport timer and a data link timer, the transport timer will be requested first and the timer manager will use that timer for the data link service also.

If a message requires both a data link timer and a transport timer, the timer manager will automatically start the transport timer after it receives a request for deleting the data link timer from the data link stage. Such a set procedure minimizes the amount of internal communication which is necessary within a network control system.

The timer manager periodically decrements its timers and checks the condition of its timers. If it finds that a timer has timed out before it receives a delete timer request, it will notify the appropriate stage that its timer has timed out. In this manner, only the timer manager need keep track of the condition of its timers.

The timer manager 90 is also responsive to address requests from the data link stage, transport stage or the session stage. For example, if a data link timer times out, the data link stage will request the address for the message associated with the timed out timer from the timer manager which then conveys the buffer pool storage address of the message to the data link stage. This enables the data link stage to retransmit the message should that be necessary or appropriate.

Now that a general description of the network control system 32 of FIG. 3 has been provided, further details of the implementation of the network control system can be obtained by making reference to the following description taken in conjunction with the detailed flow diagrams of FIGS. 4 through 50.

DATA LINK STAGE

Figure 4:
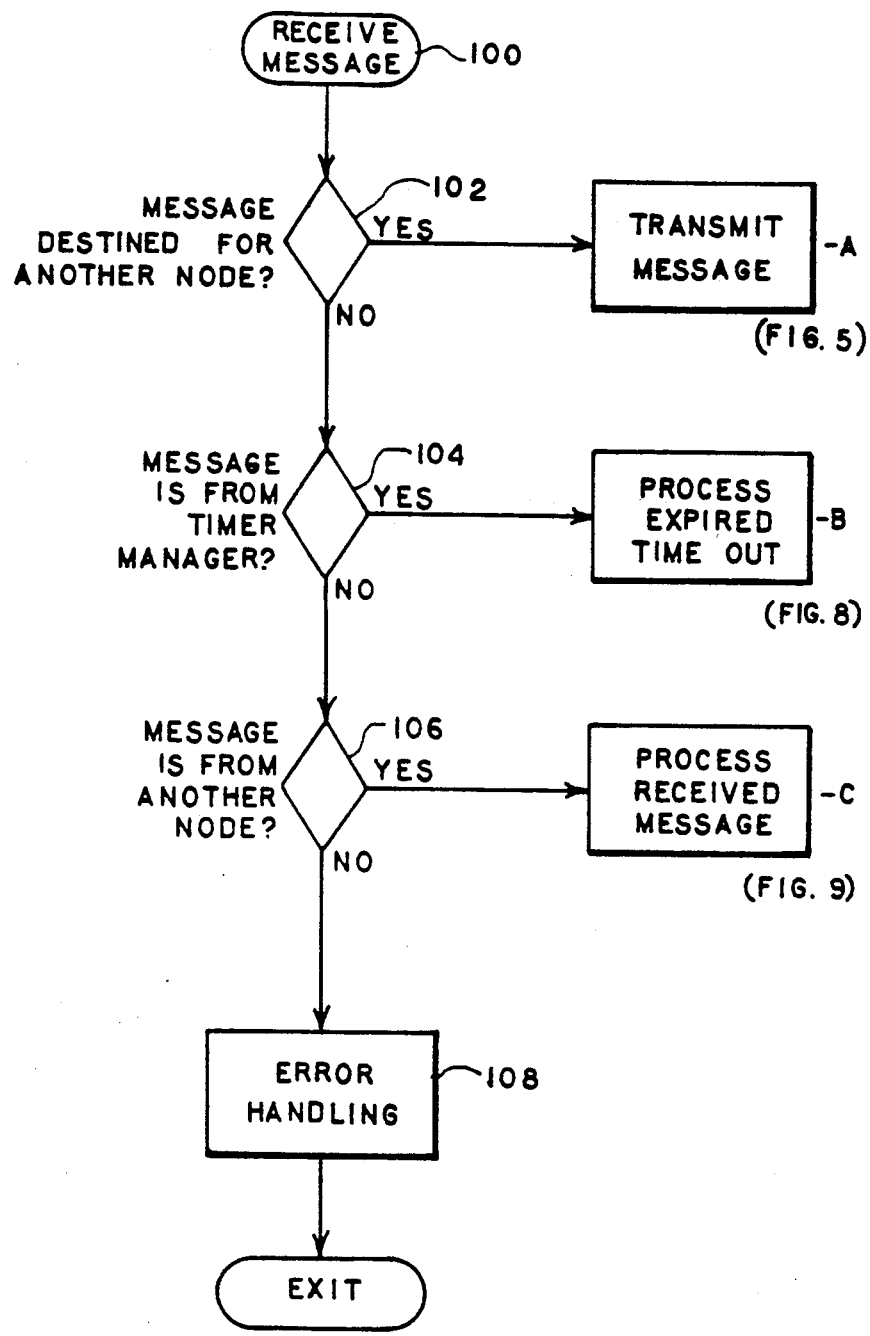
FIG. 4 is a flow diagram illustrating the manner in which the data link stage illustrated in FIG. 3 may be implemented in accordance with the present invention.

FIGS. 4 through 20 are flow diagrams illustrating the manner in which the data link stage illustrated in FIG. 3 may be implemented in accordance with the present invention. Referring now to FIG. 4, it illustrates the manner in which the data link stage categorizes a received message.

When the data link stage receives a message in accordance with step 100, it has received the message address for a message which is either to be transmitted from its node onto the bus or which has been received from the bus from another node. As will be recalled, control and data messages to be transmitted are stored in the buffer pool and data messages received from other nodes are stored in the buffer pool. Received control and supervisory messages are not stored in the buffer pool because these messages are processed internally within the network control system in a manner to be described hereinafter, and need not be either transferred onto the bus or transferred to an application module. From the received message address, the data link stage first determines whether the message is destined for another node in step 102. If the message is destined for another node, the data link stage will then proceed to transmit the message as will be described with respect to FIG. 5. If the message is not destined for another node, in step 104, the data link stage then determines whether the message is from the timer manager. If the message is from the timer manager, the message must be an expired time-out message which the data link stage processes in accordance with the flow diagram of FIG. 8 to be described hereinafter. If the message is not from the timer manager, the data link stage then determines in step 106 if the message is from another node. If the message is from another node, the message is considered to be a received message which the data link stage processes in accordance with FIG. 9 to be described hereinafter. If the message is not destined for another node, is not a message from the timer manager, or is not from another node, the data link stage reverts to an error handling routine 108. The error handling routine is incidental to the instant invention and need to be described herein. After the error handling routine 108, the data link stage exits and is conditioned for receiving another message according to step 100.

Figure 5:
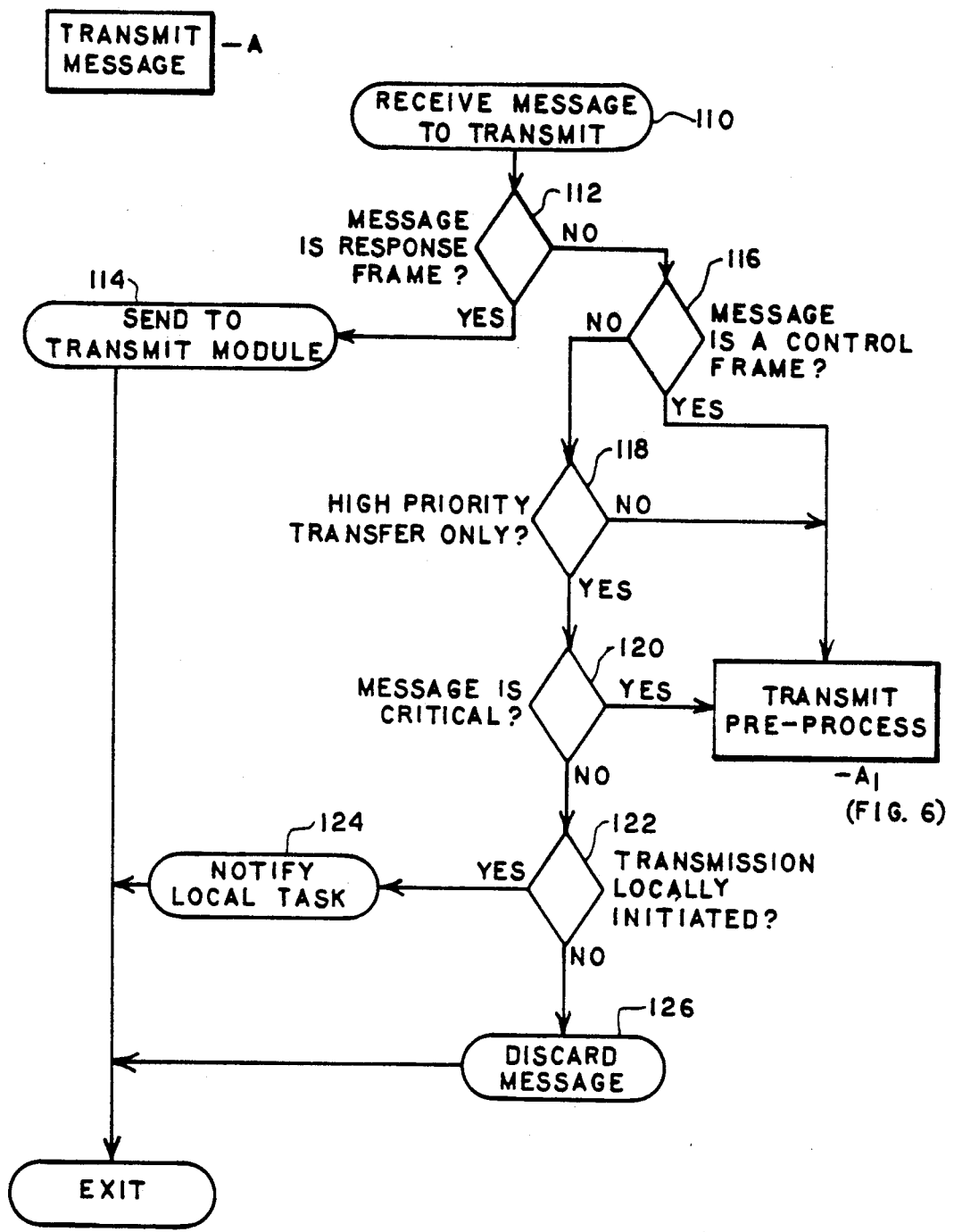
FIG. 5 is a flow diagram illustrating the manner in which the data link stage may be implemented in accordance with the present invention to transmit a message onto the bi-directional bus.

Referring now to FIG. 5, it illustrates the manner in which the data link stage is implemented in accordance with this preferred embodiment to transmit a message after determining in step 102 that a received message is destined for another node. In step 110, the message to transmit is received by this portion of the data link stage. The data link stage first determines in step 112 whether the message is a response message or frame. If the message is a response message, it conveys the response message to the transmit module 80 in accordance with step 114. The response message may be, for example, an acknowledgement message originated by one of the other stages of the network control system, such as the session stage or the transport stage. After sending the response message to the transmit module, the data link stage exits and returns to receive another message to transmit in accordance with step 110.

If in step 112, the data link stage determines that the message is not a response frame it will then, in step 116, determine if the message is a control frame or message. Such a control frame may be a reject message, a reset message, or a resume message. If the message is a control message, the data link stage then moves to a transmit pre-process routine to be described hereinafter with respect to FIG. 6. If the message is not a control frame, the data link stage then determines in step 118 if it is under a restriction to send to the destined node only high priority messages. In other words, the data link stage determined whether it has received from that node a reject message. If the data link stage had received a reject message from the node to which the message is to be transmitted, the data link stage would have entered the address of that node in its storage 82a to enable the data link stage to make the determination according to step 118. If the data link stage is not under a restriction to send only high priority messages, it will enter the transmit pre-process which will be described hereinafter with respect to FIG. 6. If however, the data link stage determines that it is under such a restriction, then it will determine in accordance with step 120 whether the message is critical. If the message is critical, it will enter into the transmit pre-process. A message may be considered critical if it is a data message with regard to safety related factors such as a fire or security alarm, for example. If the message is not critical, then, in accordance with step 122, the data link stage will determine if the message was originated locally within its own node. If the message was originated within in its own node, the data link stage then, in accordance with step 124, will notify the local task or application module which originated the message that the message could not be transmitted. Thereafter, the data link stage exits to receive another message to transmit in accordance with step 110. If however, the message was not locally originated, in other words, if the message was originated from another node which is utilizing the node of the data link stage as an intermediary source, the data link stage will simply discard the message in accordance with step 126 and then exit.

Figure 6:
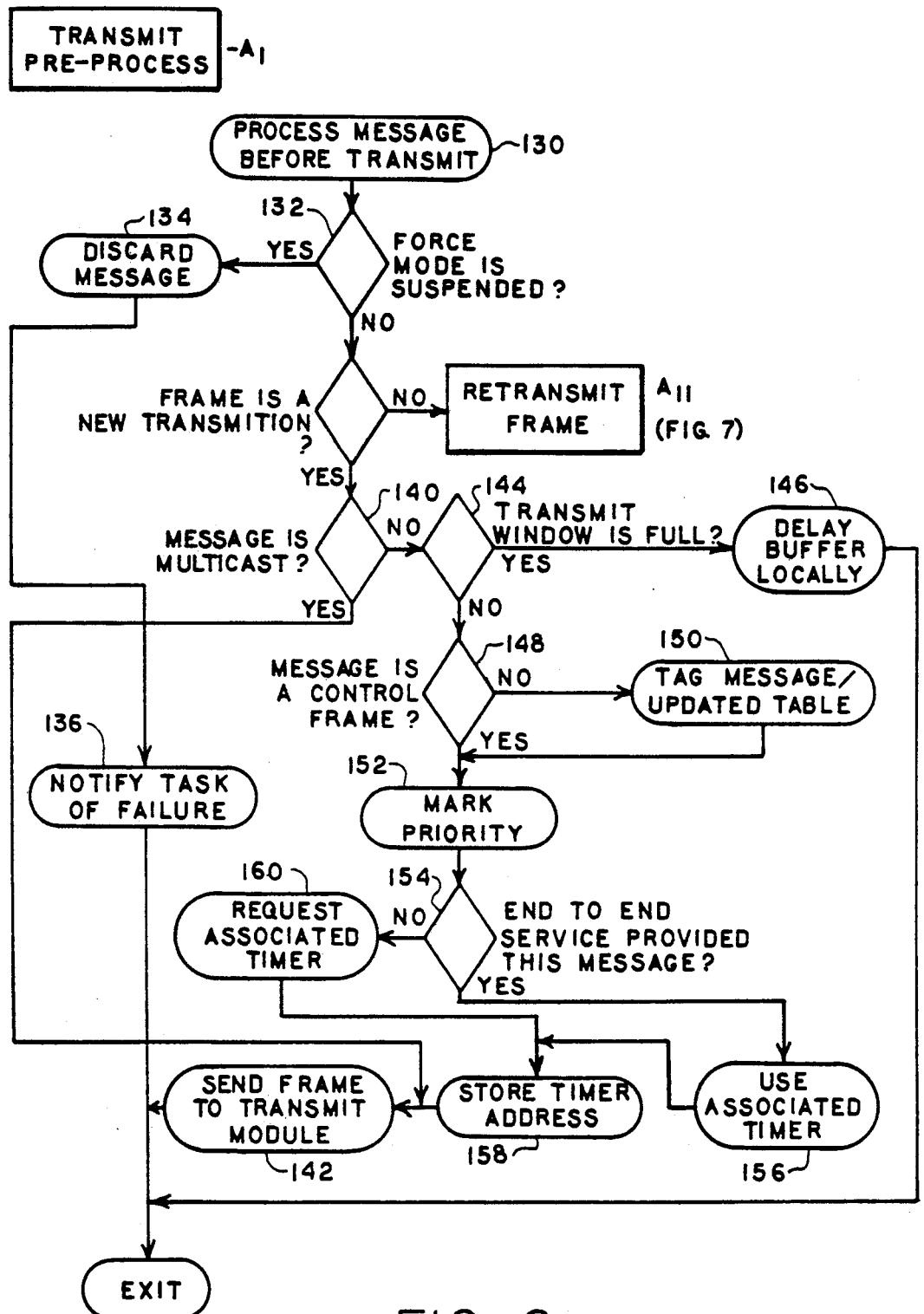
FIG. 6 is a flow diagram illustrating the manner in which the data link stage may be implemented in accordance with the present invention to pre-process a message to be transmitted onto the bi-directional bus.

Referring now to FIG. 6, it illustrates the manner in which the data link stage is implemented in accordance with this preferred embodiment to pre-process a message to be transmitted. This portion of the data link stage receives the message to be pre-processed in accordance with step 130. The data link stage first determines whether its node is suspended in accordance with step 132. If its node is suspended, it will discard the message in step 134 and then notify the local task or application module in step 136 that it was unable to transmit the message. The data link stage then exits to receive another message to pre-process before transmission.

If, in step 132, the data link stage determines that its node is not suspended, then in step 138, the data link stage determines whether the message or frame is a new transmission. If the message is not a new transmission, then the data link stage will treat the message as one to be retransmitted and will enter a retransmit frame process as will be described hereinafter with respect to FIG. 7. If however, the data link stage determines that the message is a new transmission, the data link stage will then determine in step 140 if the message is a multicast or, in other words, a broadcast message. If the message is a broadcast message, which the data link stage determines from the destination address which will indicate that the message is to be sent to a plurality of nodes simultaneously, the data link stage will then, in accordance with step 142, convey the message frame to the transmit/receive module for transmission of the message onto the bus and then the data link stage will exit.

If the data link stage determines in step 140 that the message is not a broadcast message, it will then determine whether its transmit window is full in accordance with step 144. This is where the sliding window protocol limits the number of messages that a node can transmit at any one time. As previously mentioned, and in accordance with this preferred embodiment, each node is limited to transmitting eight unacknowledged messages. If this node has already transmitted eight messages which are not acknowledged, then the data link stage determines that the transmit window is full and will delay its buffer pool so that the message is not conveyed from the buffer pool to the transmit/receive module. The data link stage delays the buffer pool in accordance with step 146 and then exits.

If the data link stage determines that the transmit window is not full, the data link stage then determines in step 148 if the message is a control frame. If the message is not a control frame, in other words, if the message is a data frame or message, the data link stage will then, in step 150, tag the message and update its table within its storage 82a to provide an entry for the entry index to be received from the timer manager.

After updating its table, or if the message is a control frame, the data link stage then in step 152 inserts into the message header the appropriate bit to indicate what type of message is to be transmitted. For example, if it is a control message, it will be given a designation which would be considered of higher priority than if it is a data message. After marking the message with its priority in step 152, the data link stage then determines in step 154 if an end-to-end service is to be provided to this message by the transport stage. The data link stage makes this determination from information contained in the header for the message. If an end-to-end service is to be provided to the message, the transport stage will have already requested that the timer manager add a timer for the end-to-end service. As a result, in step 156, the data link stage will use the timer manager timer associated with the end-to-end service for providing its point-to-point service. In step 158, the data link stage then stores the timer manager entry index for the associated timer in its storage 82a and then proceeds to step 142 to send the message address to the transmit/receive module 80.

If an end-to-end service is not to be provided to the message as determined in step 154, the data link stage then in step 160 requests an associated timer for the message from the timer manager. The timer manager after locating an available entry in its table, provides the data link stage with the entry index for the timer which the data link stage then stores in its storage in step 158.

The data link stage then proceeds to step 142 to send the message address to the transmit/receive module.

Figure 7:
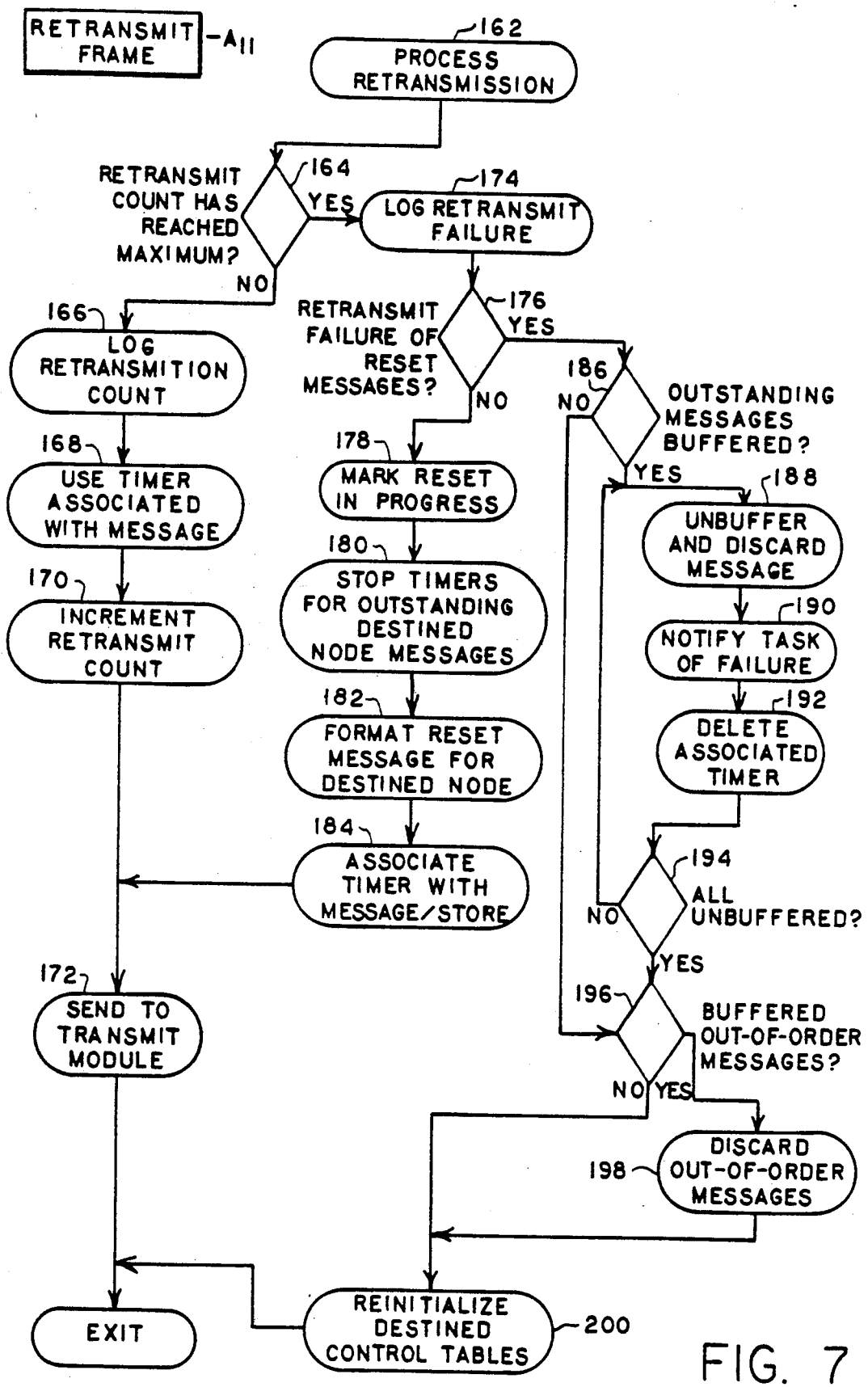
FIG. 7 is a flow diagram illustrating the manner in which the data link stage may be implemented in accordance with the present invention to retransmit a message and to resynchronize its node with another node.

Referring now to FIG. 7, it illustrates the manner in which the data link stage is implemented in accordance with this preferred embodiment to cause a message to be retransmitted. This portion of the data link stage receives the message to be retransmitted in step 162 and then determines in step 164 if the retransmission count for this message has reached the maximum number of retransmissions. In accordance with this preferred embodiment, the maximum number of retransmission is five retransmissions.

If the retransmission count has not reached the maximum number of retransmissions, the data link stage then in step 166 logs the retransmission count and then in step 168 uses the timer already associated with the message for the retransmission. The data link stage then increments the retransmission count and then in step 172 sends the message address to the transmit/receive module for retransmission and then exits.

If the retransmission count has reached the maximum number of retransmissions, the data link stage will then log the retransmission failure in its table in step 174 and then in step 176 determines whether the retransmission failure was the result of a retransmitted reset message. If the retransmitted message was not a reset message, the data link stage then in step 178 marks that the reset process is in progress and in step 180, stops all timers for all outstanding messages for the destined node. In stopping all of these timers, the data link stage assures that the messages to be transmitted to the destined node are not cleared from the buffer pool 92.

The data link stage in step 182 formats a reset message for the destined node and then associates the original timer associated with the original retransmitted message with the reset message in step 184. The data link stage then proceeds to send the reset message to the transmit/receive module 80 in accordance with step 172 and exits. When the transmit/receive module receives the reset message, it immediately places the message out onto the bus.

If in step 176, the data link stage determines that the retransmission failure was the result of a retransmitted reset message, it will know that something is drastically wrong with its node and will enter a clean-up routine for the purpose of re-initializing the destination table for the failed node. To that end, the data link stage in step 186 determines whether there are any outstanding messages which are still stored in the buffer pool which have not yet been transmitted onto the bus. If there are such outstanding messages stored in the buffer pool, the data link stage then in step 188 will unbuffer and discard the message. In step 190, it will then notify its local task or application module originating the message that the message was not transmitted. In step 192, it will request the timer manager to delete the timer which was associated with the outstanding message. Then in step 194, the data link stage determines whether all of the outstanding messages have been unbuffered. If not, the data link stage returns to step 188 to continue the process. In this manner, the data link stage clears the outstanding messages in the buffer pool 92 one at a time until all of the outstanding messages for the specified node are cleared from the buffer pool.

If all of the messages to be transmitted are cleared from the buffer pool, or if there are no outstanding messages which are still stored which have not yet been transmitted, the data link stage then in step 196 determines whether there are any stored messages in the buffer pool which it has received from other nodes out of order. The network is configured so that the data link stage will only respond to messages received in order from other nodes. For example, if another node transmits a message to the node 18 under consideration in frame number 3 when the data link stage table indicates that the next message from that node should be in frame number 2, it will store the message transmitted in frame number 3 from that node but will not acknowledge receipt of it. The data link stage will then wait to see if it receives a message from that node in frame number 2 and if it does, it will then acknowledge receipt of both of the messages by acknowledging receipt of the highest order message. Hence, if any messages are stored in the buffer pool out of order, the data link stage has not yet acknowledged receipt of those messages. In step 196, the data link stage determines if any of those messages are stored out of order. If there are messages stored out of order, the data link stage then in step 198 discards all of the out of order messages stored in the buffer pool.

If there are no out of order stored messages, or if all out of order messages have been cleared by the data link stage in step 198, the data link stage then moves to step 200 wherein it re-initializes its destination control tables for the purpose of resynchronizing its node with the specified node in the network. The data link stage then exits.

Figure 8:
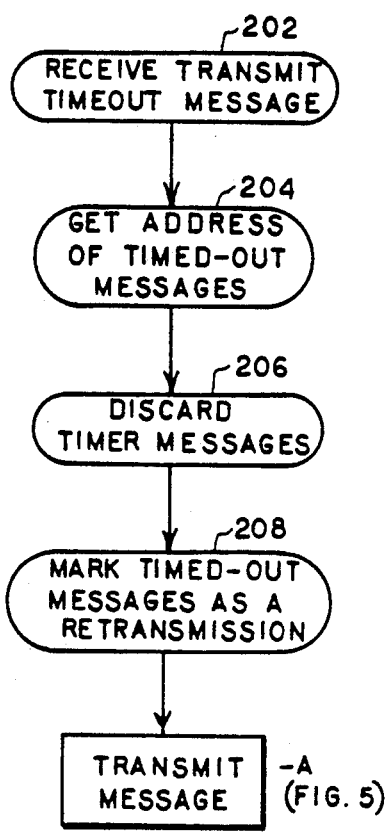
FIG. 8 is a flow diagram illustrating the manner in which the data link stage may be implemented in accordance with the present invention to process an expired timer.

Referring now to FIG. 8, it illustrates the manner in which the data link stage is implemented in accordance with this preferred embodiment to process an expired timer message from the timer manager. This portion of the data link stage first receives the time-out message from the timer manager in step 202. Then, in step 204, the data link stage requests from the timer manager 90 the buffer pool storage address of the message whose message has timed out. The data link stage then discards the timer manager message in step 206 and marks the timed-out message as a retransmission message in step 208. The data link stage then will process the retransmission of the timedout message in accordance with the transmit procedure previously described with respect to the flow diagrams of FIGS. 5 through 7.

Figure 9:
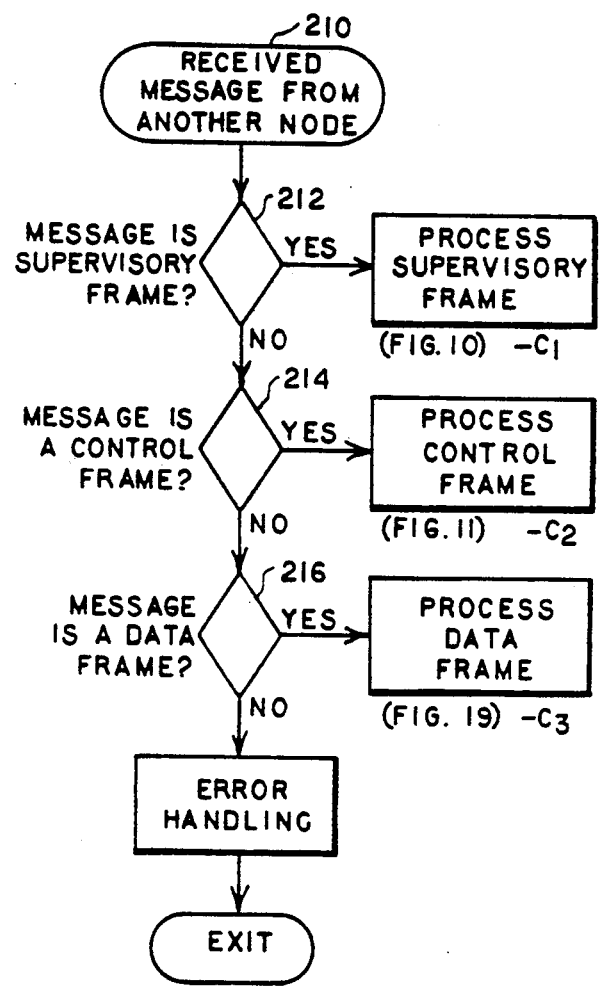
FIG. 9 is a flow diagram illustrating the manner in which the data link stage may be implemented in accordance with the present invention to process a message received from another node on the bi-directional bus.

Referring now to FIG. 9, it illustrates the manner in which the data link stage is implemented in accordance with this preferred embodiment to respond to a message received from another node as determined in step 106 of FIG. 4. This portion of the data link stage receives a message from another node as step 210. The data link stage then determines whether the message is a supervisory frame in step 212. If the message is a supervisory frame or message, the data link stage will process the supervisory frame in a manner to be described hereinafter with respect to FIG. 10.

If the message is not a supervisory message, the data link stage then determines in step 214 if the message is a control message. If it is, it will process the control message in a manner to be described hereinafter with reference to FIGS. 11 through 18.

If the message is not a control message and not a supervisory message, the data link stage will then determine in step 216 if the message is a data message or frame. If the message is a data message, it will process the data message in a manner to be described hereinafter with reference to FIGS. 19 and 20.

If the data link stage determines that the message is not a supervisory message, a control message, or a data message, it will enter into the error handling routine and then exit to once again receive a message from another node.

In determining whether the message is a supervisory message, a control message, or a data message, the data link stage utilizes the message header to make that determination. The message header, therefore, enables the data link stage to categorize the type of message which is being received at its node.

Figure 10:
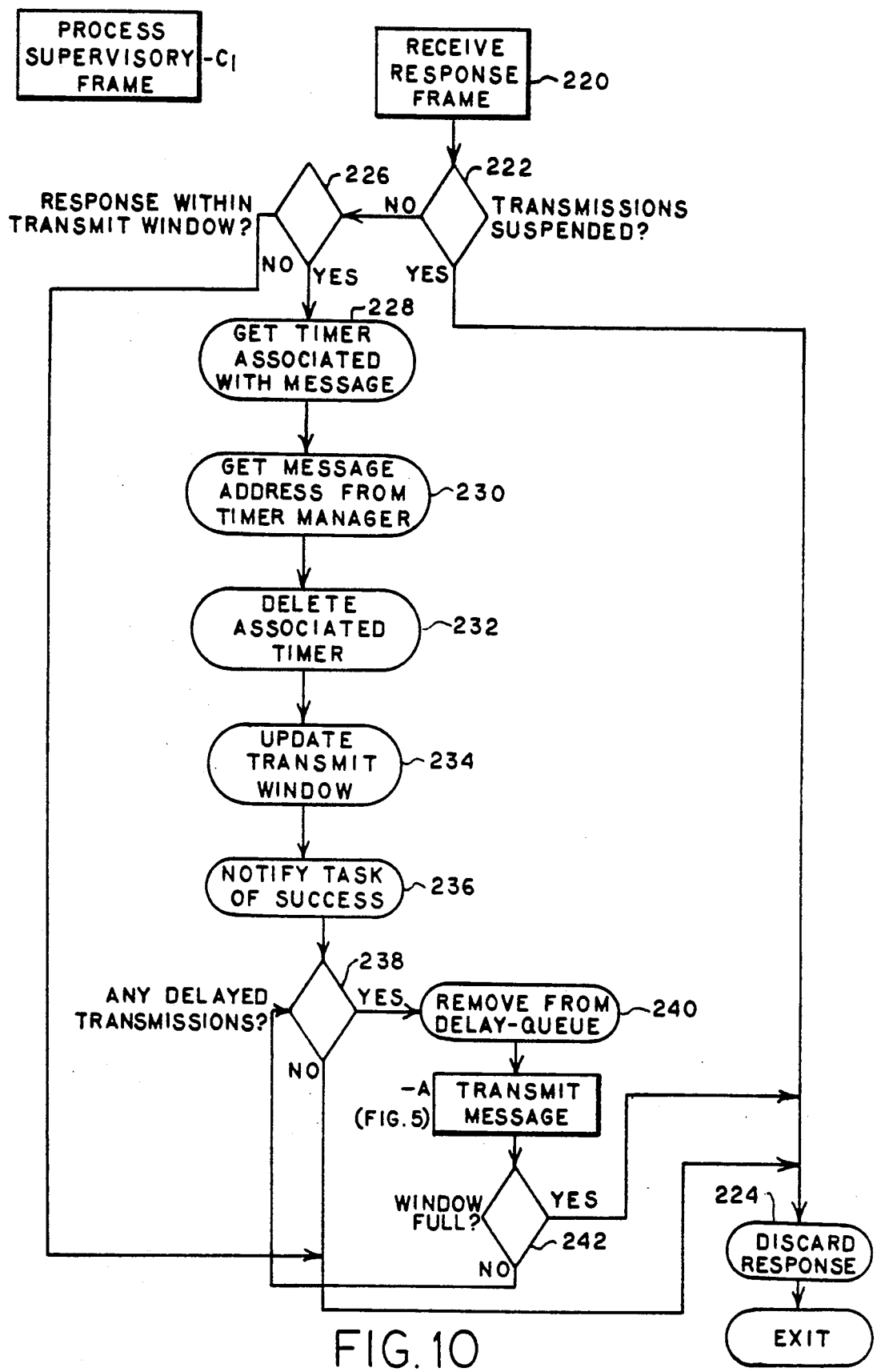
FIG. 10 is a flow diagram illustrating the manner in which the data link stage may be implemented in accordance with the present invention to process a response message.

Referring now to FIG. 10, it illustrates the manner in which the data link stage is implemented in accordance with this preferred embodiment to process a received supervisory frame. As previously mentioned, a supervisory frame is a response frame in the form of an acknowledgement to a received message and enables the data link stage to provide point-to-point reliability within the network. This portion of the data link stage first receives the response frame or message at step 220. The data link stage then determines in step 222 whether its node has been suspended. If its node has been suspended, it will then discard the message in step 224 and then exit to receive the next response message.

If the node of the data link stage has not been suspended, then the data link stage will determine in step 226 if the received response falls within its eight consecutive frame transmit window as indicated in its storage table. If it is not, the data link stage will discard the response in step 224 and exit. If the response is within the transmit window, the data link stage will then in step 228 obtain from its table the timer index entry of the timer manager for the message which has been responded to. The data link stage then in step 230 will use the timer entry index to obtain from the timer manager the buffer pool storage address of the message and cause the timer manager in step 232 to delete the timer associated with the message. In step 234, the data link stage will then update its transmit window because it can now send out one additional message onto the bus.

The data link stage next in step 236 notifies the local task or application module that its message had been received by the destined node and then determines in step 238 if there are any messages stored in the buffer pool for which transmission was delayed because its transmit window was full. If there are no delayed messages stored in the buffer pool, the data link stage will then discard the response in step 224 and exit to receive the next response frame.

If there are messages stored in the buffer pool for which transmission was delayed, the data link stage will remove the next message to be transmitted from the buffer pool in step 240 and will then transmit the message in accordance with the procedure previously described with respect to FIGS. 5 through 7. The data link stage then determines whether its transmit window is now full in step 242. If its transmit window is now full, it will then proceed to step 224 to discard the response and then exit to receive the next response message. If its transmit window is not full, then it returns to step 238 to determine if there are any further messages to be transmitted for which transmission was previously delayed because the transmit window was full.

Figure 11:
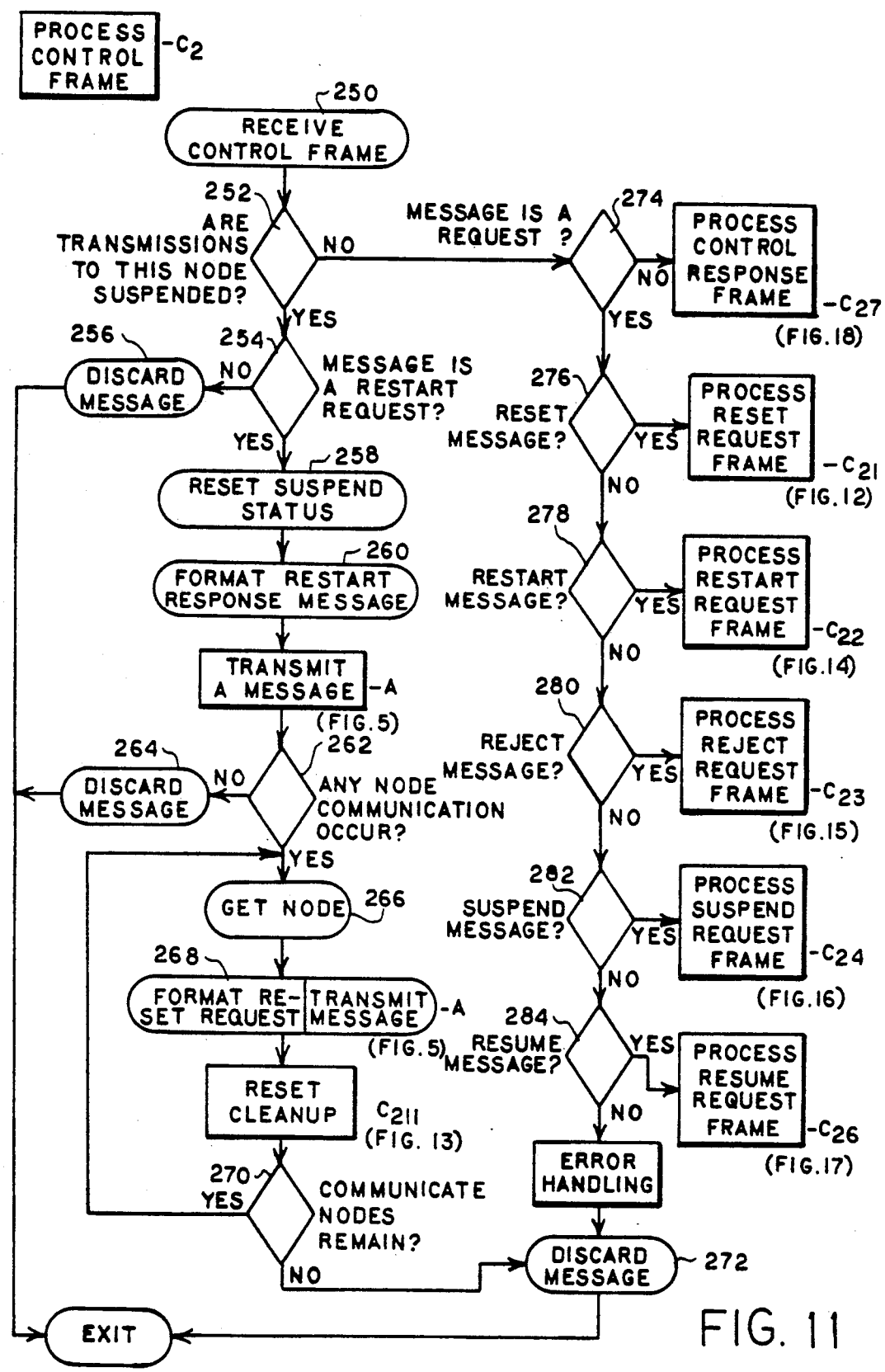
FIG. 11 is a flow diagram illustrating the manner in which the data link stage may be implemented in accordance with the present invention to process a received control message.

Referring now to FIG. 11, it illustrates the manner in which the data link stage is implemented in accordance with this preferred embodiment to process a received control frame to restart its node if the control frame is a restart request and if its node had previously been suspended or, if not suspended, categorizes the type of control frame being received. Such control frames may be, for example, restart messages, reset messages, reject messages, suspend messages, or resume messages, for example. Before each of these types of control messages can be processed, the data link stage must categorize the control message as one of these types of messages. This categorizing process is performed in accordance with the implementation illustrated in FIG. 11.

This portion of the data link stage first receives the control frame or message in step 250. The data link stage first determines at step 252 if its node is suspended. If its node is suspended, the data link stage in step 254 next determines if the control message is a restart request. If it is not a restart request, the data link stage will disregard the message in step 256 and exit to receive another control frame. If the message is a restart request, the data link stage, through restart means, first resets its suspend status in step 258. The data link stage next in step 260 formats a restart response message to acknowledge receipt of the restart request and then transmits the restart response pursuant to the procedure previously disclosed with respect to FIGS. 5 through 7.

The data link stage next determines in step 262 whether any nodes have been communicated with prior to its suspension. If no nodes had been communicated with prior to its suspension, the data link stage discards the message in step 264 and exits to receive the next control frame. If any nodes had been communicated with prior to its suspension, the data link stage will have stored the addresses of those nodes in its storage 82a. The data link stage obtains the first node address in step 266 and formats a reset request for tht node and transmits the reset request in step 268. The data link stage then enters a reset clean-up routine which will be described hereinafter with respect to FIG. 13. The data link stage then determines if there are any other nodes which it communicated with prior to its suspension. If there are, it will obtain the next node address from its storage and proceed to format a reset request for that node, transmit the reset request to that node, and perform the reset clean-up procedure. When the reset message has been sent to all of the nodes to which the data link stage had communicated with prior to the suspension of its node, it will discard the reset request message and then exit to receive the next control frame.

If originally the data link stage found in step 252 that its node was not suspended, it then proceeds to determine the type of control message that it has received. In making this determination, the data link stage uses the information contained in the header of the message.

The data link stage first determines if the message is a request in step 274. If the message is not a request, it is then processed as a control response frame in a manner to be described hereinafter with respect to FIG. 18. If the message is a request frame, the data link stage then determines in step 276 if the message is a reset message. If it is a reset message, the data link stage will process the reset request frame in a manner to be described hereinafter with respect to FIG. 12. If the message is a request but not a reset message, the data link stage then determines in step 278 if the message is a restart message. If the message is a restart message, the data link stage will process the restart request message in a manner to be described hereinafter with respect to FIG. 14. If the message is a request, but not a reset message, nor a restart message, the data link stage then determines in step 280 if the message is a reject message. If the message is a reject message, it will process the reject message in a manner to be described hereinafter with respect to FIG. 15. If the message is a request, but not a reset message, a restart message, nor a reject message, the data link stage will then determine in step 282 if the message is a suspend request message. If the message is a suspend request message, the data link stage will process the suspend request message in a manner to be described hereinafter with respect to FIG. 16. If the message is a request message, but not any of the previously mentioned types of request messages, the data link stage lastly determines in step 284 if the message is a resume request message. If the message is a resume request message, it will process the message in a manner to be described hereinafter with respect to FIG. 18. If the request message is not any of the aforementioned types, the data link stage will go into the error handling routine, discard the message at step 272 and then exit to receive the next control message.

Figure 12:
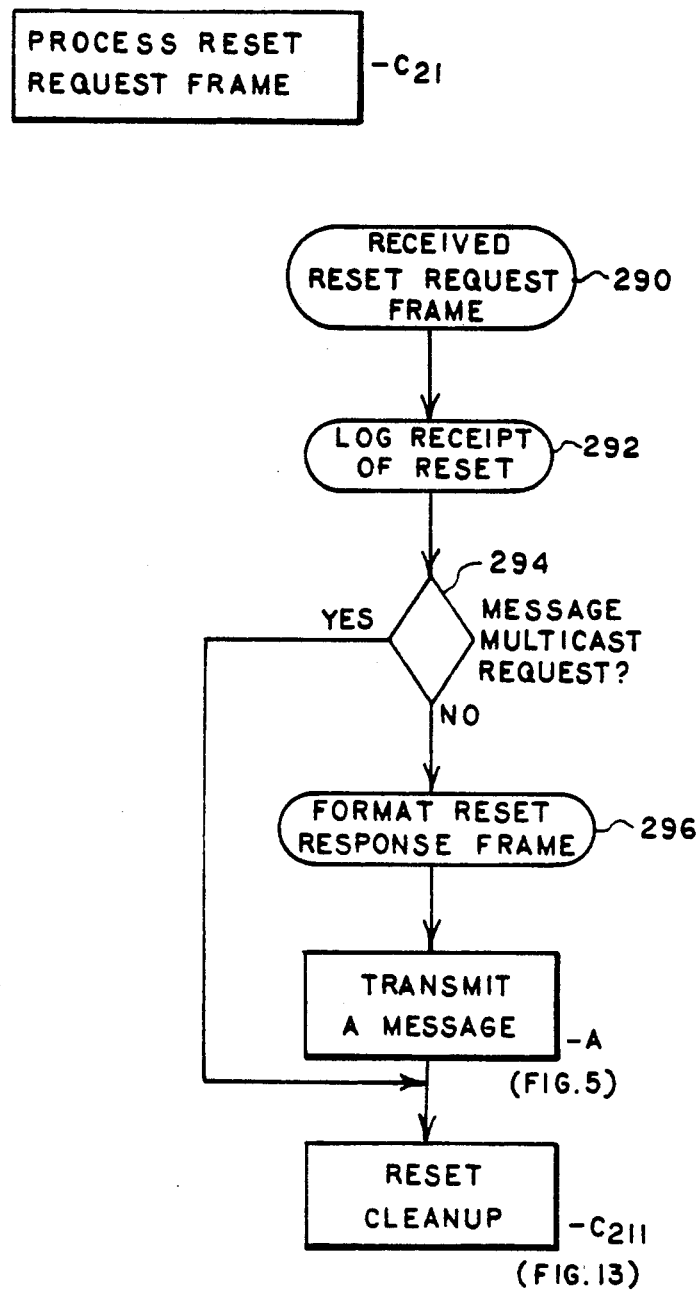
FIG. 12 is a flow diagram illustrating the manner in which the data link stage may be implemented in accordance with the present invention to process a received reset request message.

Referring now to FIG. 12, it illustrates the manner in which the data link stage is implemented in accordance with this preferred embodiment for processing a received reset request frame. This portion of the data link stage first, at step 290, receives the reset request message. The data link stage next at step 292 logs in its storage the receipt of the reset message. Thereafter, in step 294, the data link stage determines if the message is a broadcast reset request. If it is, the data link stage immediately goes into the reset clean-up routine to be described hereinafter with respect to FIG. 13 without acknowledging receipt of the message. if the reset request is not a broadcast message, the data link stage then in step 296 formats a reset response frame to acknowledge receipt of the reset request and then transmits the reset response message in accordance with the procedure described with respect to FIGS. 5 through 7. The data link stage after transmitting the reset response message then proceeds to the reset clean-up procedure to be described immediately hereafter.

Figure 13:
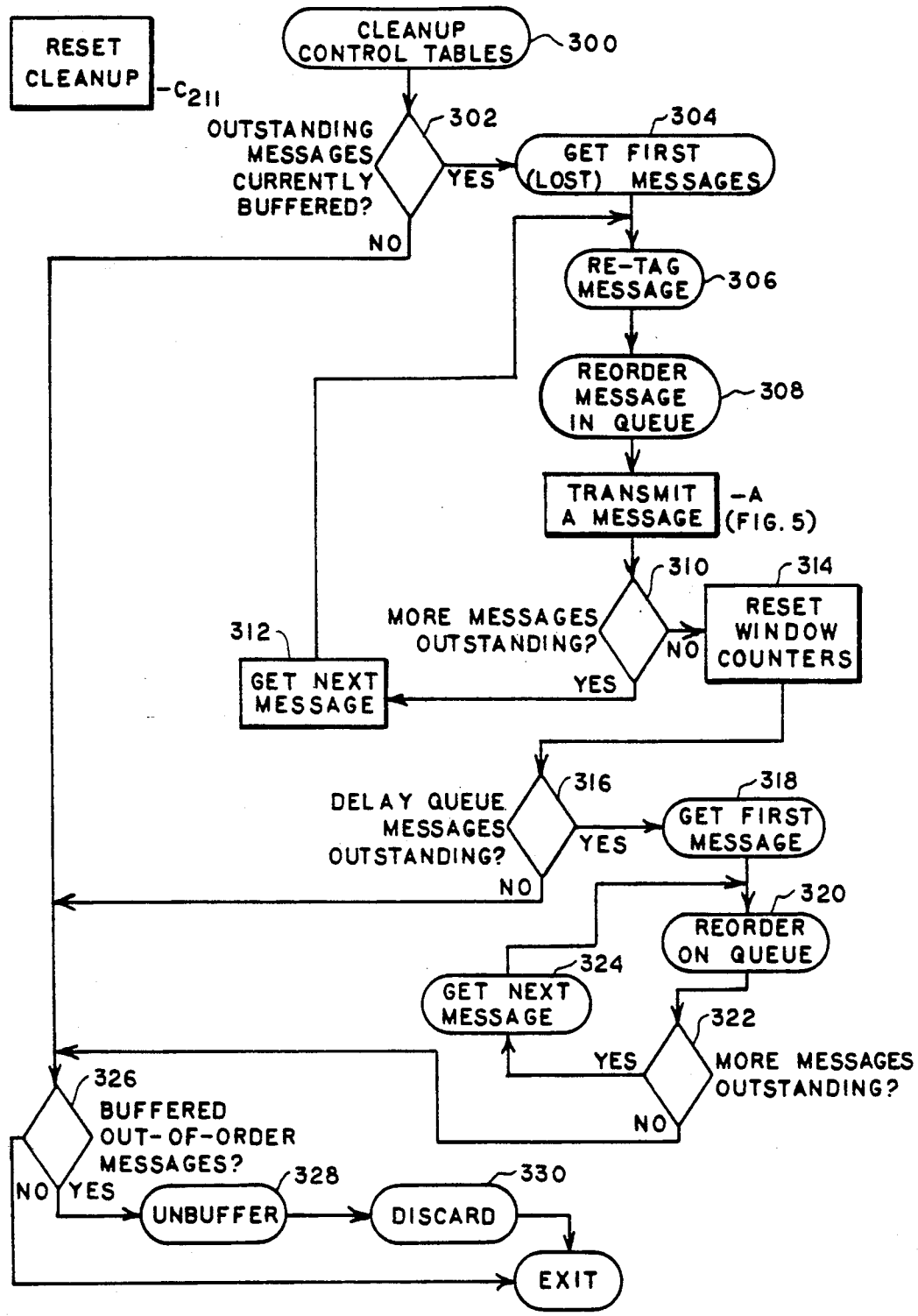
FIG. 13 is a flow diagram illustrating the manner in which the data link stage may be implemented in accordance with the present invention to reset its node in response to a received reset request message.

Referring now to FIG. 13, it illustrates the manner in which the data link stage is implemented in accordance with this preferred embodiment to perform the reset clean-up procedure in response to receiving a suspend request message or a reset request message. The data link stage first cleans up its control tables in step 300. It does so by resetting its tables in its storage 82*a* so that for the given node sending the reset request message, both the data link stage of the node under consideration and the data link stage of the node sending the reset request message are reset to corresponding receiving and sending windows. The data link stage then, in step 302, determines if there are any outstanding messages currently stored in the buffer pool which should be transmitted. If there are such messages, the data link stage obtains the first message in step 304 and then in step 306 re-tags the message by inserting a new frame number into the message header which will correspond to the frame number to which the receiving node will respond. The data link stage next in step 308 re-orders the message to be transmitted so that it is transmitting the messages in proper order, and then retransmits the message in accordance with the procedure previously described with respect to FIGS. 5 through 7. The data link stage in step 310 then determines if there are any other messages stored in the buffer pool which are to be transmitted. If there are, it will obtain from the timer manager the buffer pool storage address of the next message in step 312 and return to step 306 to re-tag that message. After all of the stored messages to be transmitted have been sent out onto the bus, the data link stage in step 314 resets its window counters again to a known level.

The data link stage next determines in step 316 if there are any delayed messages to be transmitted onto the bus. If there are, the data link stage in step 318 will obtain from the timer manager the buffer pool storage address of the first delayed message to be transmitted. The data link stage will then in step 320 re-order the message to assure that the messages are sent out in order when they are later transmitted. The data link stage will next determine in step 322 if there are any other delayed messages outstanding. If there are, then the data link stage will proceed to step 324 to obtain from the timer manager the buffer pool storage address of the next message that is stored for delayed transmission. The data link stage will then perform step 320 again to place this message into the proper order for transmission. This continues until there are no more messages outstanding which have been stored for delayed transmission. When this occurs, the data link stage determines in step 326 whether there are any received messages which have been stored out of order. If there are messages which have been stored, but received out of order, the data link stage will clear those messages in step 328, discard the messages in step 330, and exit. If after re-ordering all of the messages for delayed transmission there were no received messages stored out of order, the data link stage would immediately exit.

Hence, as can be seen from FIG. 13 during the reset clean-up, the data link stage first re-orders messages to be immediately transmitted and provides these messages with the proper new frame numbers for resynching its node with the node from which a reset request has been received for all of the nodes in the network responsive to the restart request after the node has been suspended. The data link stage then resets its window counters and reorders the messages which had previously been stored for delayed transmission which will be later transmitted in accordance with step 238 through 242 as previously described with respect to FIG. 10.

Figure 14:
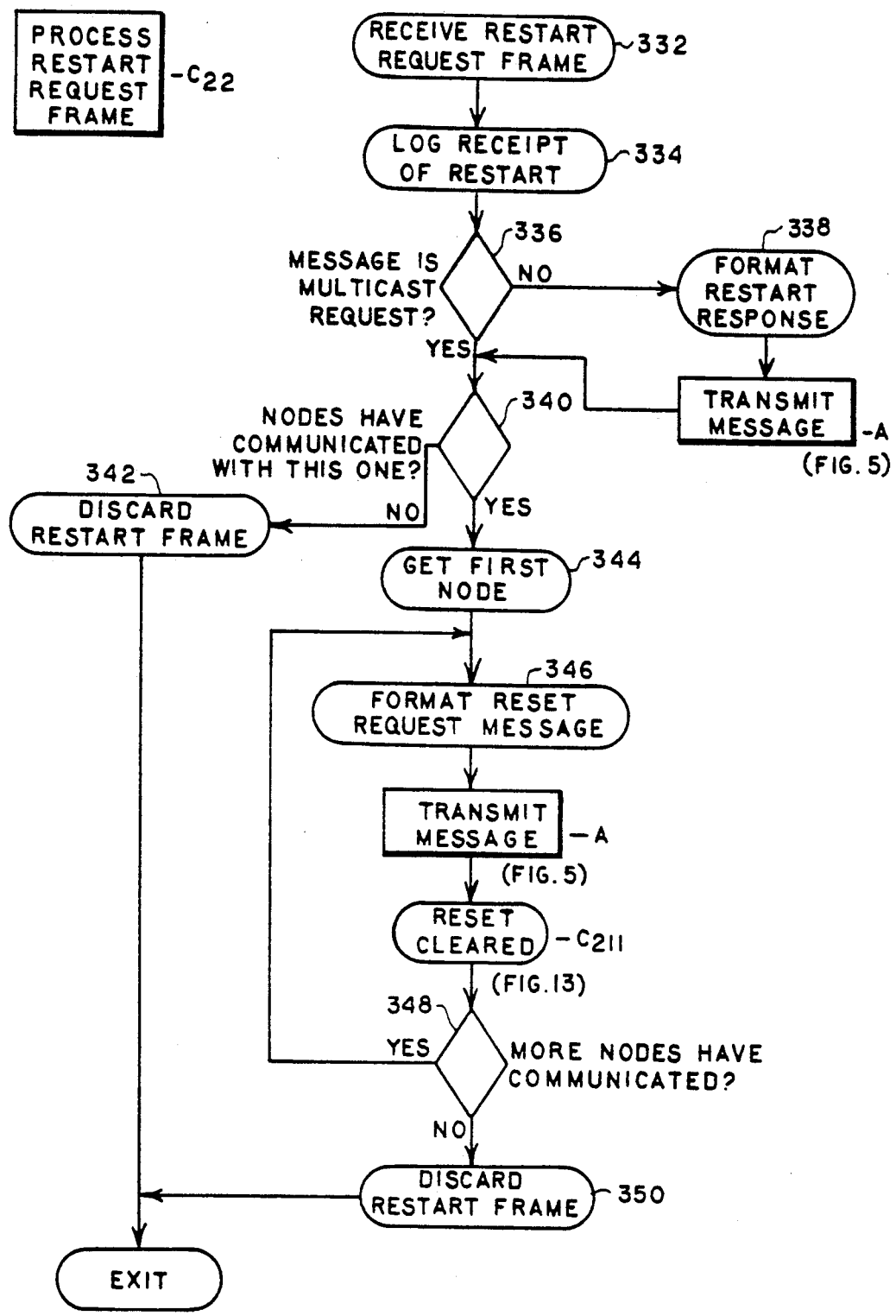
FIG. 14 is a flow diagram illustrating the manner in which the data link stage may be implemented in accordance with the present invention to process a restart request message.

Referring now to FIG. 14, it illustrates the manner in which the data link stage may be implemented in accordance with this preferred embodiment to respond to a received restart request message when the node of the data link stage has not been previously suspended. This portion of the data link stage in step 332 receives the restart request message and then logs receipt of the restart request message in step 334. In step 336, the data link stage next determines whether the restart request message is a multi-cast or broadcast. If it is not, the data link stage in step 338 formats an acknowledgement to the restart request message and then transmits the response to the restart request message in accordance with the procedure as previously disclosed with respect to FIGS. 5 through 7.

After the response has been transmitted to the node originating the restart request message or if the restart request is a broadcast message, the data link stage in step 340 determines if it has communicated with any other nodes prior to receipt of the restart request message. If it has not, it discards the restart request message in step 42 and exits. If it has, it obtains from its storage in step 344 the address of the first node in its list and then in step 346 formats a reset request message to that node. It then transmits the message and enters into the reset clean-up routine as previously described with respect to FIG. 13. After the reset clean-up, the data link stage in step 348 determines whether there are any other nodes that it had communication with prior to the receipt of the restart request frame. If there are no other nodes, it discards the restart request message in step 350 and exits. If it had, it then repeats the steps immediately described for sending reset messages to all of the nodes to which it had communicated with prior to the receipt of the restart request message one at a time in succession until a reset message has been sent to all such nodes.

Figure 15:
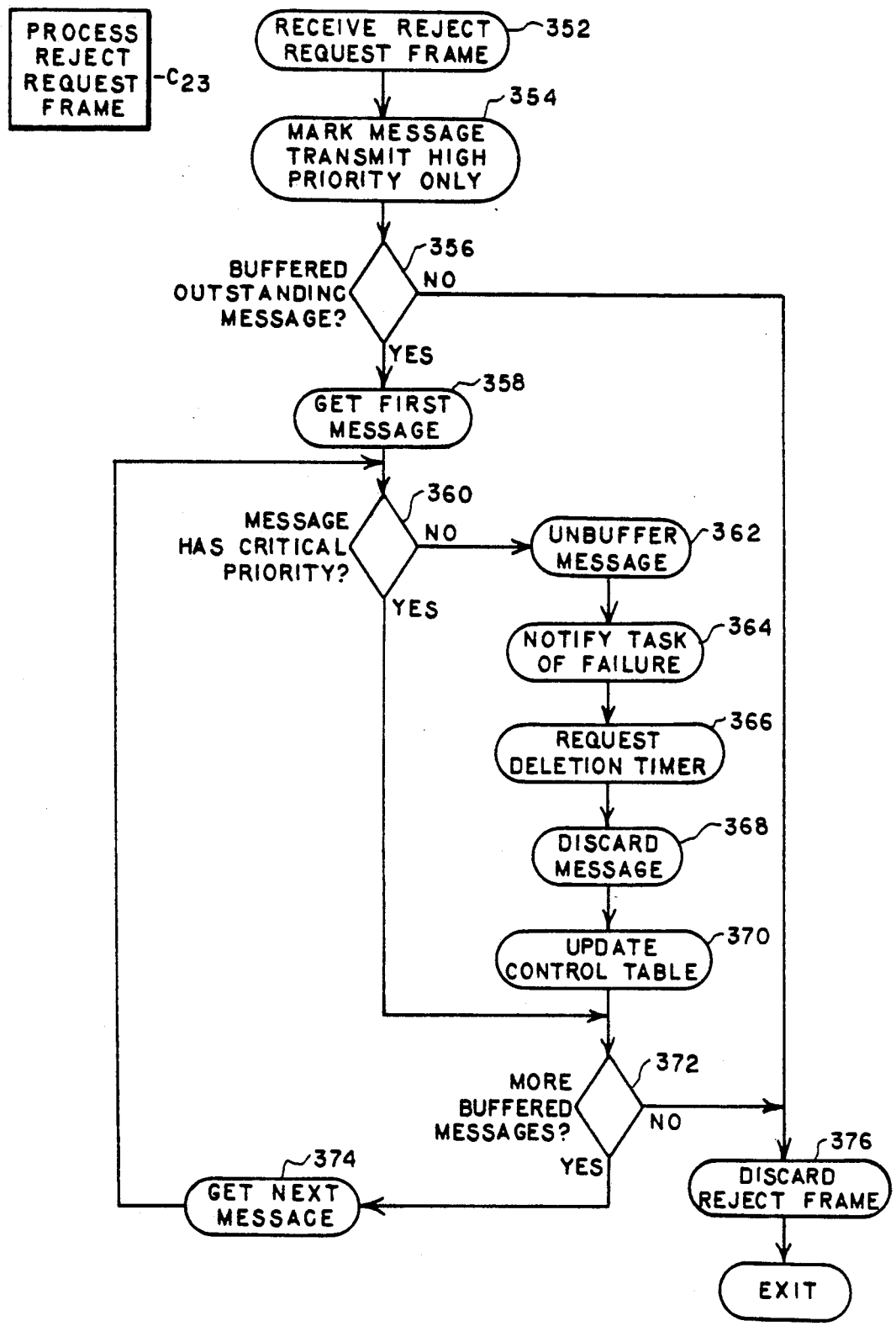
FIG. 15 is a flow diagram illustrating the manner in which the data link stage may be implemented in accordance with the present invention to process a reject request message.

Referring now to FIG. 15, it illustrates the manner in which the data link stage is implemented in accordance with this preferred embodiment for processing a reject request message. This portion of the data link stage receives the reject request message at step 352. As previously mentioned, a reject message informs the receiving node that the node originating the reject request message has stored the maximum number of received messages in its buffer pool and is able to process only high priority or critical messages. As a result, in step 354, the data link stage marks in its table which contains the addresses of all of the nodes in the network that the node originating the reject request frame is only receiving high priority or critical messages.

The data link stage next in step 356 determines if there are any buffered outstanding messages. If there are none, it will discard the reject request frame in step 358 and exit. If there are buffered outstanding messages, the data link stage will obtain the buffer pool storage address of the first such buffered message from the timer manager in step 358.

In the next series of steps, the data link stage will separate the critical-priority messages which have been stored for transmission to the node originating the reject request message from the non-critical priority messages which it has stored for transmission to the node originating the reject request message. To that end, the data link stage in step 358 obtains from the timer manager the buffer pool storage address of the first such message. It will then determine in step 360 from the header of the message if the message is of critical priority. If it is not of critical priority, the data link stage in step 362 will clear the message and then in step 364 notify the local task or application module originating the message that the message could not be transmitted.

The data link stage next in step 366 requests the timer manager to delete the timer which it had associated with the message which was cleared in step 362. After the associated timer is deleted, the data link stage will discard the message in step 368 and then in step 370 will update its control table to remove the discarded message from its control table. The data link stage then in step 372 determines if there are any other messages which are stored for transmission to the node originating the reject request frame. If there are not any, it will then discard the reject frame in step 376 and exit. If there are more stored messages to be transmitted to the node originating the reject request message, the data link stage then in step 374 obtains from the timer manager the buffer pool storage address of the next such stored message. If in step 360 the data link stage determines that this message has critical priority, it will skip steps 362 through 370 to retain the critical priority message in its buffer pool for later transmission. Later, in its turn, the data link stage will then transmit the critical priority messages to the node originating the reject request message in a manner as previously described with reference to FIGS. 5 and 6.

Figure 16:
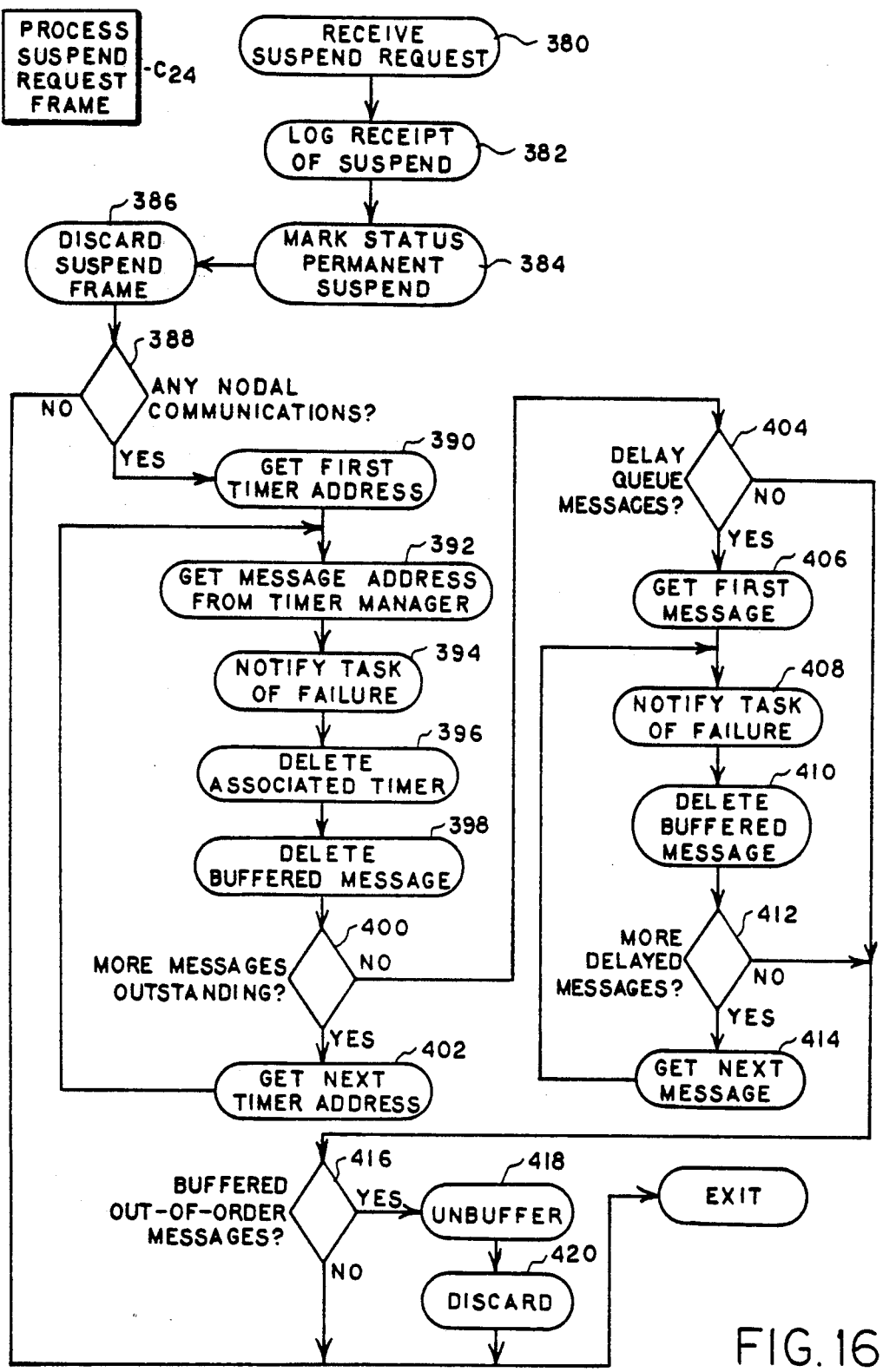
FIG. 16 is a flow diagram illustrating the manner in which the data link stage may be implemented in accordance with the present invention to process a suspend request message.

Referring now to FIG. 16, it illustrates the manner in which the data link stage is implemented in accordance with this preferred embodiment to process a suspend request message. Such a suspend request message may be originated from a maintenance operator for example, and allows a node to be taken off of the bus without physically disconnecting the node from the bus. As will be seen hereinafter, the data link stage, in response to the suspend request frame, precludes its node from transmitting any more messages onto the bus by clearing all of its memory of messages to be transmitted. It also clears messages received out of order from other nodes.

The data link stage receives the suspend request message in step 380. It logs receipt of the suspend message in step 382 and marks in its storage the permanent suspension status of its node in step 384. Then, in step 386, the data link stage discards the suspend frame.

The data link stage then, in step 388, determines if it had communicated with any other node prior to receiving the suspend request message. If it had not, then it exits. If it had, the data link stage in step 390, obtains from its storage the first timer address for a message to be transmitted and uses that timer address to obtain from the timer manager the buffer pool storage address of the first message in step 392. From the header of the message, the data link stage in step 394 notifies the local task or application module that originated the message that the message could not be transmitted. The data link stage then determines in step 400 if there are any more such messages and if there are, it obtains from its storage the timer address of the next message in step 402.

If there were no more messages outstanding, the data link stage then in step 404 determines if there are any messages which were stored for delayed transmission. If there are such stored messages for delayed transmission, the data link stage obtains the address of the first message in step 406, and thereafter in step 408 notifies the local task or application module which originated that message that it could not be transmitted. The data link stage then, in step 410, deletes the stored message and then in step 412 determines if there are any other such messages which were stored for delayed transmission. If there are additional messages which were stored for delayed transmission, the data link stage in step 414 obtains their addresses and repeats step 408 through 412. When all of the message which were stored for delayed transmission have been cleared from the buffer pool, the data link stage then in step 416 determines whether there are any stored messages in the buffer pool which were received out of order from other nodes. Step 416 is also performed immediately after step 404 if there were no messages stored in the buffer pool for delayed transmission.

If there are messages stored in the buffer pool which were received out of order from other nodes, the data link stage then deletes those messages from the buffer pool in step 418. Thereafter, in step 420, the data link stage discards those messages. If there were no messages stored in the buffer pool which were received out of order from other nodes, then the data link stage will have immediately exited and would not have performed steps 418 and 420.

Figure 17:
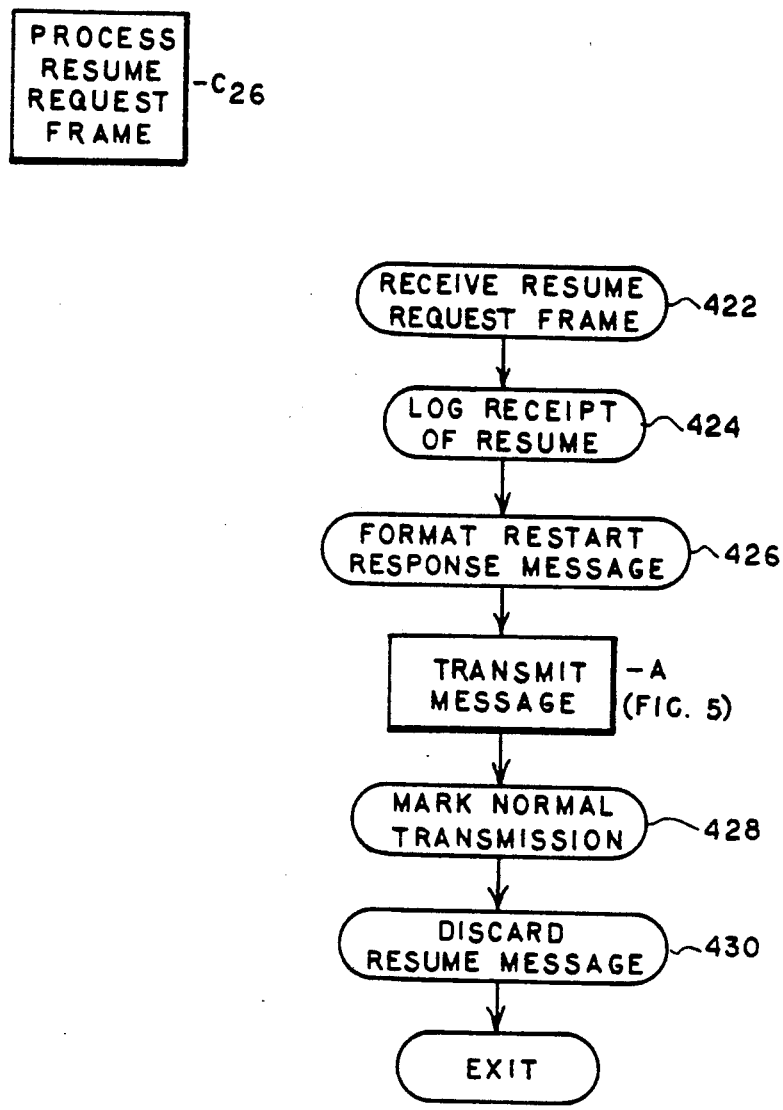
FIG. 17 is a flow diagram illustrating the manner in which the data link stage may be implemented in accordance with the present invention to process a received resume request message.

FIG. 17 illustrates the manner in which the data link stage is implemented in accordance with this preferred embodiment to process a resume request message. Such a message may be received from a node which had previously originated a reject message. The purpose of the resume request message is to enable a node which previously sent a reject message to notify the data link stage that its buffer pool is no longer filled with the maximum number of stored received messages and is able to process all types of messages.

This portion of the data link stage receives the resume request message in step 422. In step 424, the data link stage logs the receipt of the resume request message and then in step 426 formats an acknowledgement of the receipt of the resume request message. The data link stage then transmits the acknowledgement message in a manner as described previously with respect to FIGS. 5 through 7. The data link stage then in step 428 marks normal transmission in its storage, discards the resume request message in step 430 and then exits.

Figure 18:
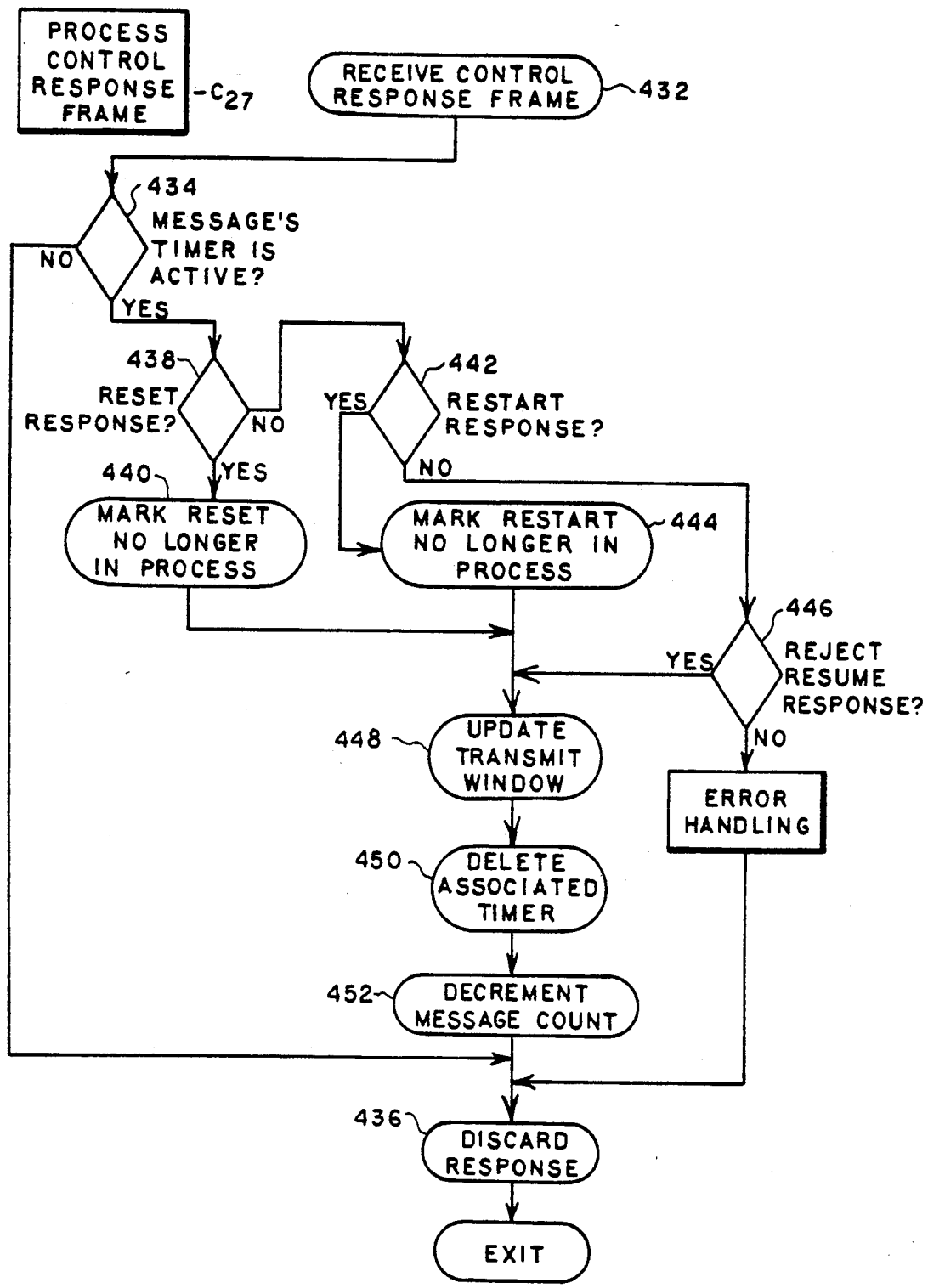
FIG. 18 is a flow diagram illustrating the manner in which the data link stage may be implemented in accordance with the present invention to process a received control response message.

FIG. 18 illustrates the manner in which the data link stage is implemented in accordance with this preferred embodiment to process a control response message. This portion of the data link stage receives the control response message acknowledging receipt of a control frame or message in step 432. In step 434, the data link stage then determines if the timer associated with the original control message to which this response is an acknowledgement is active. If that timer is not active, the data link stage in step 436 discards the response message and exits. If the message timer is active, the data link stage then in step 438 determines if the control response message is a reset response. If it is, the data link stage in step 440 marks that the reset is no longer in progress. If the control response message is not a reset response, the data link stage then determines in step 442 if the control response is a restart response. If it is a restart response, the data link stage then in step 444 marks that the restart is no longer in progress. If the control response is neither a reset response nor a restart response, the data link stage in step 446 determines if the control message is a reject/resume response. If the control message is a reject/resume response, or if the data link stage has marked that either the reset or restart is no longer in progress, the data link stage then in step 448 updates its eight consecutive frame transmit window. It then in step 450 causes the timer manager to delete the timer associated with the original control message which resulted in the receipt of the control response message. The data link stage then in step 452 decrements the message count to reduce its record of number of unacknowledged transmitted messages by one count. It then discards the control response frame in step 436 and exits.

If the control response frame was not a reset response, a restart response or a reject/resume response, the data link stage then goes through an error handling routine. After the error handling routine, it exits.

Figure 19:
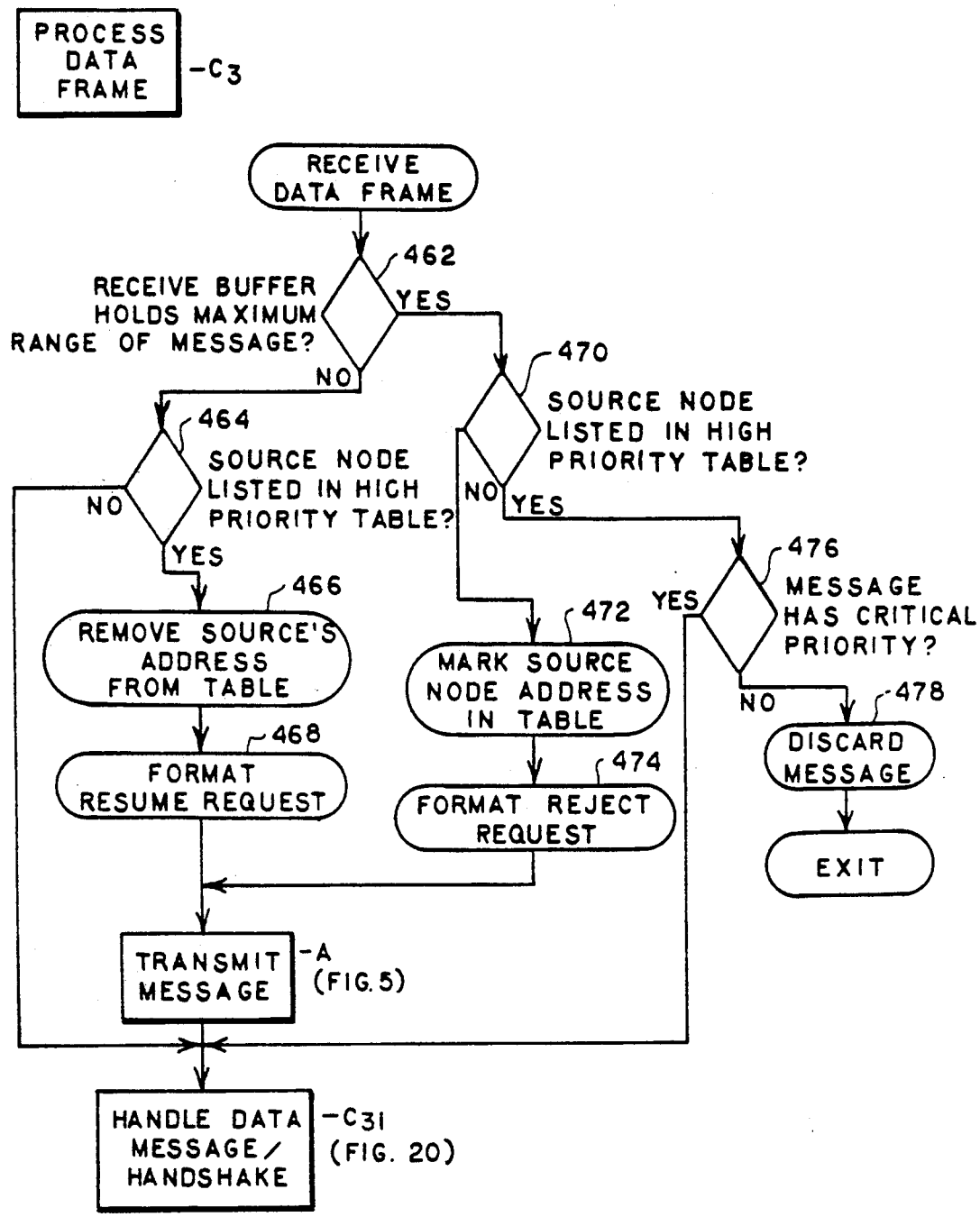
FIG. 19 is a flow diagram illustrating the manner in which the data link stage may be implemented in accordance with the present invention for limiting the number of messages which its node can process at any one time.

FIG. 19 illustrates the manner in which the data link stage is implemented in accordance with this preferred embodiment to process a received data message. This portion of the data link stage receives the data message in step 460. The data link stage in step 462 then determines if its buffer for storing received messages in the buffer pool holds the maximum number of messages. If it does not, the data link stage in step 464 determines if the source node of the data message is listed in its high-priority table. The high-priority table is provided for listing the addresses of those nodes which sent data messages to the node of the data link stage under consideration after the data link stage buffer reached the maximum number of stored received messages. If the node which originated the data message is not in that table, the data link stage will handle the data message and confirm receipt of the data message in a manner to be described immediately hereafter with respect to FIG. 20. if the source node is listed in the table, the data link stage in step 466 will remove the source node's address from the table and then in step 468 format a resume request since it had previously sent to that node a reject request. The data link stage will then transmit the resume request in a manner as previously described with respect to FIGS. 5 through 7 and then handle the data message and confirm receipt thereof as will be described subsequently.

If the data link receive buffer holds the maximum range of messages, the data link stage then determines in step 470 if the source node of the data message is listed in its high-priority table. If it is not, it lists the node's address in the high-priority table in step 472 and in step 474 formats a reject request message to be transmitted to the source node. When the source node receives the reject request message, it will be advised that only critical priority messages are being processed by this node and that it should not send any messages to this node other than critical priority messages. As a result, the data link stage includes limiting means for limiting the number of received messages that the node can process at any one time. When the buffer pool has stored the maximum number of received messages, the data link stage will send out reject messages to those nodes which are sending data messages to it to inform those nodes that only critical priority messages are being handled. The addresses of the nodes to which a reject message was sent are recorded in the data link high priority table so that once the buffer pool memory no longer holds the maximum number of received messages, the data link stage may format a resume request to those nodes when those nodes send another message to this node.

If the source node is listed in the high-priority table as determined in step 470, the data link stage in step 476 will determine if the received message has critical priority. Once again, the data link stage may determine whether the received message has critical priority from the message header. If it has critical priority, then the data link stage proceeds to handle the data message. If it does not have critical priority, the data link stage discards the message in step 478 and then exits.

Figure 20:
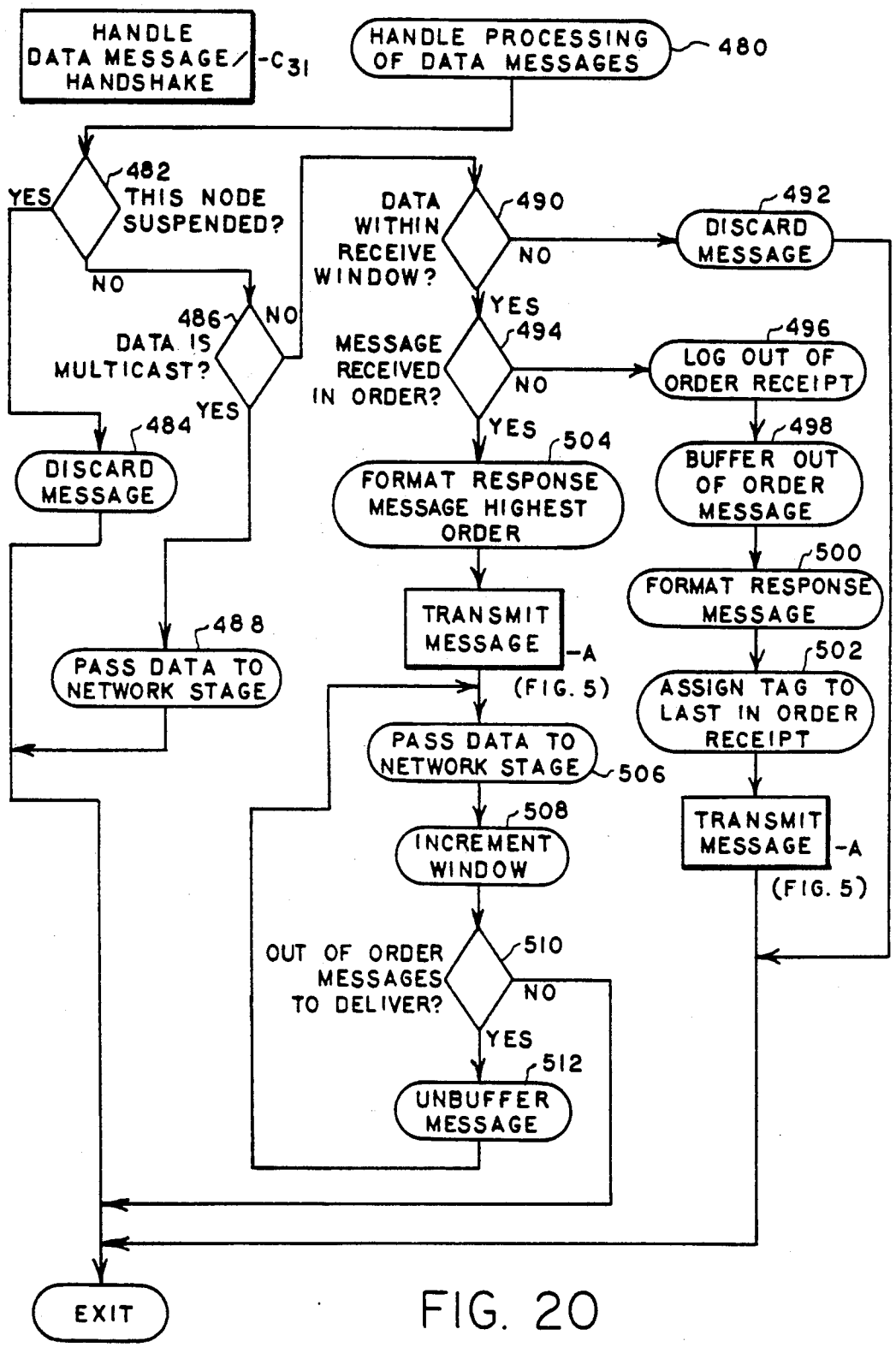
FIG. 20 is a flow diagram illustrating the manner in which the data link stage may be implemented in accordance with the present invention to process a received data message and provide acknowledgement therefor.

FIG. 20 illustrates the manner in which the data link stage may be implemented in accordance with this preferred embodiment for handling received data messages and confirming receipt of the data messages. This portion of the data link stage receives the data message in step 480. It then determines in step 482 if its node is suspended. If its node is suspended, it will discard the message in step 484 and then exit.

If its node is not suspended, the data link stage in step 486 then determines if this is a broadcasted data message or not. If it is a broadcasted data message, the data link stage in step 488 will transfer the data message to the network module and exit. If the data message is not a broadcasted message, the data link stage then determines in step 490 if the data message is received within its eight consecutive frame window. If it is not, the data link stage in step 492 will discard the message and exit. If however the data message is received within the data link's received window, the data link stage will determine in step 494 if the message has been received in order. If the message has not been received in order, it will log in step 496 that the message was received out of order. In step 498, the data link stage will store the out of order message in the buffer pool. Next, in step 500, the data link stage will format a response message to acknowledge receipt of the last in-order message. The acknowledgement message in step 502 is then given a frame number in the message header corresponding to the last in-order received message and then the acknowledgement message is transmitted in a manner as previously described with respect to FIGS. 5 through 7. The acknowledgement message relates to the last in-order received message to advise the transmitting node that a message thereafter was received out of order. The data link stage then exits.

If in step 494, it was determined that the message was received in order, the data link stage formats a response for the highest-ordered message received to advise the transmitting node that all of its messages had been received in order. This is performed in step 504. The acknowledgement message is then transmitted in a manner previously described with respect to FIGS. 5 through 7. In step 506, the data link stage passes the data message to the network stage and then in step 508 increments its eight consecutive frame receive window. In step 510, the data link stage then determines if there are any out of order messages to deliver to the network stage now that the last data message has been received. If there are no such out of order messages to deliver, the data link stage exits. If there are such messages, the data link stage in step 512 will unbuffer the first such message and then proceed to step 506 to pass that data message to the network stage. Steps 508 through 512 are repeated until all out of order messages have been delivered. As a result of the foregoing, when the data link stage receives a message out of order, it will buffer it, but not deliver it to the network stage. When the missing message is received, the data link stage then acknowledges the highest-ordered message received to advise the transmitting node that it has received all of its messages. Once all of the messages are received and in proper order, the data link stage then passes the received messages to the network stage for the ultimate conveyance to the appropriate application modules coupled to the network control system.

THE NETWORK STAGE

Figure 21:
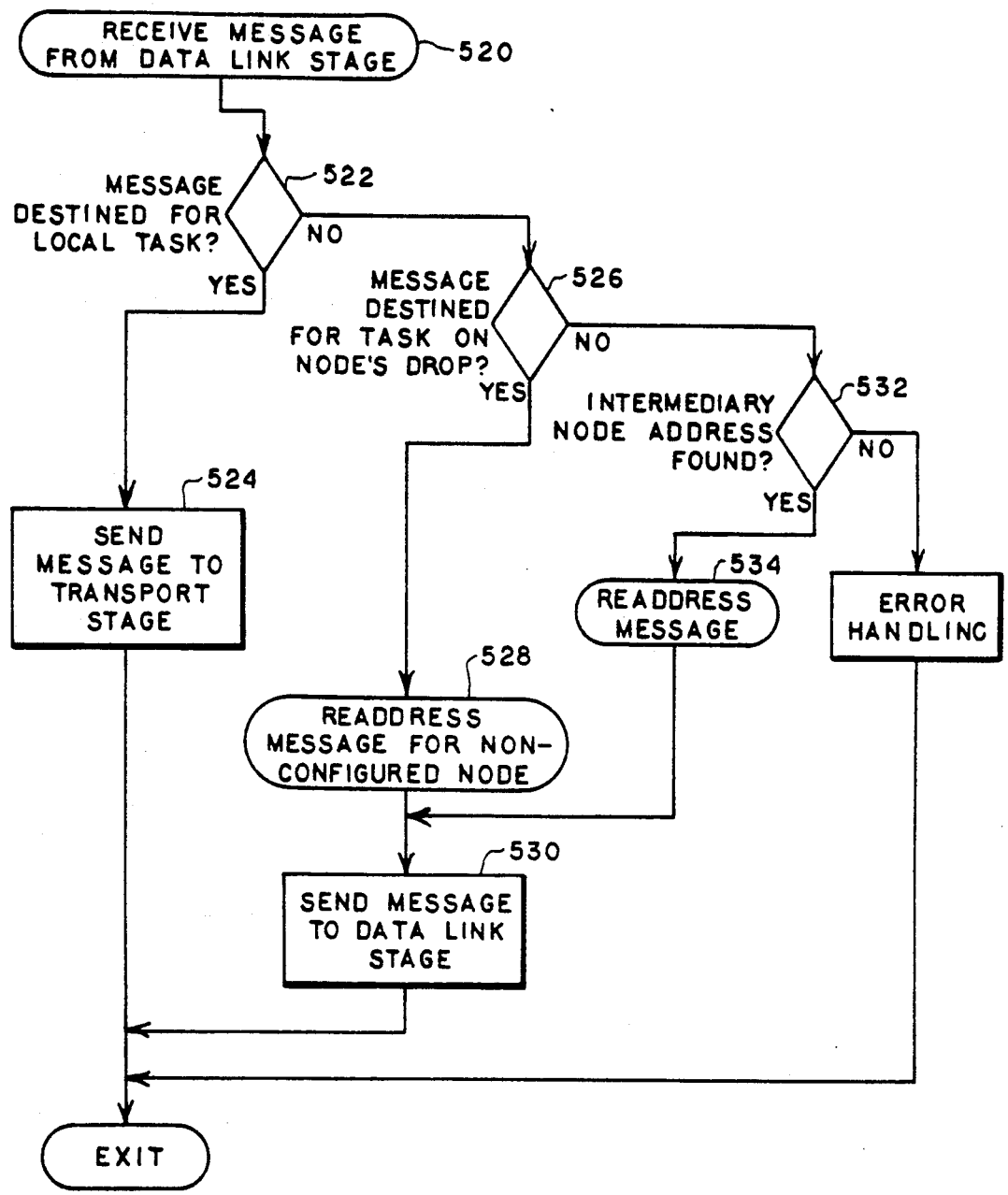
FIG. 21 is a flow diagram illustrating the manner in which the network stage of FIG. 3 may be implemented in accordance with the present invention to process a received message transferred to it by the data link stage.
Figure 22:
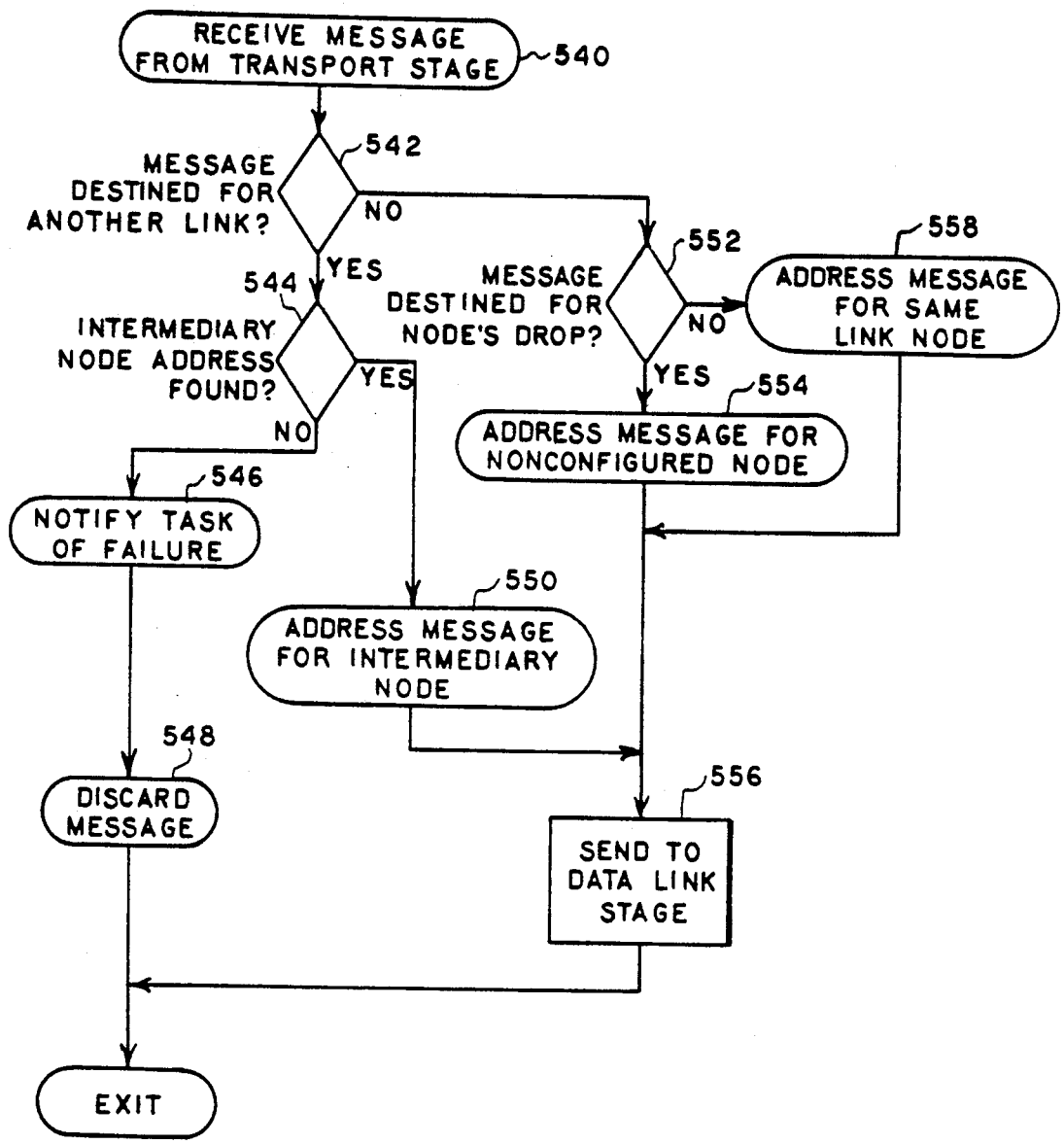
FIG. 22 is a flow diagram illustrating the manner in which the network stage may be implemented in accordance with the present invention to process a message to be transmitted onto the bus which it receives from the transport stage of FIG. 3.

FIGS. 21 and 22 illustrate the manner in which the network stage 84 of FIG. 3 is implemented in accordance with the present invention for establishing the routing of messages to be transmitted onto the bus. FIG. 21 particularly illustrates the manner in which the network stage processes messages received from the data link stage and FIG. 22 illustrates the manner in which the network stage processes messages received from the transport stage.

Referring now to FIG. 21, the network stage receives a message from the data link stage in step 520. In step 522, the network stage first determines from the message header if the message is destined for a local task or application module coupled to its network control system. If the message is destined for a local task or application module, the network stage, in step 524, sends the associated message address to the transport stage and then exits.

If the message is not destined for a local task or application module, the network stage then determines in step 526 if the message is destined for a task on its nodes' drop. A node drop is a non-configured device which may be coupled to the network control system for performing, for example, diagnostic services. Such a device is considered non-configured because it is not a permanent member of the network. However, the network stage routing table will be updated with the address of the non-configured device as a separate node address. This facilitates the network stage re-addressing the message in step 528 for the non-configured node. Thereafter, in step 530, the network stage sends the message to the data link stage and then exits.

If the message is not destined for a local application or is not a message destined for a task on the node's drop, it may be that this node is an intermediary node, receiving the message for the purpose of transmitting the message as an intermediate source to the final destination of the message. In step 532, the network stage determines from the message header if its node is an intermediary node. If the network stage finds its address in the message header as an intermediary node, it will then readdress the message in step 534 for the next node to receive the message and then sends the message to the data link stage in step 530. The next node may be either another intermediary node or the address of the node for which the message is ultimately destined. If the network stage is addressing the message for another intermediary node, it will insert its node's address into the header as an intermediary source. If the new address is for an intermediary node, the network stage will insert into the header the next nodes' address as an intermediary node. If the new address is for the node for which the message is ultimately destined, the network stage will also place that node address into the header as an intermediary node in accordance with the convention previously described.

If the message is not destined for a local application module as determined in step 522, and is not a message destined for a task on the node's drop as determined in step 526, and if the network stage's node is not an intermediary node as determined in step 532, the network stage will then go to an error handling routine and exit.

FIG. 22 illustrates the manner in which the network stage processes a message received from the transport stage 86 in accordance with this preferred embodiment. The network stage receives the message from the transport stage in step 540. The network stage next determines in step 542 from the message header if the message is destined for another link. If the message is destined for a node on another link, the network stage will then determine in step 544 from its routing table the intermediary node address to which the message must first be sent before it is ultimately transmitted to the destined node. If, in step 544, the network stage is unable to find an intermediary node address in its routing table, the network stage will then in step 546 notify the application module originating the message of the failure of being able to transmit the message. The network stage will then, in step 548, discard the message and then exit.

If the network stage in step 544 is able to determine the intermediary node address from its routing table, it addresses the message for the intermediary node in step 550 and then sends the message to the data link stage. As mentioned previously, when the network stage addresses a message for an intermediary node, it inserts that address into the header as an intermediary address and inserts its node's address as an intermediary source into the header.

If the message is not destined for a node on another link as determined in step 542, the network stage will then determine in step 552 if the message is destined for one of its node's drop. If it is, the network stage will address the message for the non-configured node from its routing table in step 554 and then send the message to the data link stage in step 556.

If the message is not destined for another link as determined in step 542, nor destined for the node's drop as determined in step 552, the message then must be destined for a node on the same link. As a result, the network stage will, in step 558, address the message for the node on its same link. The network stage will then send the message to the data link stage in accordance with step 556 and then exit.

As can be seen from the foregoing, the network stage serves to route messages which it receives either from the data link stage 82 or from the transport stage 86. The network stage either addresses the messages for an intermediary node or to the final destination node address for a node on its same link. In this manner, messages are sent from one node to another in hops until a message is finally addressed by one of the nodes for the destined node. In this manner, the network control system is able to establish virtual connections between nodes without establishing actual connections between nodes as is performed in connection-oriented networks. Reliability is still provided, however, by virtue of the point-to-point confirmation of receipt of messages by the data link stages and, as will be more apparent hereinafter, the end-to-end confirmation of message receipt by the transport stages.

THE TRANSPORT STAGE

FIGS. 23 through 33 illustrate the manner in which the transport stage is implemented in accordance with this preferred embodiment. As will be seen in greater detail hereinafter, the transport stage is arranged for communicating with transport stages of other network control systems and processes data, supervisory and control messages. The transport stage also provides end-to-end reliability for messages sent from a node on one link to a node on a different link.

Figure 23:
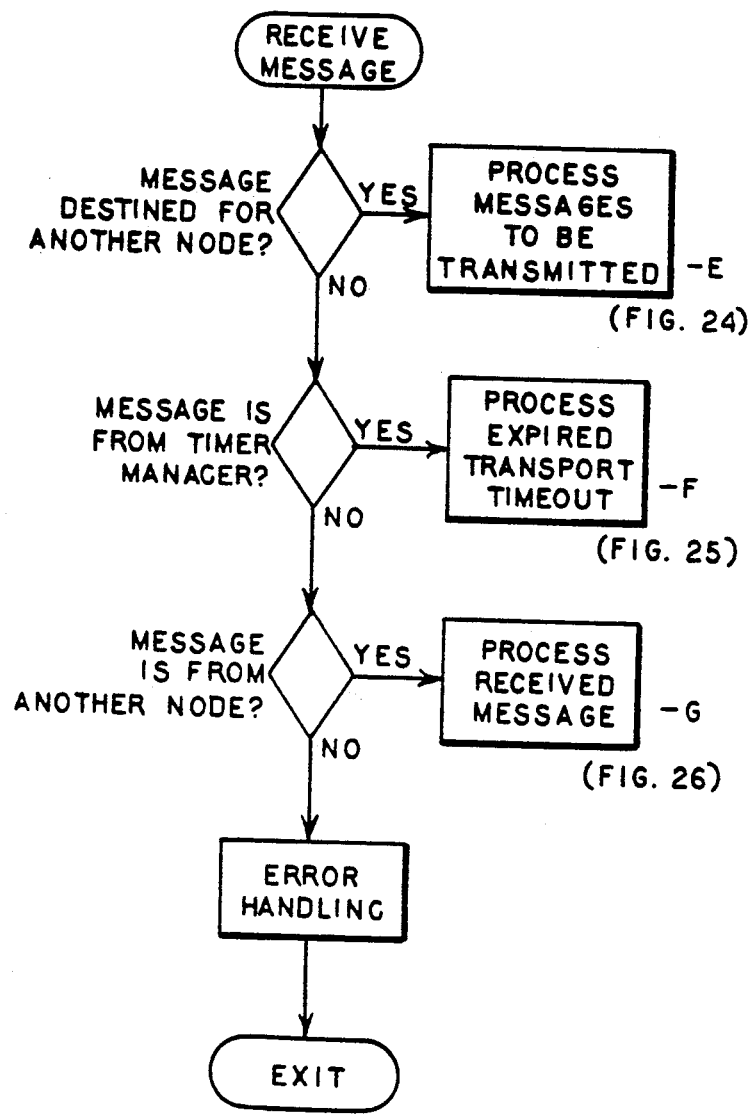
FIG. 23 is a flow diagram illustrating the manner in which the transport stage of FIG. 3 may be implemented in accordance with the present invention.

Referring now to FIG. 23, it illustrates the manner in which the transport stage determines whether a message is destined for another node, is from the timer manager, or is a message received from another node. The transport stage receives a message at step 560. In step 562, the transport stage first determines if the message is destined for another node. If the message is destined for another node, the transport stage will process the message to be transmitted in an manner to be described hereinafter with reference to FIG. 24. If the message is not destined for another node, the transport stage then determines in step 564 if the message is from the timer manager. If the message is from the timer manager, the transport stage will process the message as an expired transport time-out in a manner to be described hereinafter with reference to FIG. 25. If the message is not destined for another node and is not from the timer manager, the transport stage in step 566 then determines if the message is from another node. If the message is from another node, the transport stage processes the received message in a manner to be described hereinafter with respect to FIG. 26. If the message is not destined for another node, is not from the timer manager, or is not a message received from another node, the transport stage will enter into an error handling routine and then exit. The transport stage makes the determinations of steps 562, 564 and 566 from the address information contained within the header of the message.

Figure 24:
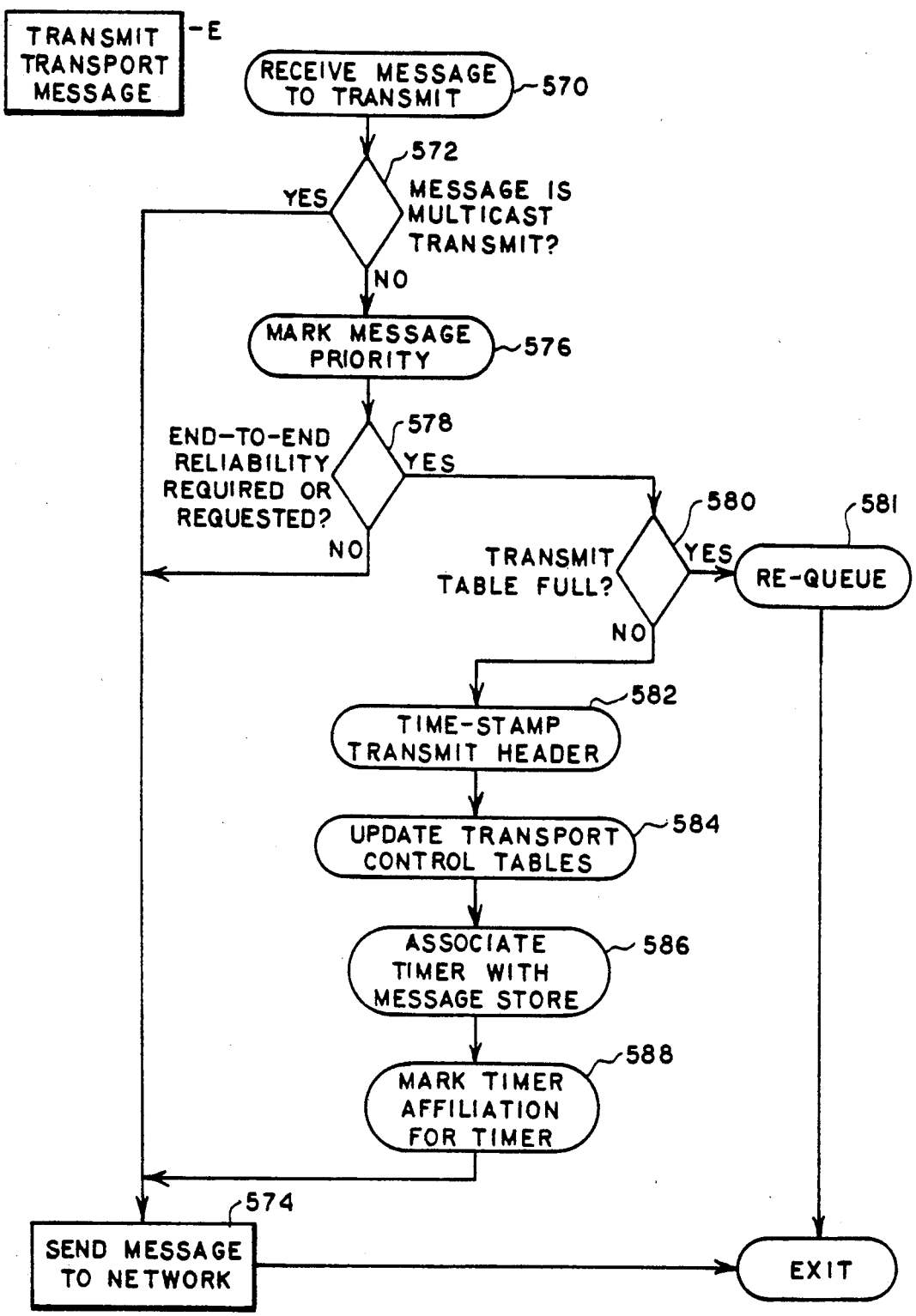
FIG. 24 is a flow diagram illustrating the manner in which the transport stage may be implemented in accordance with the present invention for processing a message to be transmitted.

FIG. 24 illustrates the manner in which the transport stage processes a message to be transmitted from its node. The transport stage receives the message to be transmitted in step 570. In step 572, the transport stage determines from the message header if the message is a broadcast transmission. If it is, services to the message are not required by the transport stage and the transport stage will then send the message in step 574 to the network stage.

If the message is not a broadcast transmission as determined in step 572, the transport stage will then in step 576 mark the message priority in the message header. This marking is dependant upon whether the message is a high priority message such as a control or supervisory message, or a low priority message such as a data message. This information is included into the header of the message by the transport stage.

The transport stage in step 578 then determines if end-to-end reliability is required or requested for the message. If not, the transport stage need not deal with the message further and sends the message to the network stage in accordance with step 574. If end-to-end reliability is to be provided to the message, the transport stage then determines in step 580 if its transmit table is full. Like the data link stage, the transport stage maintains a table in its own storage 86a, which includes a finite number of entries, with each entry including a timer manager entry index for each message to be transmitted and processed by the transport stage and corresponding time-stamps for the message. The time-stamps are utilized for identifying and keeping track of the individual messages.

If the transport stage table is full, the transport stage will re-queue the message in step 581 for later transmission when its transmit table is not full and then exits.

It the transport stage transmit table is not full, the transport stage will time-stamp the message header in the transport section thereof in accordance with step 582, will update its control tables in step 584 to include this message in its transmit table, and then in step 586, will associate a timer with the message. In step 582, the transport stage time-stamps the message header with the time-stamp of the last message sent (referred to herein as an old time-stamp) and the time-stamp of the current message (referred to herein as the new time-stamp) for reasons to be explained later. In associating the timer with the message, the transport stage will request the timer manager to associate a transport timer with the message. As will be seen hereinafter, when the timer manager associates a transport timer with a message, it conveys to the transport stage the transport entry index for the message which the transport stage may utilize in obtaining from the timer manager the buffer pool storage address of the message to be transmitted. After a transport timer is associated with the message, and the transport timer entry index is stored in the transport stage transmit table, the transport stage in step 588 will mark in its transmit table that a timer has been affiliated for use by lower stages, such as the data link stage 82, and then will send the message to the network stage in accordance with step 574. When the message is sent to the network stage, the transport stage then exits.

Figure 25:
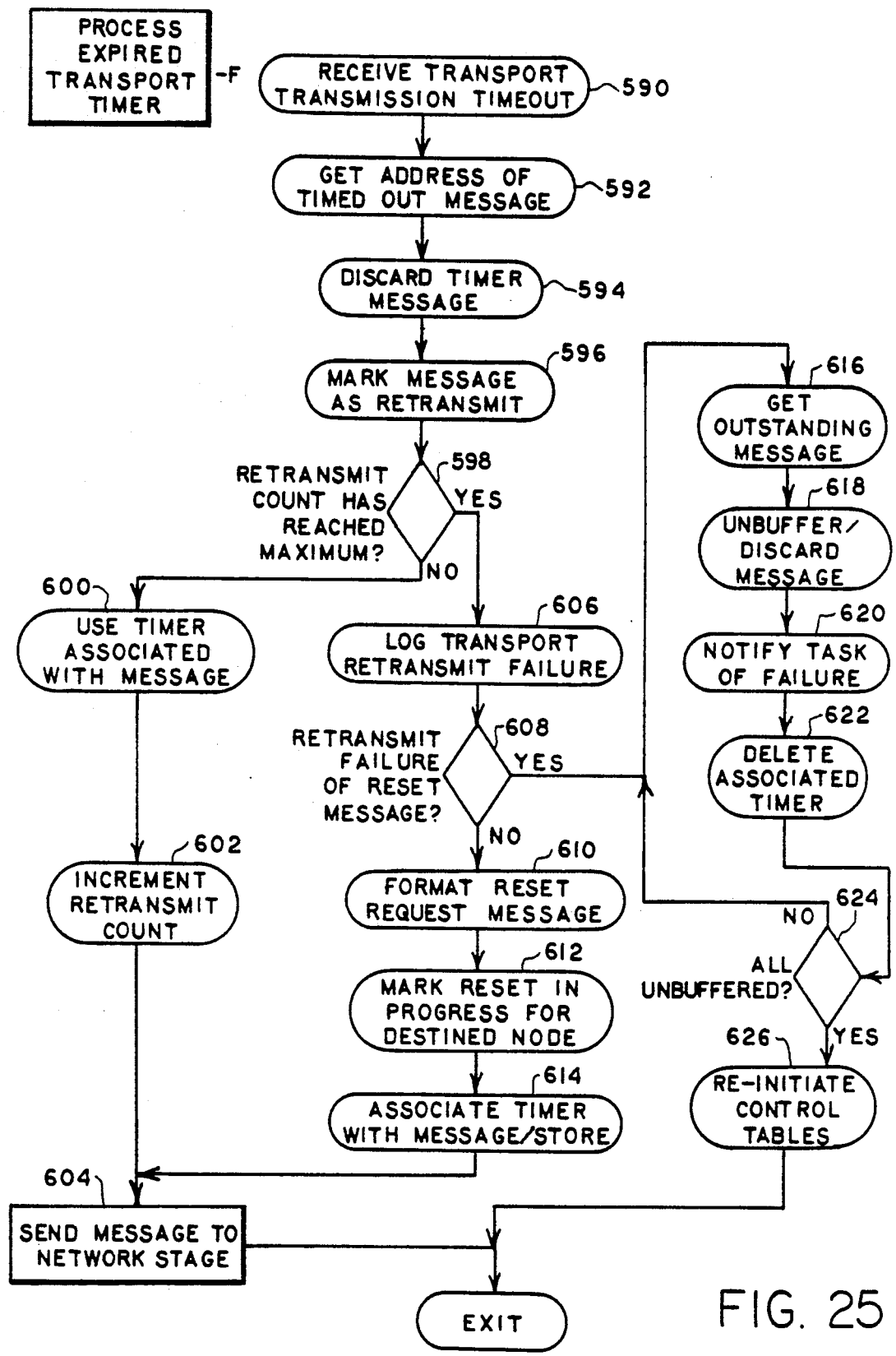
FIG. 25 is a flow diagram illustrating the manner in which the transport stage may be implemented in accordance with the present invention to process an expired transport timer.

Referring now to FIG. 25, it illustrates the manner in which the transport stage is implemented in accordance with this preferred embodiment to process an expired time-out message from the timer manager. The transport stage receives the time-out message at step 590. At step 592, the transport stage then obtains from the timer manager the buffer pool storage address of the timed-out message. The timer manager then, at step 594, discards the time-out message from the timer manager. At step 596, the transport stage marks the message for retransmission and then at step 598, determines whether the retransmission count has reached the maximum number of retransmissions. If the message has not been retransmitted the maximum number of times, the transport stage at step 600 uses the same timer previously associated with the timed-out message. The transport stage then at step 602, increments the retransmit count in its table and then in step 604, sends the message to the network stage to begin the retransmission process.

If, in step 598, the transport stage determines that the message had been retransmitted the maximum number of times, it then at step 606 logs the retransmission failure. It then determines at step 608 if the retransmission failure was due to the retransmission of a reset message. If it was not, it then formats at step 610 a reset request message for the transport stage of the destined node. It then, at step 612, marks that the reset process is in progress with the transport stage of the destined node and then associates in step 614 a new timer with the reset message and stores the timer entry index number in its table. It then sends the reset message to the network stage in step 604 to begin the transmission process of the reset message.

If, in step 608, the transport stage has determined that the retransmission failure was due to the transmission of a reset message, it then causes the timer manager in step 616 to obtain the outstanding message and then causes the timer manager in step 618 to clear the message from the buffer pool. In step 620, the transport stage then notifies the local application module originating the message of the transmission failure and then in step 622, requests the timer manager to delete the associated timer. In step 624, the transport stage then determines whether all messages have been cleared. If not, the transport stage will repeat steps 616 through 622. If all of the messages have been cleared, the transport stage in step 626 re-initializes its control table and then exits.

As can thus be seen, if after the retransmission of a message to a node on a different link a given number of times has not resulted in the transport stage receiving an acknowledgement to the message, the transport stage enters into a reset routine whereby it attempts to reset itself with the transport stage of the destined node. If it is unable to reset itself with the destined node, it then causes all of the unacknowledged messages to the destined node to be cleared from the buffer pool, deletes the associated timers, and then re-initializes its control tables.

Figure 26:
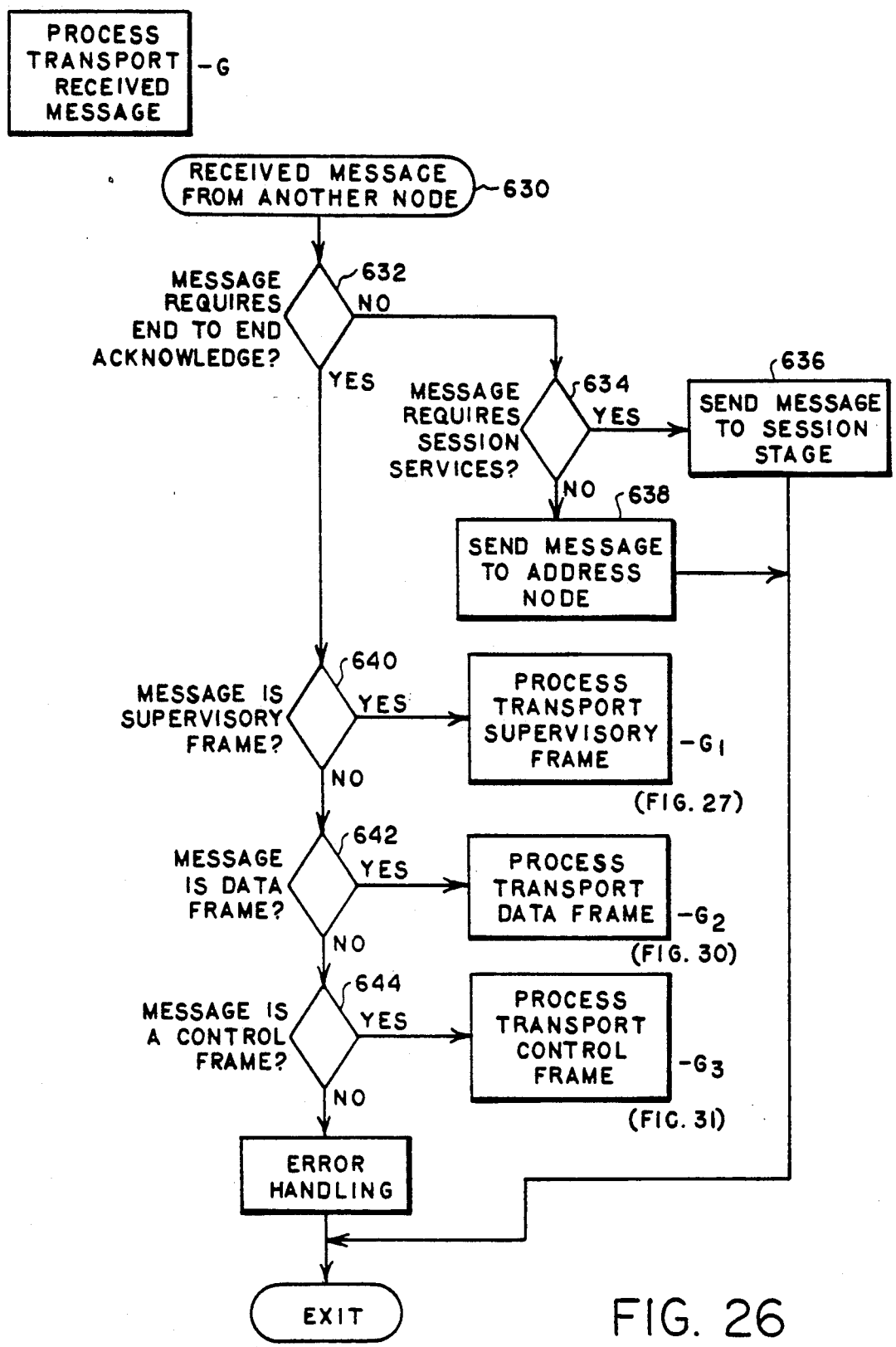
FIG. 26 is a flow diagram illustrating the manner in which the transport stage may be implemented in accordance with the present invention to process a message received from another node.

Referring now to FIG. 26, it illustrates the manner in which the transport stage is implemented in accordance with this preferred embodiment for processing messages received from another node. In this portion of the transport stage, the transport stage determines whether the received message requires end-to-end acknowledgement, whether session services are required for the message, and categorizes the message as either a supervisory message, a data message, or a control message, and processes those different types of message in a manner to be described hereinafter.

The transport stage receives the message from another node at step 630. At step 632, the transport stage determines whether the message requires an end-to-end acknowledge. If it does not, the transport stage then at step 634 determines if the message requires session services. If the message does require session services, it sends the message to the session stage in step 636. If session services are not required, it then sends the message to the appropriate addressed application module in step 638 and then exits.

If the message requires an end-to-end acknowledgement, the transport stage then determines in step 640 if the message is a supervisory frame. If the message is a supervisory message, the transport stage will process the supervisory message in a manner to be described hereinafter with reference to FIG. 27. If the message is not a supervisory message, the session stage then determines in step 642 if the message is a data message. If the message is a data message, it will process the data message in a manner to be described hereinafter with reference to FIG. 30. If the message is neither a supervisory message nor a data message, the transport module then determines in step 644 if the message is a control message. If the message is a control message, the transport stage will then process the control message in a manner to be described hereinafter with reference to FIG. 31. If the message requires an end-to-end acknowledgement and is not a supervisory message, a data message, or a control message, the transport stage then goes into an error handling routine and then exits.

Figure 27:
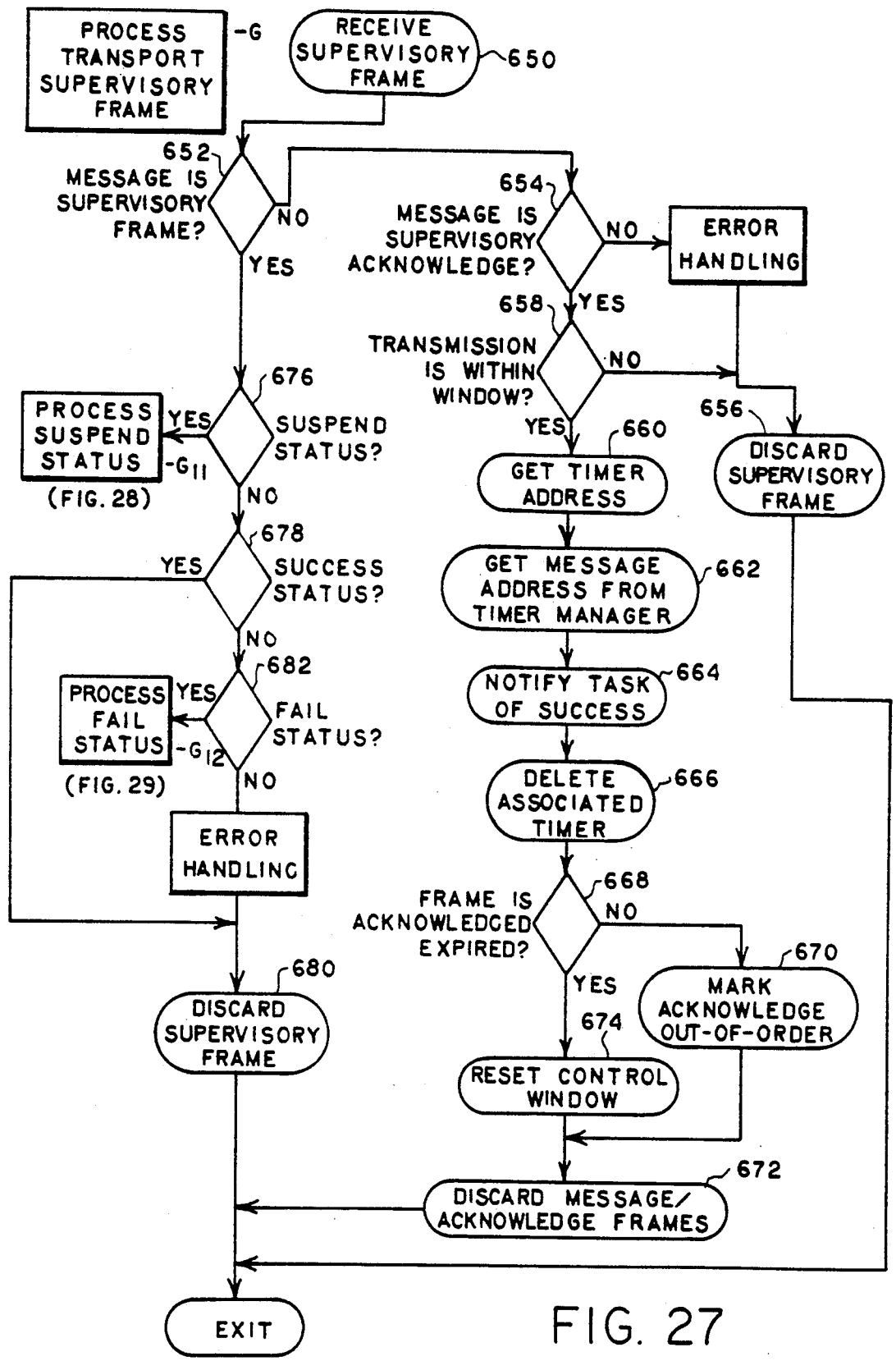
FIG. 27 is a flow diagram illustrating the manner in which the transport stage may be implemented in accordance with the present invention for processing a transport supervisory message.

Referring now to FIG. 27, it illustrates the manner in which the transport stage is implemented in accordance with this preferred embodiment to process a supervisory message. The transport stage receives the supervisory message at step 650. The transport stage first determines at step 652 if the message is a supervisory status message. It performs this determination from the information contained in the message header. If the message is not a supervisory status message, the transport stage then determines in step 654 if the message is a supervisory acknowledgement message. If it is not, the transport stage goes into an error handling routine, discards the message at step 656 and then exits. If the message is a supervisory acknowledgement, it verifies the timestamp in the header of the message in step 658. If it is not, it discards the message and exits. If the message is within its receive window, the transport stage then obtains the timer index entry number of the message from its control table in step 660 and then uses that index number to obtain the buffer pool storage address of the message from the timer manager in step 662. The transport stage then, in step 664, notifies the application module originating the message that the transmission was successfully received by the destined node. In step 666, the transport stage will request the timer manager to delete the timer associated with the acknowledged message. In step 668, the transport stage next determines if the acknowledgement was appropriately timestamped. If not, it marks in step 670 that the acknowledgement was out of order, discards that acknowledgement frame in step 672, and then exits. If the acknowledgement was validated, the transport stage resets its control window in step 674, and then discards the message in accordance with step 672 and then exits.

If, in step 652, the transport stage had determined that the message is a supervisory status message, it then determines in step 676 if the message is a suspend status message. If it is, it will process the suspend status message in a manner to be discribed hereinafter with respect to FIG. 28.

If the message is not a suspend status message, the transport stage then determines in step 678 if the message is a success status message. If it is, it discards the supervisory message in step 680 and exits.

If the message is not a suspend status message or success status message, the transport stage then determines in step 682 if the message is a fail status message. Such a message would be, for example, a message received from the data link stage which the data link stage is conveying to an application module to advise the application module that a point-to-point acknowledgement had not been received for the transmitted message. If the message is a fail status message, the transport stage will process the message in a manner to be described hereinafter with reference to FIG. 29. If the message is not a suspend status message, a success status message, or a fail status message, the transport stage will go into the error handling routine, discard the message in step 680 and then exit.

Figure 28:
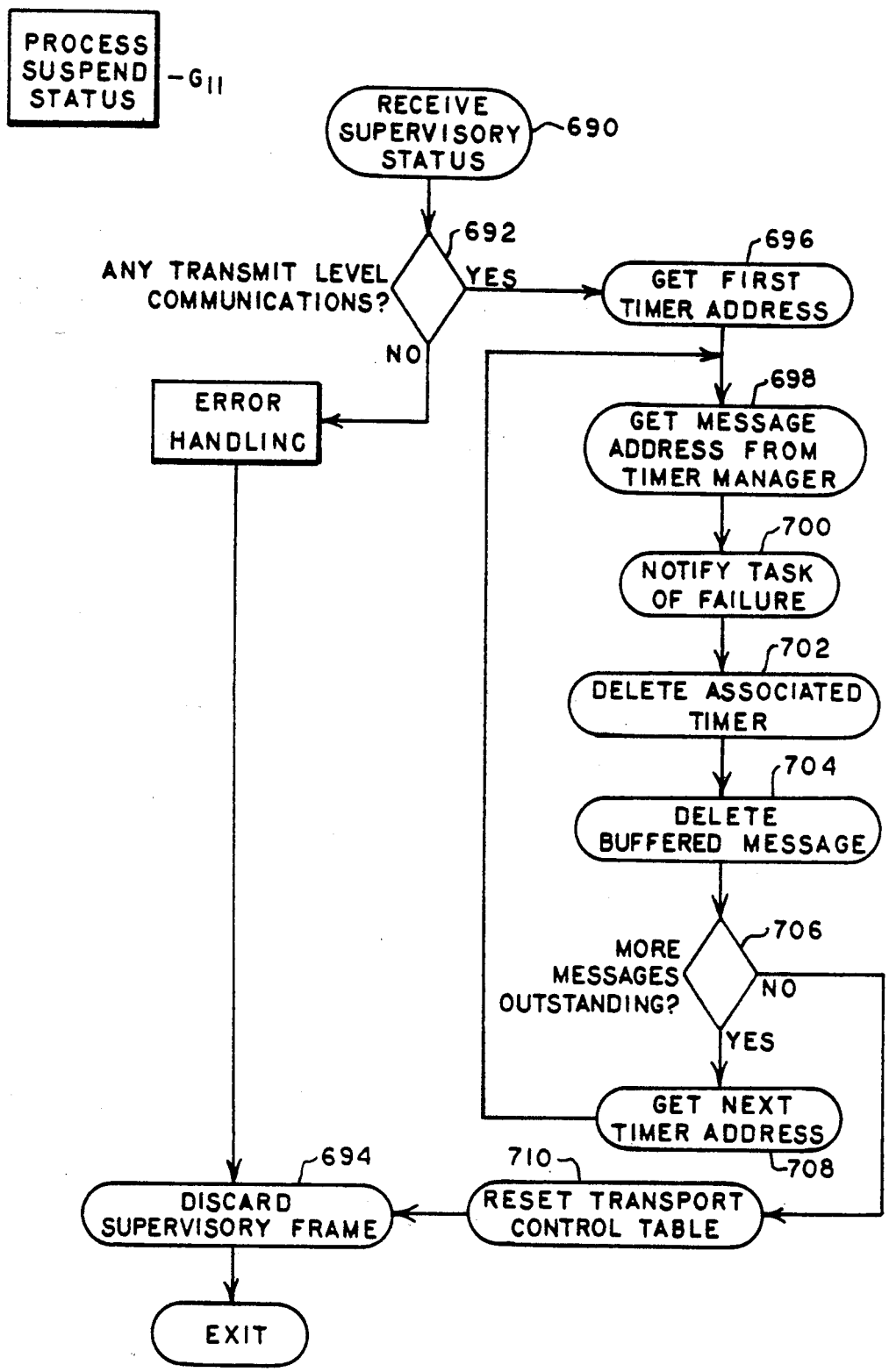
FIG. 28 is a flow diagram illustrating the manner in which the transport stage may be implemented in accordance with the present invention for processing a suspend status message.

Referring now to FIG. 28, it illustrates the manner in which the transport stage is implemented in accordance with this preferred embodiment for processing a suspend status message. The transport stage receives the suspend status message at step 690. It first determines in step 692 if any nodes had been communicated with prior to receiving the suspend status message. The transport stage makes this determination by looking into its control tables to determine if it has stored therein any timer index entries received from the timer manager. If there are no such entries, the transport stage will be advised that it has not communicated with any other transport stage of any other node in the network, and therefore, will go into the error handling routine, discard the supervisory message at step 694 and exit.

If in step 692, the transport stage determines that it had communicated with another node, it will obtain from its look-up table the first timer entry index in the table. The transport stage will then, in step 698, obtain from the timer manager the buffer pool storage address of the message and will notify the application module originating that message in step 700 that there was a failure to transmit the message. The transport stage will then, in step 702, request the timer manager to delete the timer associated with that message, and then in step 704 request the timer manager to clear that message from the buffer pool. The transport stage then in step 706 determines if there are any other such messages outstanding. If there are, it will obtain from its look-up table in step 708 the timer entry index for the next message and then repeat step 698 through 706. When all of the outstanding messages have been treated, the transport stage then, at step 710, resets its control tables, discards the supervisory message at step 694, and then exits.

Figure 29:
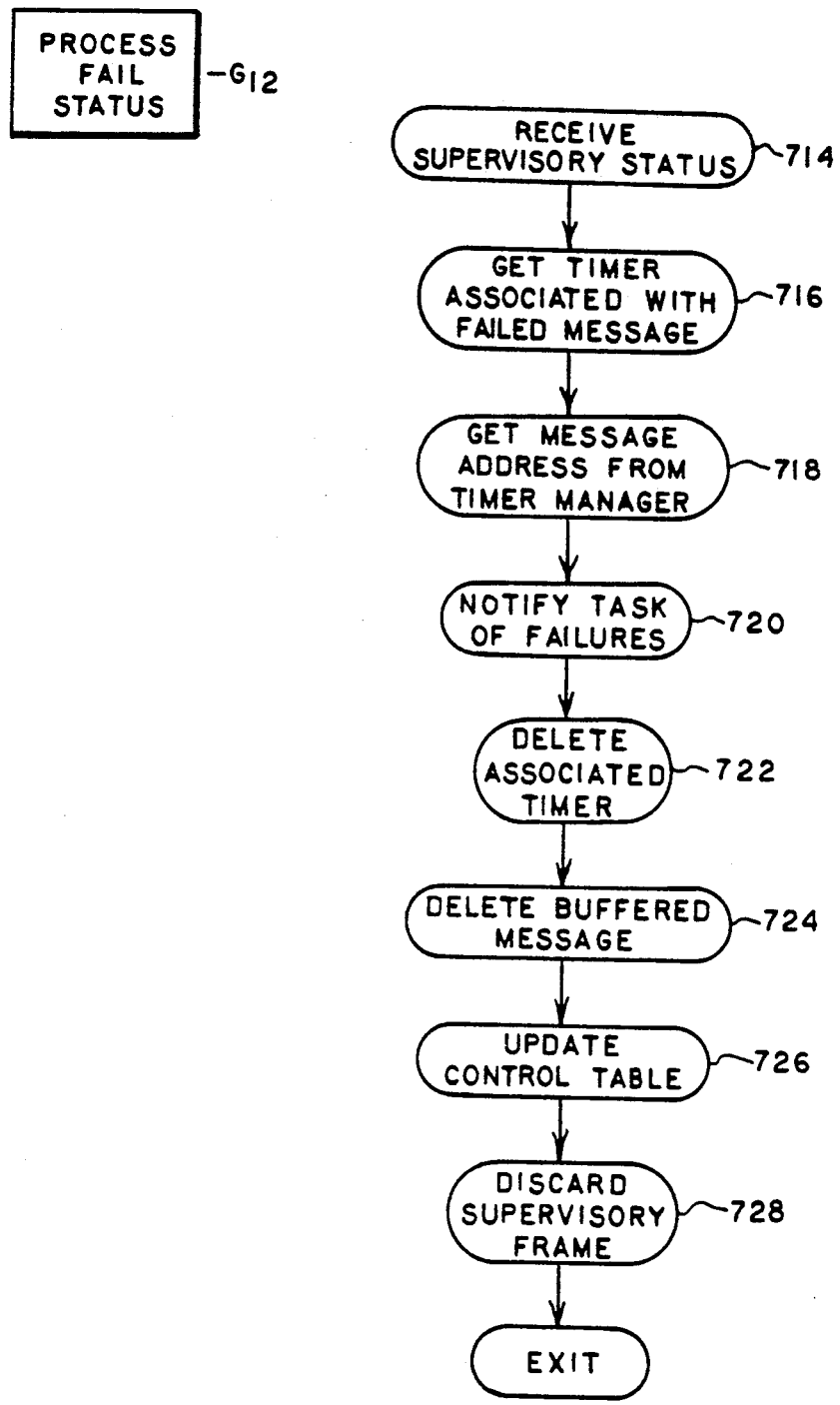
FIG. 29 is a flow diagram illustrating the manner in which the transport stage may be implemented in accordance with the present invention for processing a fail status message.

Referring now to FIG. 29, it illustrates the manner in which the transport stage is implemented in accordance with this preferred embodiment for processing a fail status message. As previously mentioned, a fail status message is a message which is being conveyed from the data link stage to an application module through the transport stage to notify the application module that there was a failure in communicating a message originated by the application module. It is necessary for the transport stage to process the fail status message in as much as if end-to-end confirmation had been requested for the message, the transport stage must delete the timer and perform other operations which result from it having provided services to the message.

The transport stage first receives a fail status message in step 714. The transport stage first at step 716 obtains the timer entry index number from its control table associated with the message and then utilizing that index number, obtains from the timer manager the buffer pool storage address of the message in step 718. The transport stage then notifies the application module originating the message that there was a failure in the transmission at step 720. The transport stage then, in step 722, requests the timer manager to delete the timer associated with that message. The transport stage then, at step 724, requests the timer manger to delete or clear the message from the buffer pool. The transport stage thereafter in step 726 updates its control table, discards the fail status message in step 728 and then exits.

Figure 30:
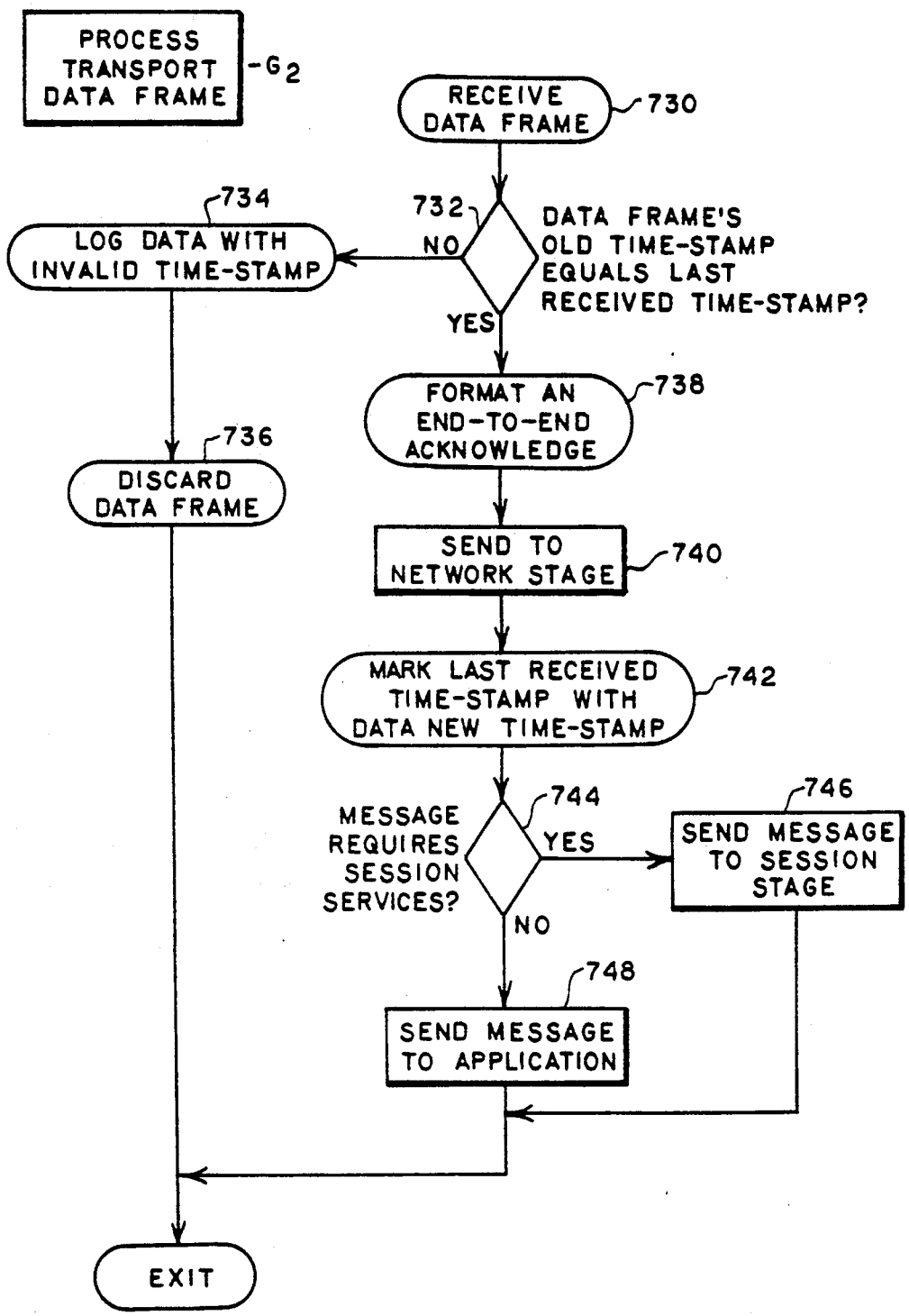
FIG. 30 is a flow diagram illustrating the manner in which the transport stage may be implemented in accordance with the present invention to process a received data message.

Referring now to FIG. 30, it illustrates the manner in which the transport stage is implemented in accordance with this preferred embodiment for processing a received data message. The transport stage receives the data message at step 730. When a message is sent which utilizes transport stage services, the transport stage of the sending node will include in the header of the message two time-stamps. The first time-stamp will be the time-stamp of the last message sent to the receiving node and the second time-stamp will be the time-stamp of the instant message. When the receiving transport stage receives the message, it first determines if the old time-stamp in the message equals the time-stamp of the last message received from the sending node. This step is performed by the transport stage in step 732. If the old time-stamp in the header of the received message does not equal the time stamp of the message last received from the sending node, the receiving transport stage will be advised that a previous message had been sent and that it had not been received. This could also mean that messages were lost. In any case, the receiving transport stage will be advised that resynching with the sending node is probably indicated. Hence, in accordance with step 732, if the old time-stamp does not equal the time-stamp of the last received message from the sending node, the transport stage will then, in step 734, record that the data message includes an invalid time-stamp. The transport stage will thereafter in step 736 discard the data message.

If the old time-stamp in the message header equals the time-stamp of the message last received from the sending node, the transport stage will in step 738 format an acknowledge message for the sending node. The acknowledge message is to provide end-to-end confirmation of receipt of the message from the sending node. The acknowledgement message is then conveyed to the network stage in step 740 for addressing and routing to the sending node.

The transport stage then, in step 742, will mark its table with the new time-stamp accorded in the message header as the time-stamp of the last received message from the sending node so that when the next message is received from the sending node, the transport stage will be able to perform step 732. The transport stage then determines in step 744 if the data message just received requires session services. If the message requires session services, the transport stage in step 746 conveys the message to the session stage. If the message does not require session services, the transport stage will then in step 748 convey the message to the application module for which the message is addressed according to the destination address in the message header. After the message is conveyed to either the session stage or to the appropriate application module, the transport stage will exit.

Figure 31:
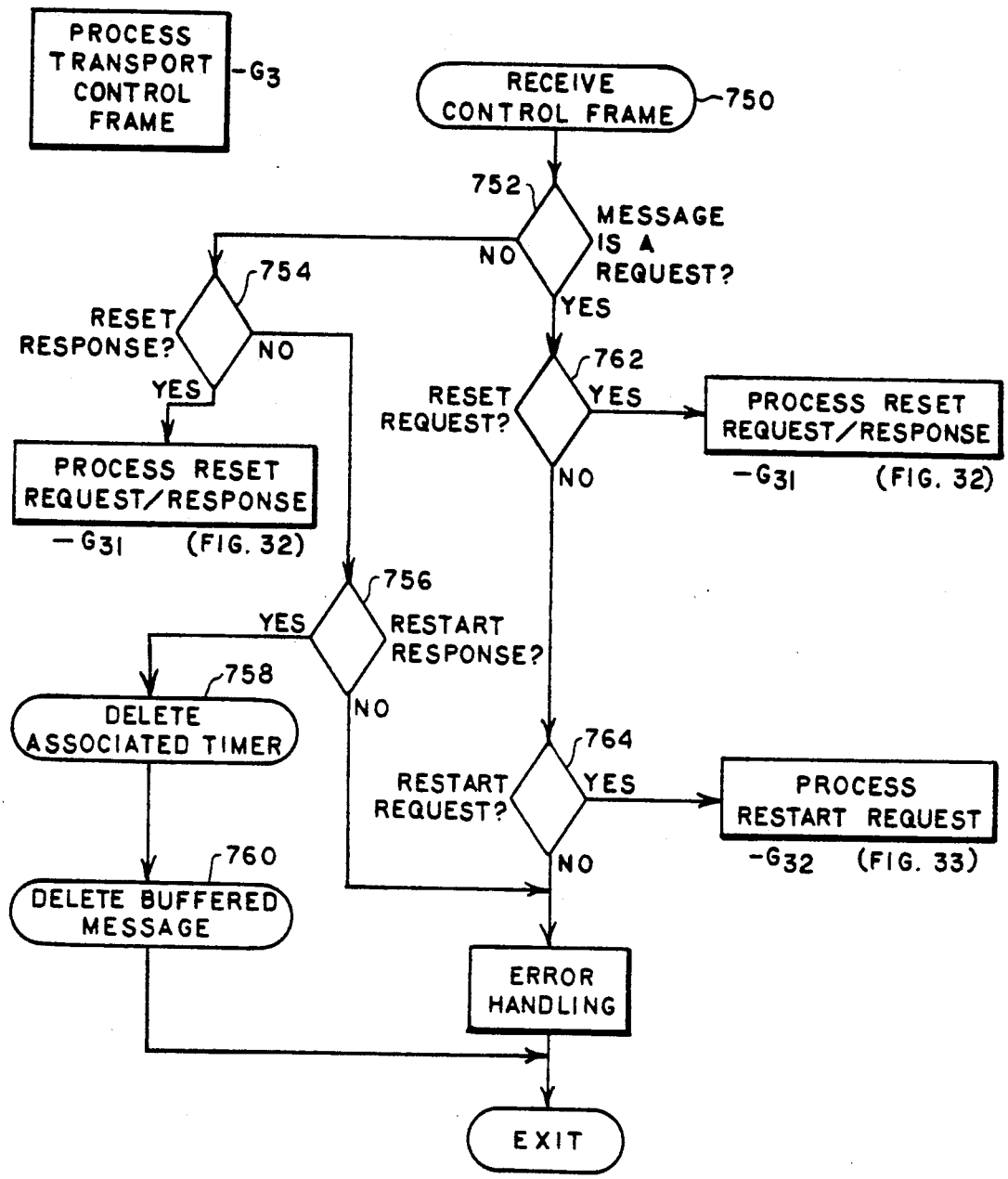
FIG. 31 is a flow diagram illustrating the manner in which the transport stage may be implemented in accordance with the present invention to process a transport control message.

Referring now to FIG. 31, it illustrates the manner in which the transport stage is implemented in accordance with this preferred embodiment to process a control frame. The control frame or message may be in the form of a reset response, a restart response, a reset request, or a restart request.

The transport stage receives the control message in step 750. The transport stage first determines in step 752 if the control message is a request. If it is not a request, the transport stage then, in step 754, determines if the control message is a reset response. If the message is a reset response, the transport stage will process the message in a manner to be described hereinafter with respect to FIG. 32.

If the message is not a reset response as determined in step 754, the transport stage will then determine in step 756 if the control message is a restart response. If the control message is a restart response, the transport stage then in step 758 will request the timer manager to delete the timer associated with the restart request message 20 which prompted the received response message. The transport stage will also thereafter in step 760 request the timer manager to delete the restart request message stored in the buffer pool 92 and then exit.

If the control message is a request message as determined in step 752, the transport stage will then in step 762 determine if the control message is a reset request message. If it is, the transport stage will process the reset request message in manner to be described hereinafter with respect to FIG. 32. If the message is not a reset request message, the transport stage will then, in step 764, determine if the control message is a restart request message. If it is a restart request message, the transport stage will process the message in a manner to be described hereinafter with respect to FIG. 33. If the control message is not a reset response, a restart response, a reset request, or a restart request, the transport stage will then enter into an error handling routine and exit.

Figure 32:
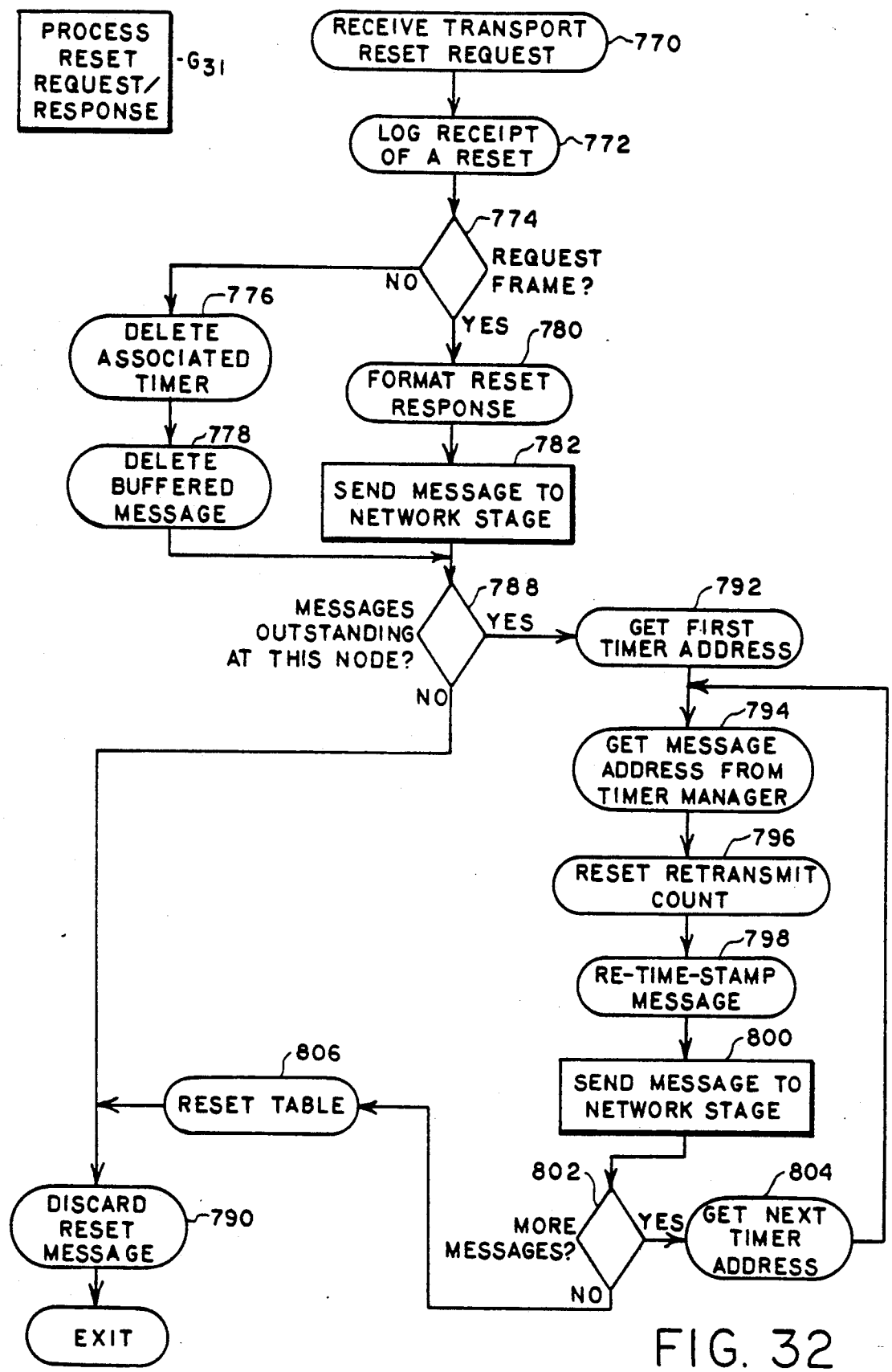
FIG. 32 is a flow diagram illustrating the manner in which the transport stage may be implemented in accordance with the present invention to process a reset request response message.

Referring now to FIG. 32, it illustrates the manner in which the transport stage is implemented in accordance with this preferred embodiment to process a received reset control message. The transport stage first receives the reset control message at step 770. The transport stage next in step 772 logs receipt of the reset message. It thereafter in step 774 determines if the reset message is a reset request message. If it is not a reset request message, the transport stage treats the message as a reset response message and therefore in step 776 requests the timer manager to delete the timer associated with the reset request message which was sent by its node and which prompted the reset response message. The transport stage will also in step 778 request that the timer manager delete the reset request message stored in the buffer pool.

If, in step 774, the transport stage determines that the reset control message is a reset request message, the transport stage will first, in step 780, format a reset response acknowledging receipt of the reset request message. The transport stage then conveys the reset response message to the network stage for routing to the node which sent the reset request message. After the reset request message is cleared from the buffer pool by the timer manager if the reset control message is a reset response message, or after the timer entry index is stored in accordance with step 786, the transport stage then determines in step 788 if there are any message outstanding to be transmitted to the node from which the reset response or reset request message was received. If there are no outstanding messages, the transport stage discards the reset message in step 790 and then exits. If there are messages outstanding destined for the node originating the reset message, the transport stage will then, in step 792, obtain the timer address of the first outstanding message from its storage and use the timer entry index of the first outstanding message to obtain from the timer manager the buffer pool storage address of the message in step 794. The transport stage then in step 796 resets its retransmit count, and then in step 798, provides the message with a new time-stamp. The transport stage then, in step 800, sends the message to the network stage for routing to the node which originated the reset response or request message.

The transport stage then, in step 802, determines if there are any more messages outstanding for the node from which it received the reset response or request message. If there are such additional outstanding messages, the transport stage in step 804 obtains the timer entry index of the next message and then repeats steps 794 through 802. When there are no more outstanding messages for the node from which the control reset message was received, the transport stage in step 806 resets its tables, discards the reset message in step 790, and then exits.

Figure 33:
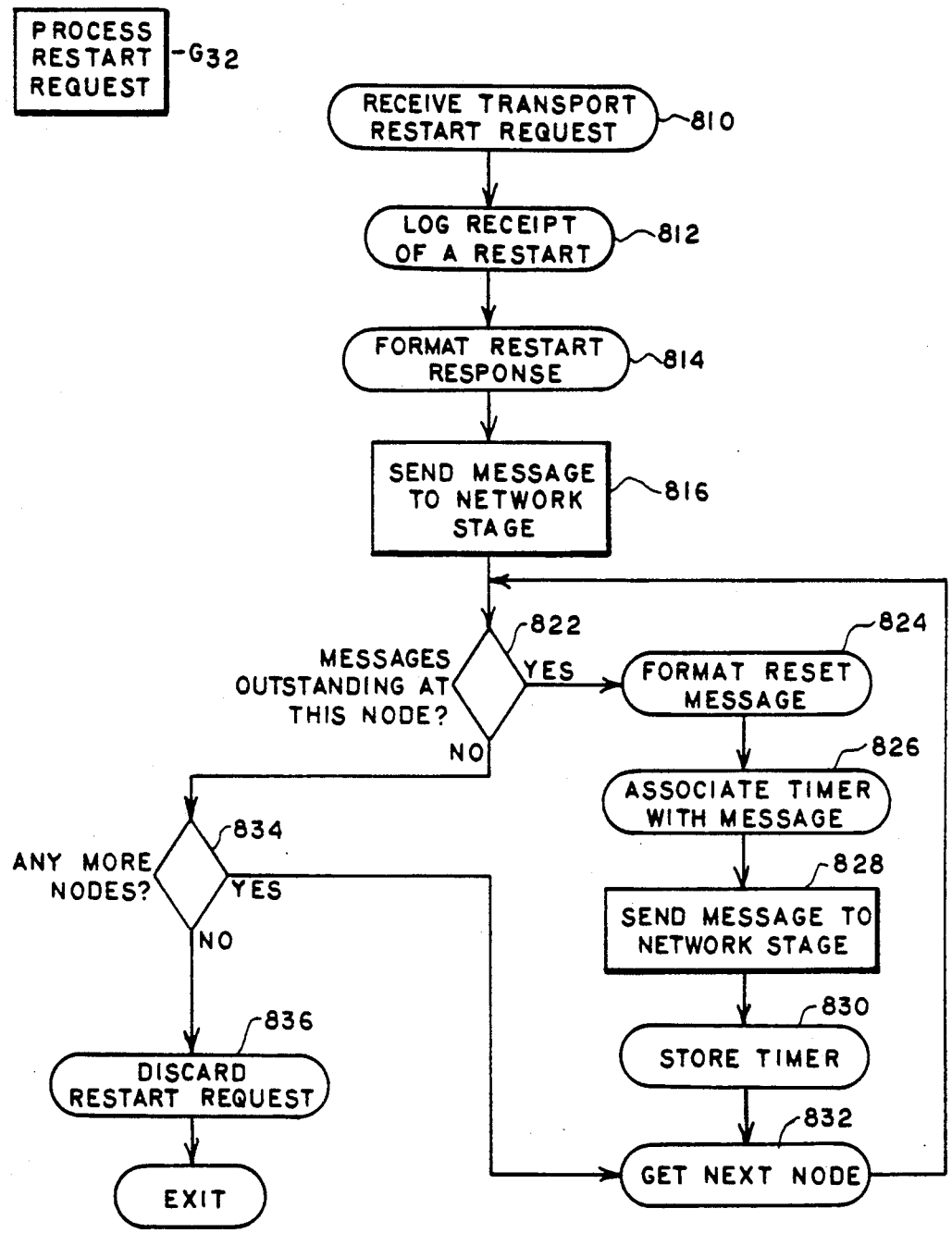
FIG. 33 is a flow diagram illustrating the manner in which the transport stage may be implemented in accordance with the present invention to process a restart request message.

Referring now to FIG. 33, it illustrates the manner in which the transport stage is implemented in accordance with this preferred embodiment for processing a received restart request. In response to receiving the restart request, as will be seen hereinafter, the transport stage is required to reset itself will all nodes within the network.

The transport stage first receives the restart request message at step 810. It logs receipt of the restart message in step 812 and then formats a restart response in step 814. The transport stage then conveys the restart response to the network module in step 816. The transport stage then determines if there are any messages outstanding in step 822 for the node which originated the restart request. If there are, the transport stage formats a reset message in step 824 and then requests the timer manager in step 826 to associate a timer with the reset message. The transport stage then sends the reset message in step 828 to the network stage and then in step 830 stores the timer entry index of the reset message. The transport stage then, in step 832, obtains from its storage the next node address and then repeats 822 to determine if it has any messages outstanding for this node. If it does not, then the transport stage in step 834 determines if there are any more nodes for which it has messages outstanding. If the answer is yes, then it obtains from its storage the address of the next node and repeats steps 822 through 832. When reset messages have been sent to all nodes for which the transport stage has messages outstanding, the transport stage then discards the restart request in step 836 and then exits.

As can be seen from FIGS. 31 through 33, if the transport stage originates a restart request, it will receive from the node to which it sent the restart request, a restart response and then a reset request. The reset request is sent to all nodes in the network.

If the transport stage receives a restart request from another node, it will first send to that node a restart response and then will send to each of the nodes in the network, for which it has messages outstanding, a reset message. After sending a reset message, the transport stage will receive back a reset response which it processes in accordance with FIG. 32. Hence, a restart request causes the transport stage to reset itself with the transport stage for all nodes for which the transport stage's node has outstanding messages. A reset request, however, cause the transport stage to reset itself with only the one node which originated the reset request.

THE SESSION STAGE

Referring now to FIGS. 34 through 41, they illustrate the manner in which the session stage is implemented in accordance with this preferred embodiment for providing messages with session services if such session services are required. As previously mentioned, in accordance with this preferred embodiment, each message is limited to 512 bytes of information including 508 bytes of message information and 4 bytes of header information. When a message to be transmitted is greater than 512 bytes in length, the session stage is called upon to divide that long message or packet into message parts, wherein each part is of a length less than the given length of 512 bytes. The session stage then causes each message part to be transmitted in series as an individual message.

The session stage also is arranged for receiving long messages greater in length than 512 bytes. When its node is to receive a message greater than 512 bytes in length, the session stage is called upon to acquire sufficient buffer resource to store the long message. Once the message parts are received and stored in the buffer acquired by the session stage, the session stage will recombine the message parts into the long message, and then convey the long message to the application module for which the long message is destined.

Whenever a session service is provided to a message, the session stage of the node transmitting the long message establishes a connection between itself and the session stage of the node to receive the long message. Hence, the session stage forms a connection-oriented portion of the network control system in accordance with the present invention.

The session services may also be called upon to handle messages which are in logical groupings. In this case, each such message may be of less than the maximum length of 512 bytes, but may be required to be transmitted in a given order serially for the application module to ultimately receive the message to properly respond to or process the message. Under these circumstances, the session stage may also be called upon to provide session services.

Figure 34:
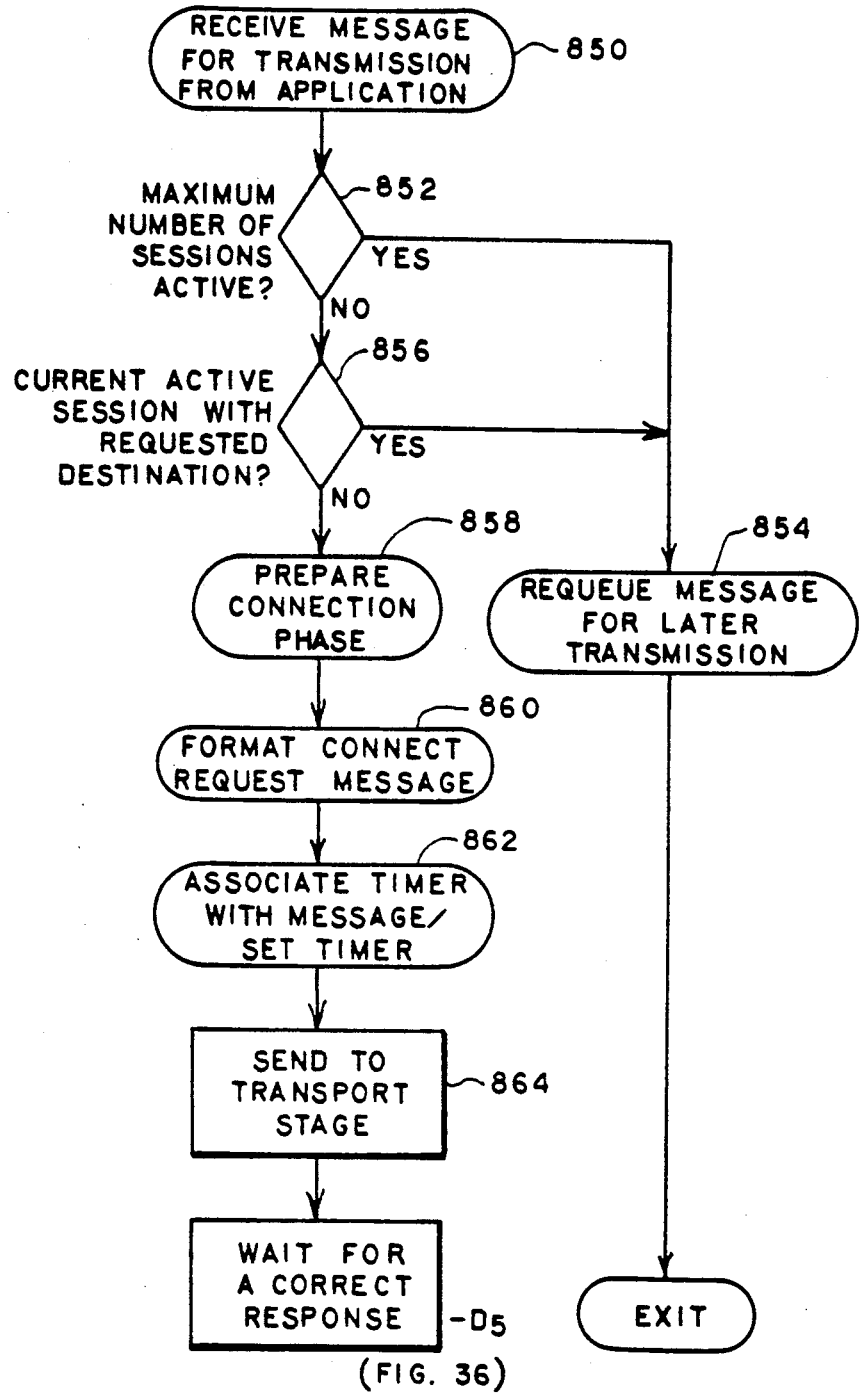
FIG. 34 is a flow diagram illustrating the manner in which the session stage of FIG. 3 may be implemented in accordance with the present invention to initiate a connect request responsive to receiving a long message from an application module.

Referring now to FIG. 34, it illustrates the manner in which the session stage is implemented in accordance with this preferred embodiment for receiving a long message to be transmitted and for beginning to establish a connection with the session stage of the receiving node in response to receiving the long message. The session stage receives the long message to be transmitted at step 850. The session stage, at step 852, next determines if the maximum number of sessions are currently active at its node. The session stage is capable of performing a number of sessions at one time. For example, the session stage may be arranged to handle up to four sessions at one time. If all four sessions are currently being handled, then in step 852, the session stage will determine that the maximum number of sessions are currently active and will go to step 854 to re-queue the message for later transmission. The session stage will then exit thereafter.

If the maximum number of sessions are not currently active, the session stage, at step 856, will determine if there currently is an active session with the destined node to receive the long message. If there currently is such an active session, the session stage will re-queue the message for later transmission in accordance with step 854 and exit.

If there currently is not an active session with a node to receive the long message, the session will next, in step 858, prepare for the connection with the session stage of the node to receive the long message. The session stage will first format a connect request message in step 860. It will then, in step 862, request the timer manager to associate a timer with the connect request message and set the timer. Thereafter, the session stage will convey the connect request message to the transport stage for processing through the transport stage, the network stage, and the data link stage, for ultimate transmission onto the bus. After sending the connect request message to the transport stage, the session stage will wait for a connect response from the session stage of the destined node.

Figure 35:
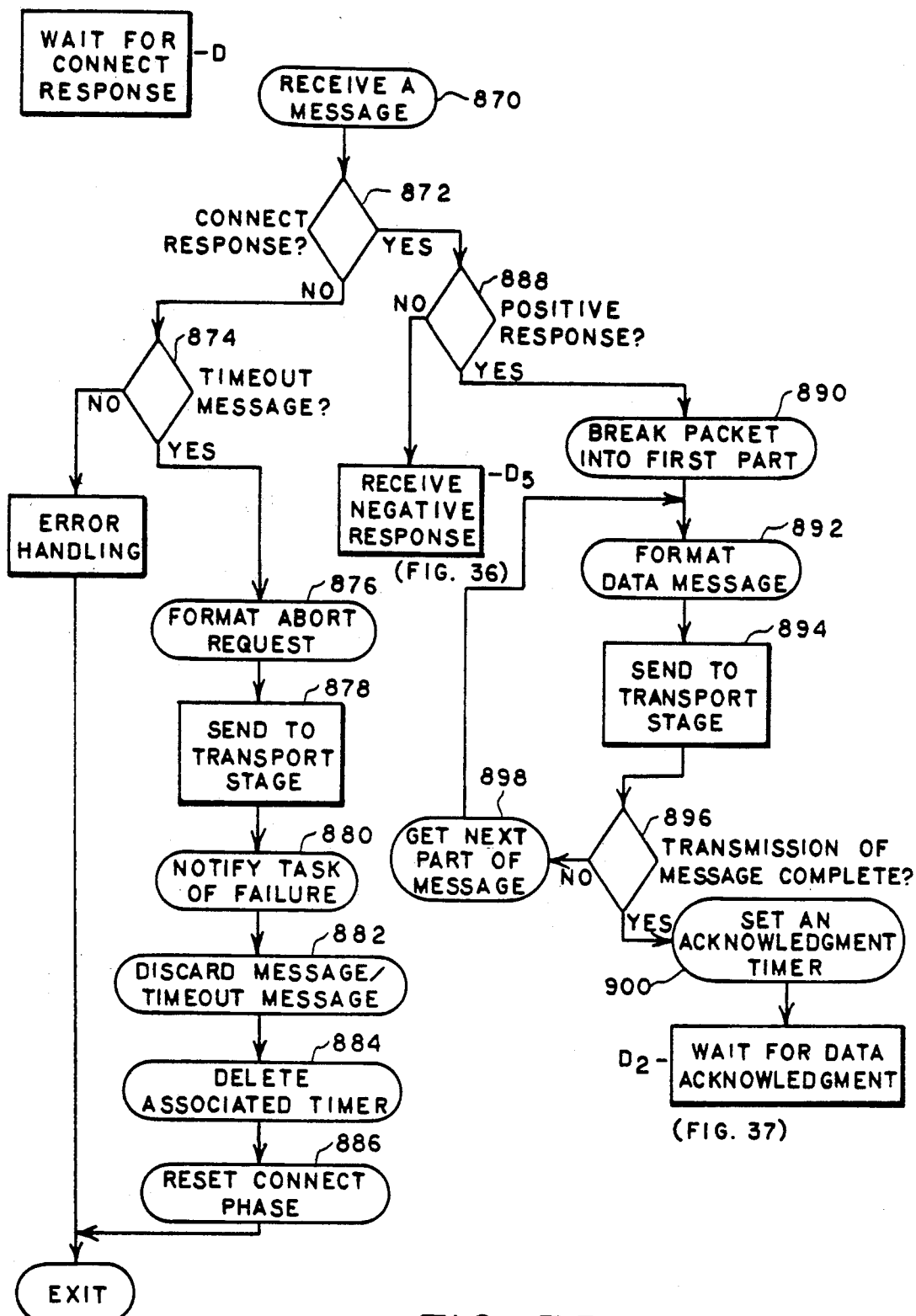
FIG. 35 is a flow diagram illustrating the manner in which the session stage may be implemented in accordance with the present invention to either provide the breaking up of a long message into message parts or aborting session services responsive to the lack of receipt of a connect response.

Referring now to FIG. 35, it illustrates the manner in which the session stage is implemented in accordance with the present invention for processing a connect response message from the session stage of the node receiving the long message. The session stage receives the connect response at step 870 and first determines at step 872 if the message is a connect response. If the message is not a connect response, the session stage then, at step 874, determines if the message is a time-out message. If it is not a time-out message, the session stage goes into an error handling routine and exits.

If the connect response is a time-out message as determined in step 874, the session stage will format an abort request message in step 876 to notify the session stage of the destined node that a connection cannot be established. It then transfers the abort request message in step 878 to the transport module for processing and ultimate transmission onto the bus to the session stage of the destined node. The session stage then, in step 880, notifies the local application module originating the long message that the connection was aborted. It discards the time-out message in step 882 and then in step 884, requests the timer manager to delete the timer it associated with the connect request message sent to the session stage of the destined node. Thereafter, in step 886, the session stage resets its connect phase and exits.

If, in step 872, the session stage determines that the message is a connect response, it will then determine in step 888 if the connect response is a positive response. If it is not a positive connect response, the session stage will handle the message in a manner to be described hereinafter with respect to FIG. 36.

If the connect response is a positive response as determined in step 888, the session stage will then proceed to divide the packet or long message into its first part in step 890. The session stage then formats a data message for the first part of the long message and conveys the first part to the transport stage in step 894. The session stage next determines in step 896 if the transmission of the long message is complete. If transmission is not complete, it will then obtain the next message part in step 898 and return to step 892 to format a data message corresponding to the next part of the message. When all of the message parts have been transmitted, the session stage, in step 900, requests the timer manager to set an acknowledgement timer in preparation for receiving a data acknowledgement from the session stage of the destined node. It thereafter waits for the data acknowledgement message from the session stage of the destined node and will process the data acknowledgement message in a manner to be described hereinafter with reference to FIG. 37.

Figure 36:
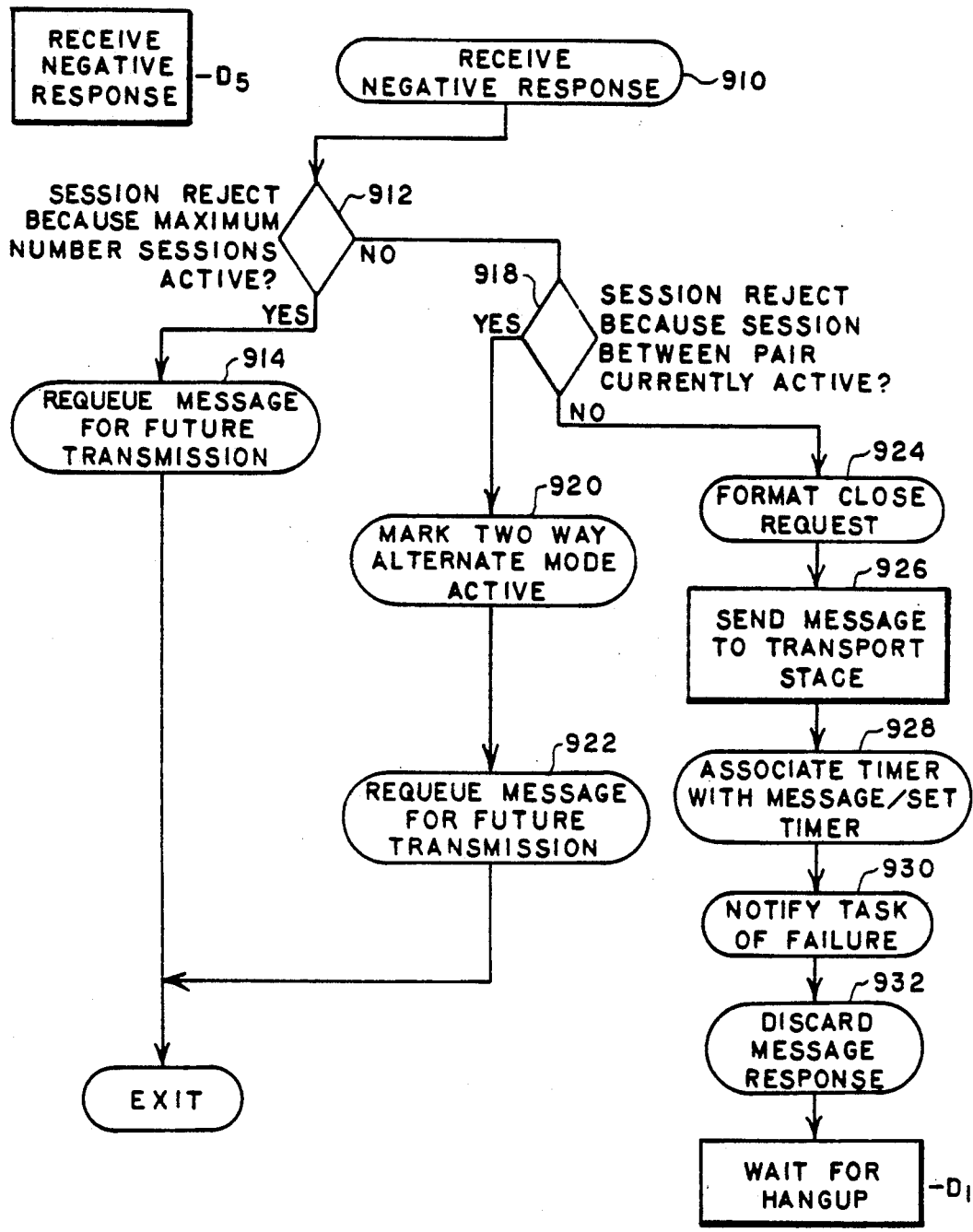
FIG. 36 is a flow diagram illustrating the manner in which the session stage may be implemented in accordance with the present invention to process a negative connect response.

Referring now to FIG. 36, it illustrates the manner in which the session stage is implemented in accordance with the present invention for processing a negative connection response message. In accordance with the present invention, the session stage is arranged for generating a code and inserting the code into the message header of a negative connection response to advise the session stage originating the connect request message as to the reason for the negative connection response message. The session stage receives the message at step 910. It first determines in step 912 if the session was rejected because the session stage at the destined node is currently managing a maximum number of sessions. If it is, the session stage will re-queue the message for future transmission in step 914 and then exit.

If the session was not rejected because the session stage at the destined node was not currently active in the maximum number of sessions, the session stage then determines in step 918 if the session was rejected because there is now an active session between its node and the destined node. This condition may arise, if during the time it was waiting for a connect request response, the session stage of the destined node initiated a connect request message of its own to this node. If that is the case, the session stage in step 920 will mark a condition referred to as "two-way alternate mode active" in its storage 88a and then in step 922, re-queue the message for future transmission. The session stage then exits.

If the determinations in steps 912 and 918 are both negative, the session stage will format a close request in step 924. The close request destined for the session stage of the destined node is then conveyed to the transport stage in step 926. The session stage then, in step 928, requests the timer manager to associate a timer with the close request message and set the timer. The session stage then notifies the local application module originating the long message that there was a failure in transmitting the long message. The session stage then discards the response message in step 932, and then waits for a hang-up in a manner to be described hereinafter with reference to FIG. 38.

Figure 37:
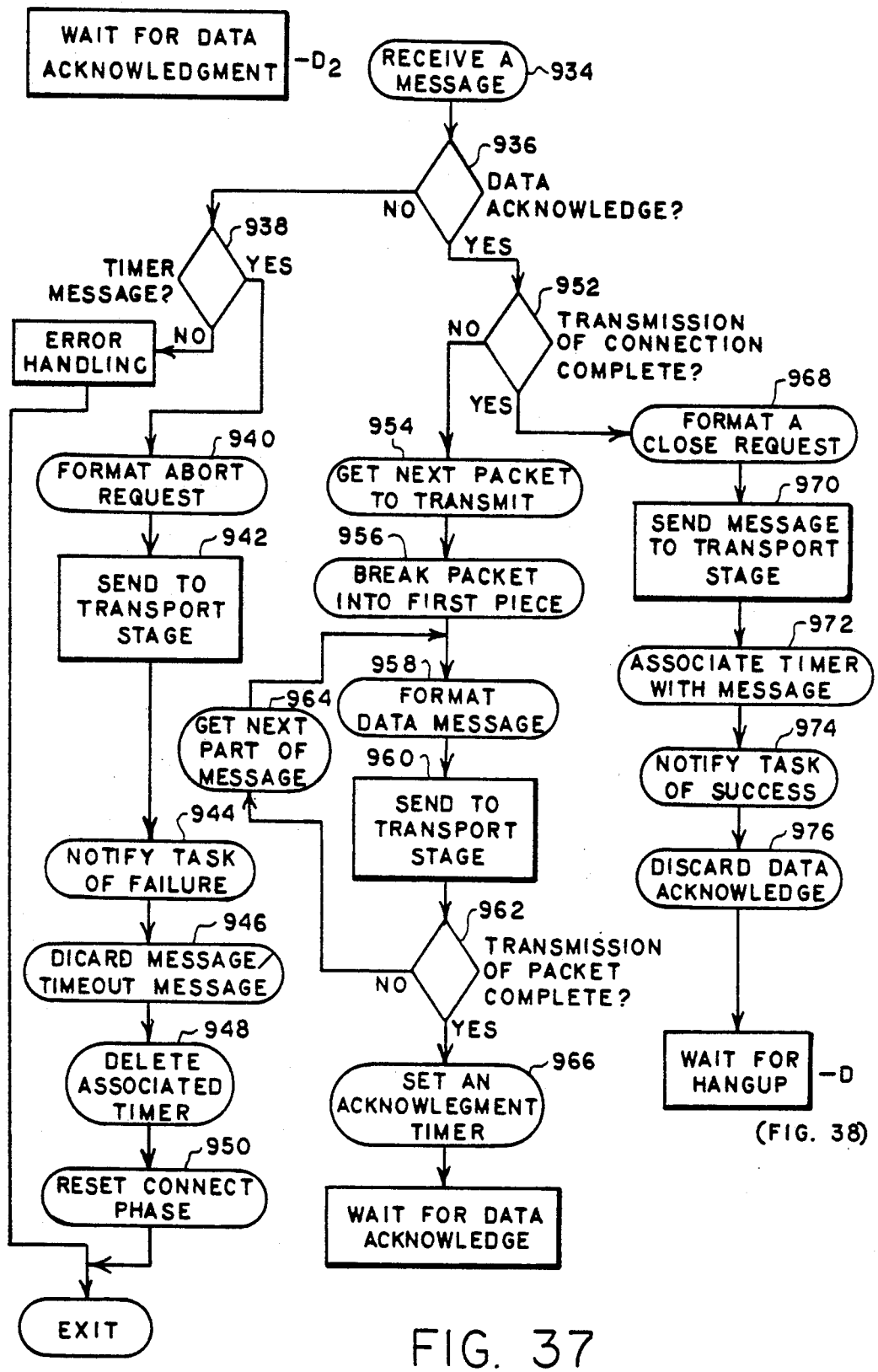
FIG. 37 is a flow diagram illustrating the manner in which the session stage may be implemented in accordance with the present invention to act upon a received data acknowledgement message or act upon the lack of receipt of such a data acknowledgement message.

Referring now to FIG. 37, it illustrates the manner in which the session stage is implemented in accordance with this preferred embodiment for processing the data acknowledgement message from the session stage of the destined node or a time-out message from the timer manager. The session stage receives a message at step 934 during a time in which it is waiting for a data acknowledgement. It first determines in step 936 if the message is a data acknowledgement. If the message is not a data acknowledgement message, the session stage then determines in step 938 if the message is a time-out message from the timer manager. If the message is a time-out message from the timer manager, the session stage will then format an abort request message in step 940 for the session stage of the destined node and then send the abort request message to the transport stage in step 942. The session stage then, in step 944, notifies the local application module originating the long message that there was a failure to communicate with the session stage of the destined node, and then will in step 946, discard the time-out message. The transport stage next, in step 948, requests the timer manager to delete the data acknowledge timer. The session stage then, in step 950, resets the connection phase and exits.

If in step 936, it was determined that the message is a data acknowledgement, the session stage will then determine in step 952 if the transmission for this connection is complete. If the session stage has more than one long message to send to the session stage of the destined node, it will determine that the transmission is not complete and will proceed to obtain the next packet or long message to transmit in step 954. In step 956, the session stage then breaks this message packet into its first message part and then formats the first message part as a separate data message in step 958. It then sends the first message part to the transport stage in step 960. The session stage then determines in step 962 if all of the message parts have been transmitted. If not, the session stage will then, in step 964, obtain the next message part and then repeat steps 958 through 962 until all of the message parts have been transmitted. When all of the message parts have been transmitted, the session stage, in step 966, will then request the timer manager to set an acknowledgement timer and then wait for the next data acknowledgement from the session stage of the destined node.

If, in step, 952 it had been determined that the transmission of the connection was complete, the session stage than formats a close request in step 968. It then, in step 970, conveys the close request message to the transport stage and requests in step 972 that the timer manager associate a timer with the close request message. It then in step 974 notifies the local application module originating the long message that the message was successfully transmitted to the session stage of the destined node and then discards the data acknowledgement message in step 976. It then waits for a hang-up message in a manner to be described hereinafter with reference to FIG. 38.

Figure 38:
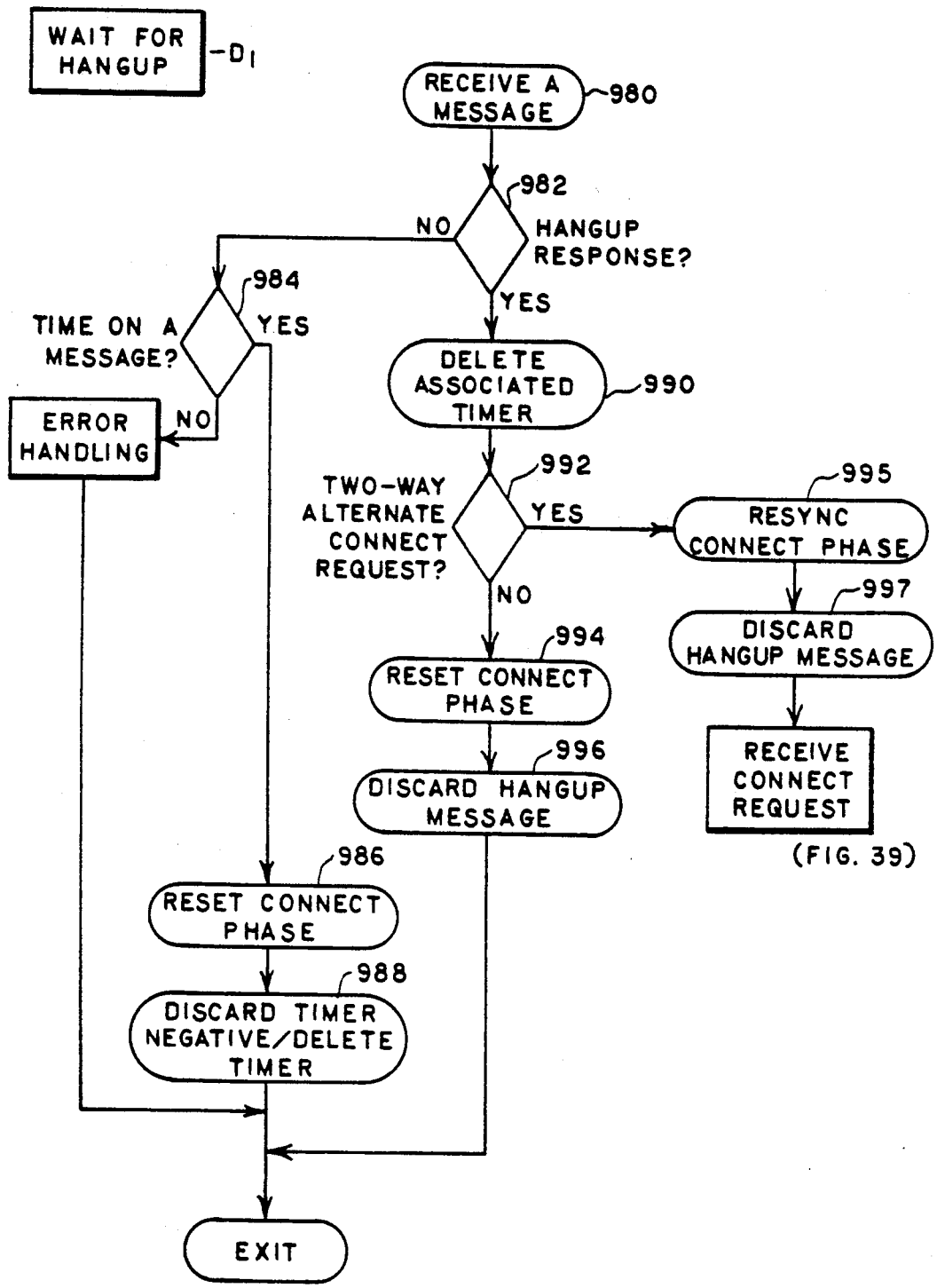
FIG. 38 is a flow diagram illustrating the manner in which the session stage may be implemented in accordance with the present invention to respond to a hang-up response message or the lack of a hang up message.

Referring now to FIG. 38, the session stage receives a message at step 980. The session stage first determines if the message is a hang-up response in step 982. If it is not a hang-up response message, the session stage determines if the message is a time-out message from the timer manager in step 984. If it is not a time-out message, the session stage enters an error handling routine and exits. If it is a time-out message, it will reset its connect phase in step 986 and then in step 988 will discard the timer message and request the timer manager to delete the associated timer and then exit.

If the message is a hang-up response message as determined in step 982, the session stage will, in step 990, request the timer manager to delete the timer associated with the close request message. The session stage will then, in step 992, determine if it had previously marked two-way alternate mode active in step 920 (FIG. 36). If it had, the session stage then, in step 994, will resynchronize its connect phase, discard the hang-up message in step 996 and then process the hang-up message as a received connect request message in a manner to be described hereinafter with respect to FIG. 39. If the session stage had not marked the two-way alternate connect mode, it resets its connect phase in step 994, discards the hang-up message in step 996, and then exits.

Figure 39:
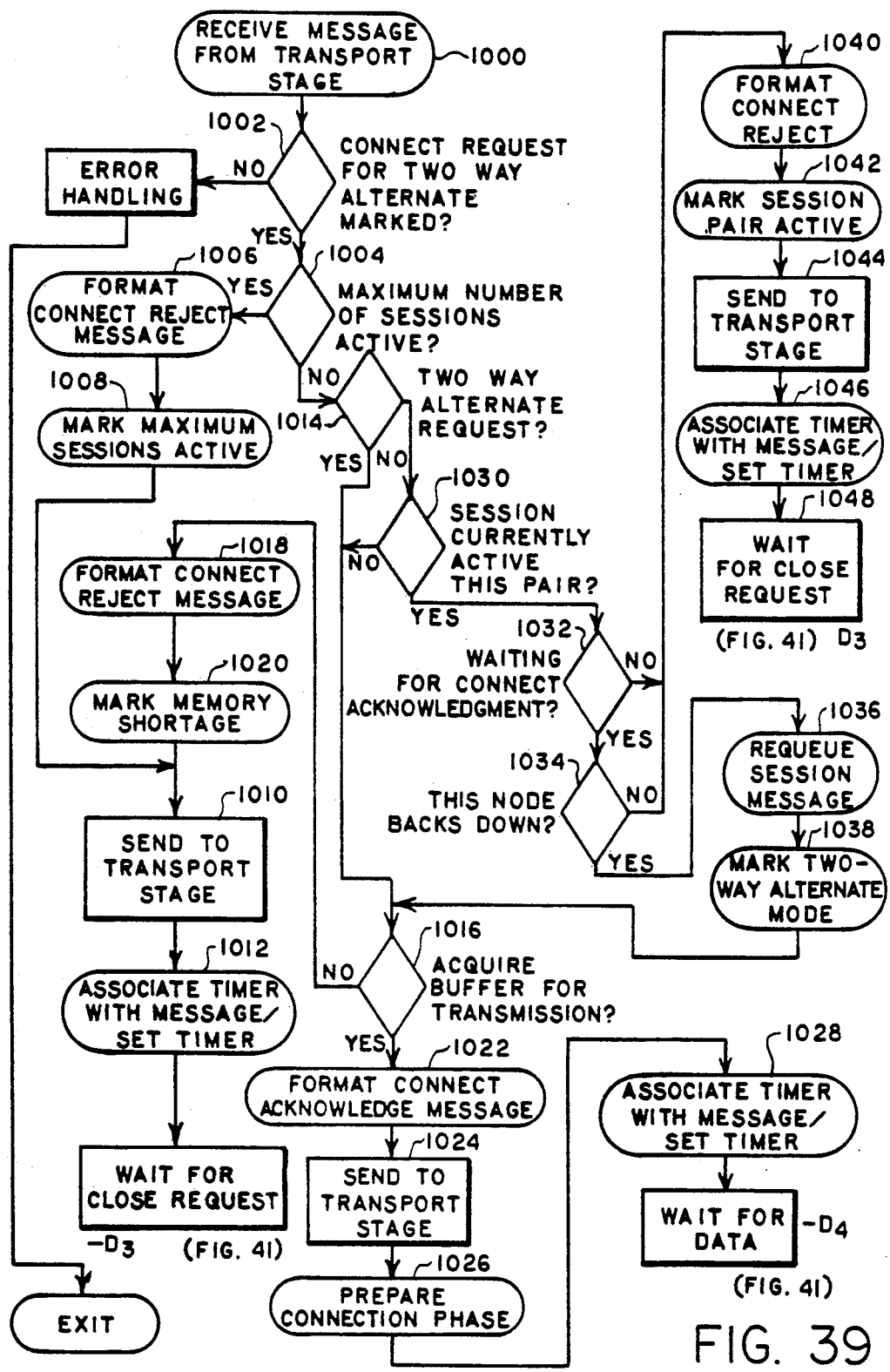
FIG. 39 is a flow diagram illustrating the manner in which the session stage may be implemented in accordance with the present invention to act upon received connect request.
Figure 40:
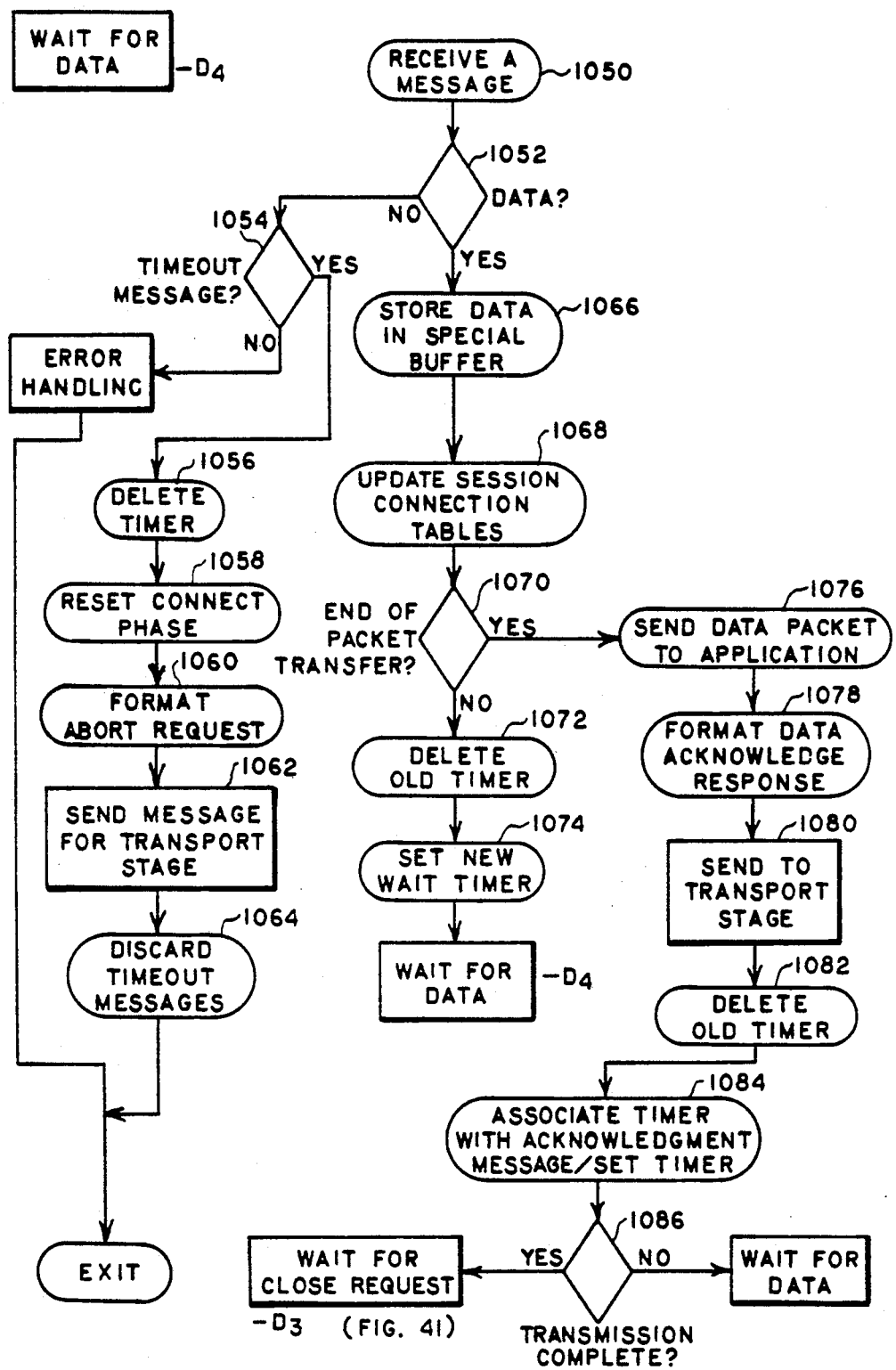
FIG. 40 is a flow diagram illustrating the manner in which the session stage may be implemented in accordance with the present invention to receive the message parts of a long message from another session stage within the network and to provide an acknowledge thereto.
Figure 41:
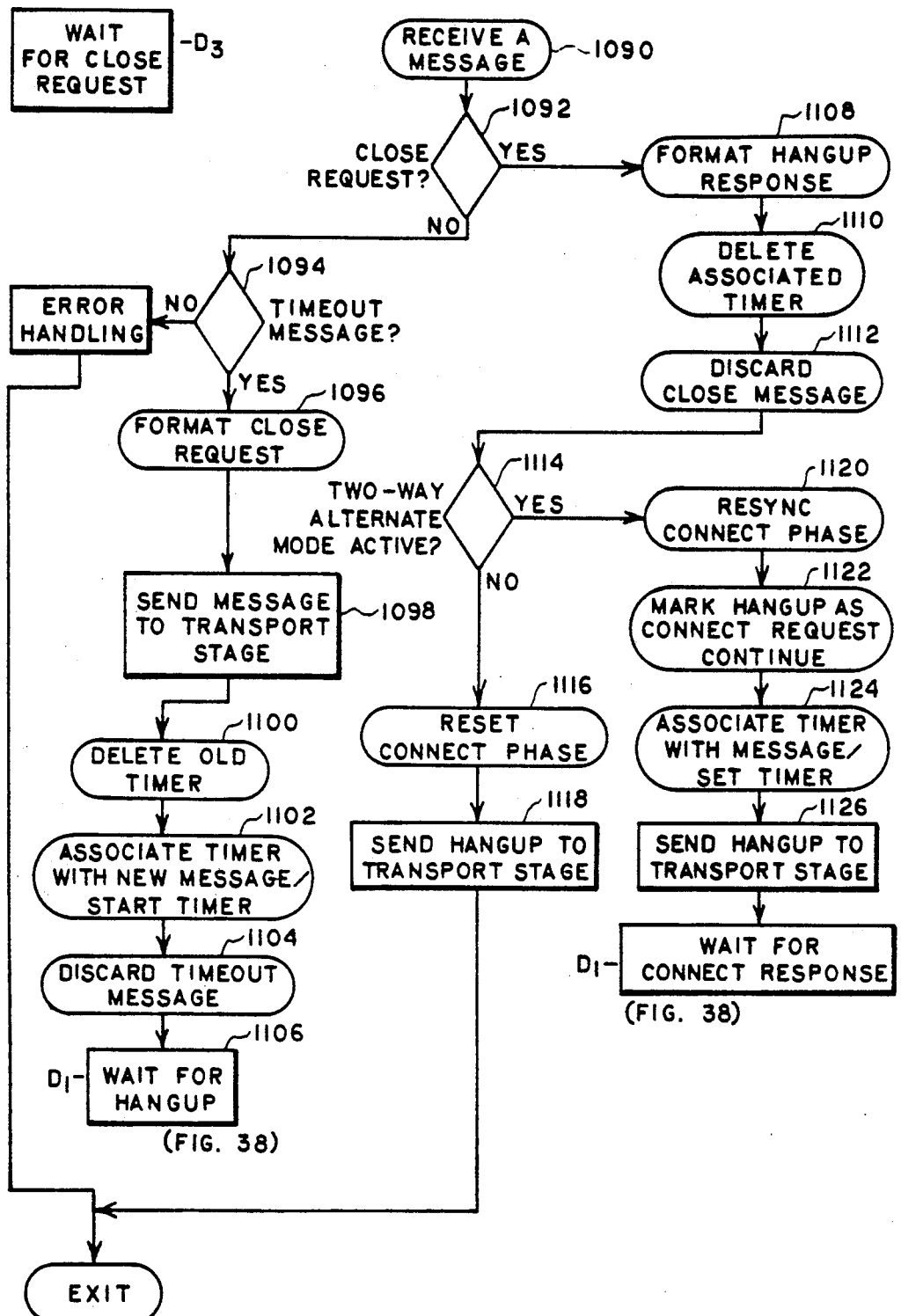
FIG. 41 is a flow diagram illustrating the manner in which the session stage may be implemented in accordance with the present invention to act upon a received close request message or the lack a close request message.

FIGS. 39 through 41 illustrate the manner in which the session stage is implemented in accordance with this preferred embodiment for receiving a long message from a session stage of another node. This process begins with the receipt of a connect request from the session stage of the destined node and processing the connect request in a manner as more particularly illustrated in FIG. 39.

Referring now to FIG. 39, the session stage first receives a message from the transport stage in step 1000. The session stage first determines in step 1002 whether the message is a connect request or if it had marked a two-way alternate mode. If neither, the session stage will then enter into an error handling routine and exit. If however, the message is either a connection request or has a two-way alternate mode marked, the session stage will then at step 1004 determine whether it currently has the maximum number of sessions active. If it does, it will, in step 1006, format a connect reject message for the session stage of the originating node and then in step 1008, mark the reject message with the information that it is rejecting the connect request because it has a maximum number of sessions currently active. It then conveys the connect reject message to the transport stage in step 1010. It will then in step 1012 request the timer manager to associate a timer with the connect reject request, set the timer, and then wait for a close request in a manner to be described hereinafter with respect to FIG. 41.

If, in step 1004, the session stage determined that it did not currently have the maximum number of sessions active, the session stage will then again determine if it has a two-way alternate mode marked in step 1014. If it has, the session stage will then determine if it is able to acquire a buffer for buffering the long message in step 1016. If it is unable to acquire a sufficient buffer, it will format a connect reject in step 1018, and then mark the message with information in step 1120 that it is unable to acquire sufficient storage. It then conveys the connect reject message to the transport stage in step 1010, performs step 1012, and then waits for a close request.

If the session stage is able to acquire a sufficient buffer as determined in step 1016, it will format a connect acknowledgement in step 1022. It then conveys the connect acknowledgement to the transport stage for eventual transmission thereof to the session stage of the originating node in step 1024, and will then prepare a connection phase in step 1026. It will thereafter request the timer manager, in step 1028, to associate a timer with the connect acknowledgement message and set the timer, and then wait for the data in a manner to be described hereinafter with reference to FIG. 40.

If, in step 1014, the session stage determines that it had not marked a two-way alternate mode, it then determines if there is a session currently active between this pair of nodes in step 1030. If it does not have a current session active with the other node, it will then proceed to step 1016, and the steps thereafter. If, however, the session stage determines that it does currently have a session active with the other node, it then determines in step 1032 if it is currently waiting for a connect acknowledgement from the other node. If this node is waiting for a connect acknowledgement, this initiates the beginning of a two-way alternate mode, wherein this node had sent a connect request to the other node essentially simultaneously with the other node sending a connect request to this node. To handle the two-way alternate mode, each session stage is provided with a priority with respect to all other session stages. As a result, when there are such simultaneous connect requests between two nodes, one node will be a priority node, and the other node will be a non-priority node. In step 1034, this node determines whether it is a priority node with respect to the other node or a non-priority with respect to the other node. If it is not a priority node, the session stage will then in step 1036 re-queue its session message for later transmission and then in step 1038, mark in its storage 88a that it has a two-way alternate mode with the other node. The session stage then proceeds to step 1016 and the steps thereafter to handle the other node's session.

If the session stage is a priority node with respect to the other node, or if it was not waiting for a connect acknowledgement, the session stage proceeds to step 1040 to format a connect reject message. If the session stage is the priority node, the connect reject message will include information advising the other node that this node is the priority node and that the other node should mark the two-way alternate mode at its node. This is accomplished in step 1042 wherein the session stage marks the connect reject message with session pair active information. The session stage then in step 1044 sends the connect reject message to the transport stage for further processing within the network control system for eventual transmission thereof onto the bus. The session stage then, in step 1046, requests the timer manager to associate a timer with the connect reject message and to set the timer. Lastly, in step 1048, the session stage then waits for an appropriate close request message from the other session stage.

Referring now to FIG. 40, it illustrates the manner in which the session stage is implemented in accordance with the present invention for receiving data in the form of message parts of a long message from the session stage of another node. The session stage receives a message at step 1050. It first determines at step 1052 if the message is a data message. If the message is not data, the session stage will then determine if the message is a time-out message in step 1054. If the message is not a time-out message, the session stage will go into an error handling routine and exit.

If the message is a time-out message from the timer manager, the session stage will then, in step 1056, request the timer manager to delete the timer associated with the connect acknowledgement previously sent to the session stage from which the data message is to be received. The session stage will then in step 1058 reset its connect phase and then in step 1060, format an abort request message for the session stage of the node from which data should have been received. The session stage will then, in step 1062, send the abort request message to the transport stage. Thereafter, the session stage will discard the time-out message in step 1064 and then exit.

If, in step 1052, it was determined that the message is a data message, the session stage will then, in step 1066, store the data in the special buffer which it had acquired in response to the connect request message from the transmitting node. The session stage will then, in step 1068, update its session connection tables. Thereafter, in step 1070, the session stage will determine if transmission of all the message parts has been completed. If the transmission of all of the message parts has not been completed, the session stage will then, in step 1072, request the timer manager to delete the old timer associated with the connect acknowledgement message. Then, in step 1074, it will request the timer manager to associate a new timer with the connect acknowledgement message. Thereafter, the session stage will wait for more data.

If, in step 1070, it had been determined that all of the message parts had been received, the session stage will then in step 1076 send all of the data to the application module identified in the destination address portion of the header of the message. The session stage will then, in step 1078, format a data acknowledgement response and then send the data acknowledgement response to the transport stage in step 1080. The session stage will thereafter request the timer manager in step 1082 to delete the old timer associated with the connect acknowledgement message and in step 1084, request the timer manager to associate a timer with the data acknowledgement response. The session stage will then in step 1086 determine if the transmission is complete. If the transmission is complete, the session stage will wait for a close request in a manner to be described hereinafter with reference to FIG. 41. If the transmission is not complete, the session stage will wait for further data.

Referring now to FIG. 41, it illustrates the manner in which the session stage is implemented in accordance with this preferred embodiment for receiving a close request message. The close request is received after all of the data message parts have been received and is sent by the transmitting session stage in response to the data acknowledgement response previously referred to.

The session stage receives a message in step 1090. It first determines in step 1092 if the message is a close request message. If it is not, the session stage will then determine in step 1094 if the message is a time-out message from the timer manager. If the message is not a time-out message, the session stage will go into an error handling routine and exit.

If the message is a time-out message from the timer manager, the session stage will format a close request in step 1096, and then send the close request message to the transport stage in step 1098. The session stage then, in step 1100, requests the timer manager to delete the old timer associated with the data acknowledgement response. In step 1102, the session stage then requests the timer manager to associate a new timer with the close request message and to start the timer. The session stage then, in step 1104, discards the time-out message and then in step 1106 waits for a hang-up message in a manner as previously described with reference to FIG. 38.

If, in step 1092, it was determined that the message was a close request, the session stage will then in step 1108 format a hang-up response. In step 1110, the session stage then requests the timer manager to delete the timer associated with the data acknowledgement response and then discards the close message in step 1112.

The session stage then determines in step 1114 if the two-way alternate mode is active. If it is not, it resets its connect phase in step 1116 and then in step 1118 sends the hang-up response to the transport stage and then exits. If the two-way alternate mode is active, the session stage then resynchs its connect phase in step 1120 to maintain the connection with the other session stage. It then, in step 1122, marks the hang-up as a connect request continue message and then requests the timer manager to associate a timer with the connect request continue message. It then, in step 1126, sends the hang-up message in the form of the connect request continue message to the transport stage and then waits for a connect response in a manner as previously described with respect to FIG. 35.

As can be seen from FIG. 41, if the two-way alternate mode is active, the session stage of lower priority has an opportunity to complete its session with the session stage of higher priority. This is accomplished by reformatting the hang-up response as a connect request continue message which the other session stage will treat as a connect request message. The lower priority session stage then will receive a connect request acknowledgement from the other higher priority session stage will then divide its long message into message parts, and then transmit the data message parts to the higher priority session stage. This process continues as previously described until all of the message parts have been transmitted to the higher priority session stage, at which time, the higher priority session stage sends a data acknowledgement. After receiving the data acknowledgement, the lower priority session stage then sends a close request to the higher priority session stage which then sends back a hang-up request for completing the session. Hence, when two session stages simultaneously send a connect request to each other, both session stages are given an opportunity to complete their sessions with the other by the two-way alternate mode.

THE TIMER MANAGER

FIGS. 42 through 50 illustrate the manner in which the timer manager is implemented in accordance with this preferred embodiment. As previously explained, the timer manager is responsible for keeping track of messages to be transmitted and messages received at a node by maintaining the buffer pool storage addresses of those messages in a table which may be accessed by the various stages of the network control system. In addition, the timer manager in its table, associates timers with various types of messages which are used by the various stages of the network control system for providing reliability in the system through point-to point and end-to-end confirmation.

Figure 42:
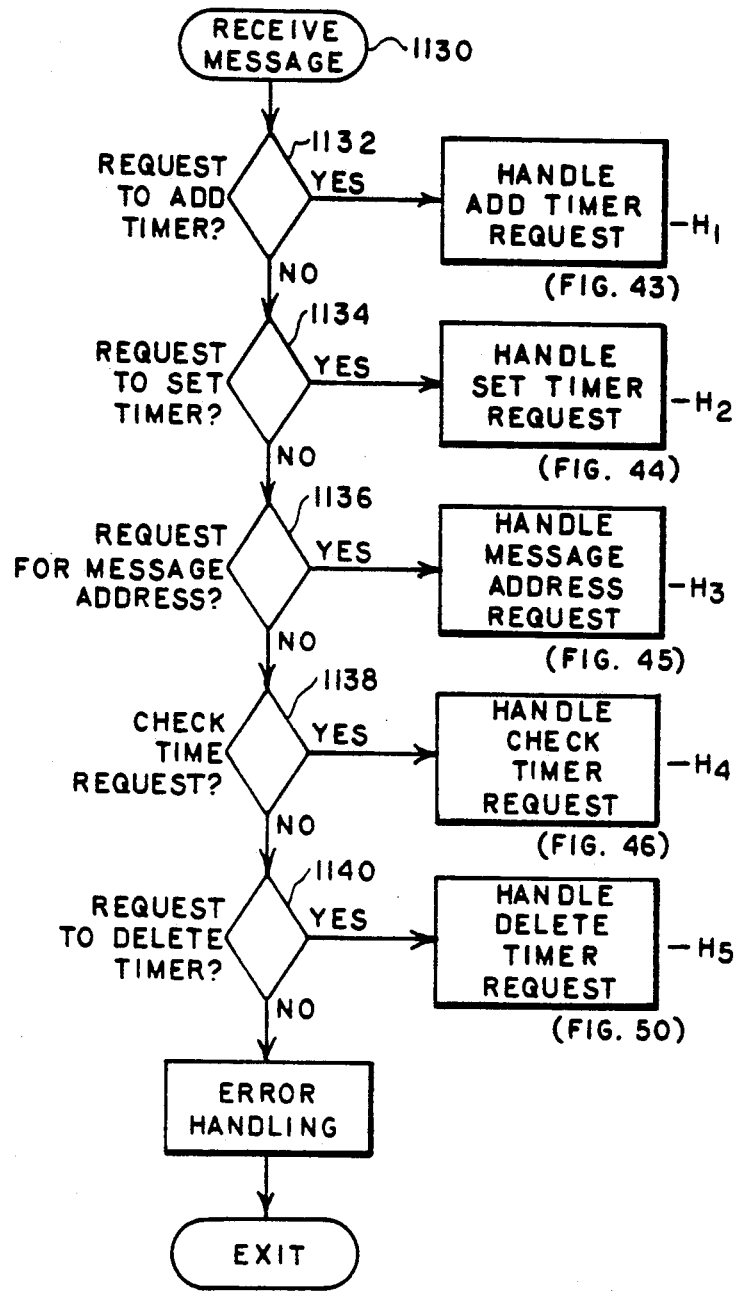
FIG. 42 is a flow diagram illustrating the manner in which the timer manager illustrated in FIG. 3 may be implemented.

Referring now to FIG. 42, it illustrates the manner in which the timer manager is implemented in accordance this preferred embodiment for classifying the type of request it may receive from one of the other stages of the network control system. The timer manager receives a message at step 1130. It first determines if the message is a request to add a timer in step 1132. If the message is a request to add a timer, it will process the request in a manner to be described hereinafter with respect to FIG. 43. If the message is not a request to add a timer, the timer manager then, in step 1134, determines if the request is to set a timer. If the request is to set a timer, it will handle the set timer request in a manner to be described hereinafter with respect to FIG. 44.

If the message is not a request to add a timer or to set a timer, the timer manager will then, in step 1136, determine if the request is for a message address. This type of request may be from either the data link stage, the transport stage, or the session stage, to determine the address of a message. If the request is for a message address, the timer manager will process the message in manner to be described hereinafter with respect to FIG. 45.

If the message is not a request to add a timer, to set a timer, or for a message address, the timer manager will then determine if the message is a check time request. As will be seen hereinafter, a check time request is internally generated within the timer manager for determining if any timer associated with a given entry in its table has timed out. If the timer has timed out, it then notifies the appropriate stage that its timer had timed out for a message. The timer manager handles the check time request in a manner to be described hereinafter with reference to FIG. 46.

Lastly, the timer manager, in step 1140, determines if the message is a request to delete a timer. If it is a request to delete a timer, the timer manager will delete the timer in a manner to be described hereinafter with reference to FIG. 50. If the message received by the timer manager is none of the above, the timer manager then enters an error handling routine and then exits.

Figure 43:
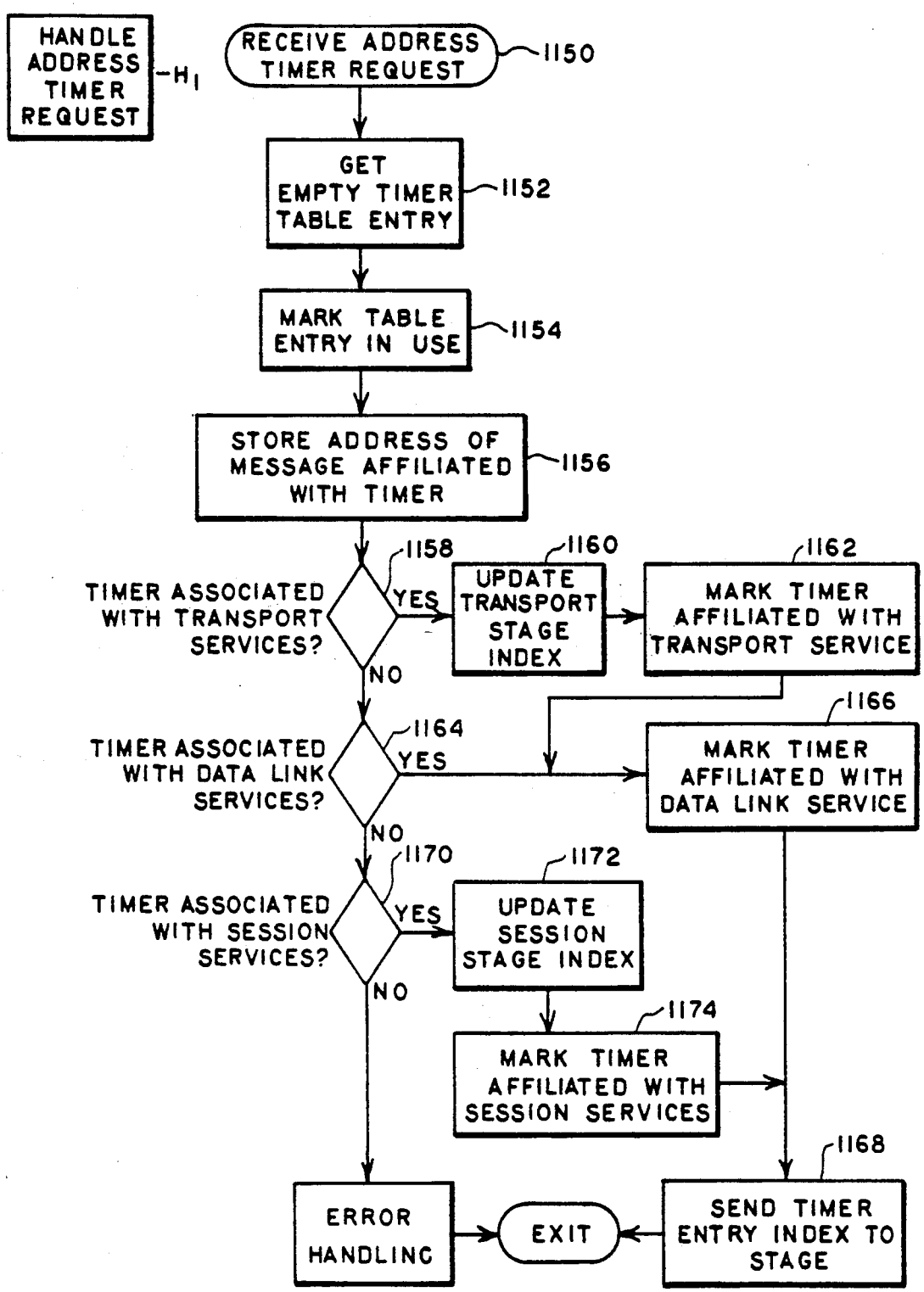
FIG. 43 is a flow diagram illustrating the manner in which the timer manager may be implemented in accordance with the present invention to process an add timer request.

Referring now to FIG. 43, it illustrates the manner in which the timer manager is implemented in accordance with this preferred embodiment for processing an add timer request. The timer manager receives an add timer request in step 1150. The timer manager first obtains in step 1152 an available timer entry in its table. As previously mentioned, a dedicated portion of the buffer pool is reserved for the timer manager to establish a multiple entry table for associating a timer as requested with the entry in the table. The add timer request may be made by the session stage, the transport stage, or the data link stage. In step 1154, the timer manager will then mark in its table that the available timer entry is in use. It will then store the buffer pool storage address received by the requesting stage for the message to be associated with the requested timer in the available entry. In step 1158, the timer manager determines if the add timer request was from the transport stage. If it was, it then, in step 1160, sends the table entry index number to the transport stage to permit the transport stage to update its index in its storage 86a. The timer manager then, in step 1162, marks the timer associated with the transport service in its table.

If the timer is not associated with transport services as determined in step 1158, the transport stage, in step 1164, determines if the timer is to be associated with data link services. In other words, it determines if the add timer was received from the data link stage. If it is, it marks the timer affilitated with the data link service in step 1166. It performs this step also after step 1162 if both the transport stage and the data link stage require a timer. After marking the timer affiliated with the data link service in step 1166, the timer manager then sends the timer entry index number to the add timer requester. If the data link stage had requested the timer be added, the timer manager would send the timer entry index to the data link stage so that it could update its table in its storage 82a. If the request was from the transport stage, the timer manager would send the timer entry index to the transport stage so that it could update its table in its storage 86a. The timer manager sends the timer entry index to the requester in step 1168.

If the add timer request was not from the data link stage or the transport stage, the timer manager determines in step 1170 if the add timer request was from the session stage. If it was not from the session stage, the timer manager goes into an error handling routine and then exits. If the add timer request was from the session stage, it will update its session stage index in its table in step 1172, mark the timer affiliated with the session stage request in its index at step 1174, and then send the timer entry index to the session stage in step 1168. The timer manager then exits to receive the next add timer request.

Figure 44:
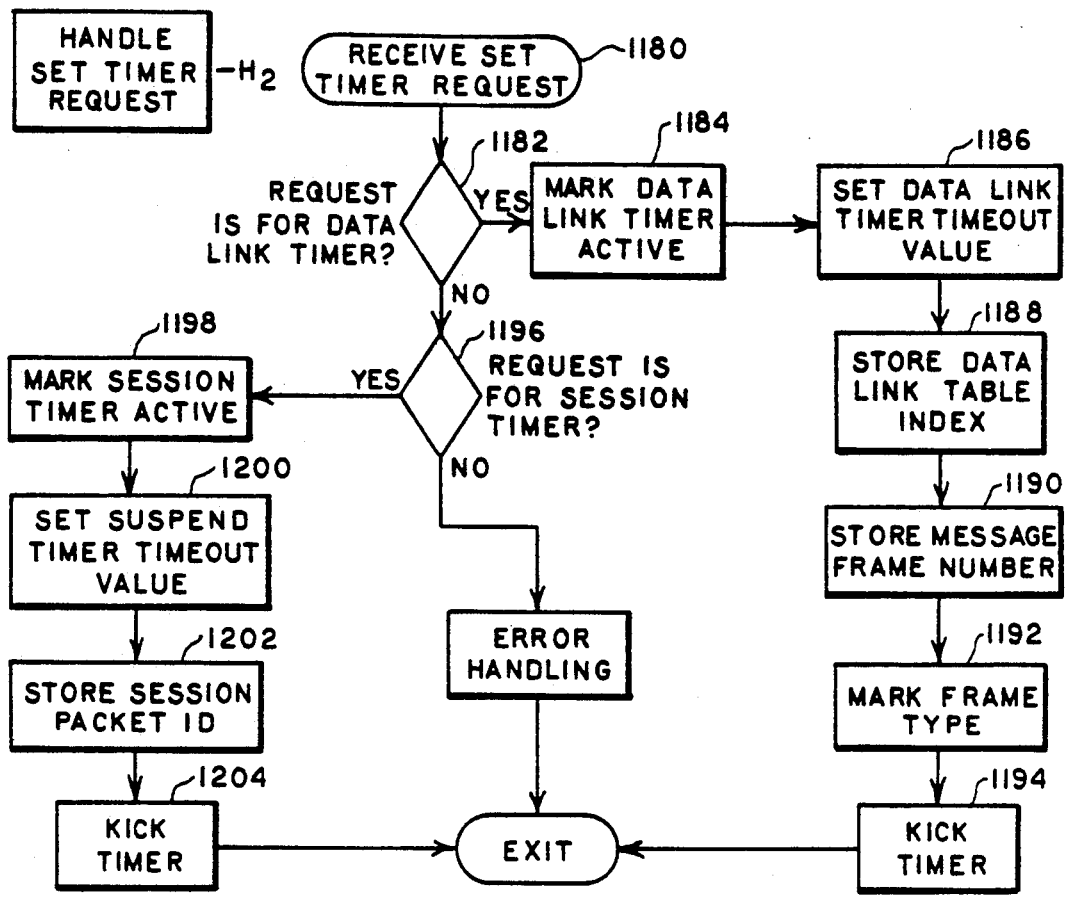
FIG. 44 is a flow diagram illustrating the manner in which the timer manager may be implemented in accordance with the present invention to process a set timer request.

Referring now to FIG. 44, it illustrates the manner in which the timer manager is implemented in accordance with this preferred embodiment for setting a timer in response to a set timer request. The timer manager receives the set timer request in step 1180. It first determines if the request is for a data link timer in step 1182. If the request is for a data link timer, it will mark in step 1184 that the data link timer is active and then enter the time-out value into its appropriate entry in step 1186. It will then also, in step 1188, store the data link table index with the message frame number in step 1190. It will also mark in its table the type of frame or message that is being transmitted in step 1192. For example, the timer manager would mark that the message as either a data message, a response message, or a control message. The timer manager then in response to a message received from the transmit/receive module, starts the timer in step 1194. As previously mentioned, only message addresses are transferred from stage to stage within the network control system. When a message is to be transmitted onto the bus, the data link stage provides the transmit/receive module with the buffer pool storage address of the message to be transmitted. The transmit/receive module then obtains the message from the buffer pool and when it places the message onto the bus, it causes the timer manager to start the associated timer. After the associated timer is started the timer manager exits.

If it was determined in step 1182 that the request to set the timer was not for a data link timer, the timer manager then determines in step 1196 if the request was to set a session timer. If it was not, the timer manager goes into an error handling routine and exits. If it was a request to set a session timer, the timer manager in step 1198 marks in its table that the session timer is active. It then, in step 1200, enters the time-out value for the timer. It then, in step 1202, stores in its table entry the session packet identification number. It then starts the timer in step 1204 responsive to the transmit/receive module, and then exits.

Figure 45:
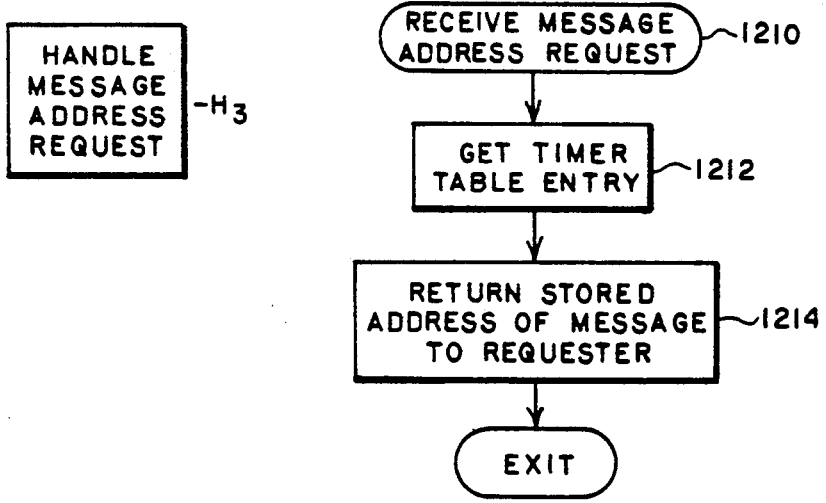
FIG. 45 is a flow diagram illustrating the manner in which the timer manager may be implemented in accordance with the present invention to process a message address request.

Referring now to FIG. 45, it illustrates the manner in which the timer manager is implemented in accordance with this preferred embodiment for processing a message address request. As has been seen previously, at various times, a stage in the network control system must request from the timer manager the address of a message. A request is made of the timer manager because it maintains in its dedicated portion of the buffer pool the buffer pool storage address of the messages. No other stage maintains the buffer pool storage address of the messages. The timer manager receives the message address request in step 1210. The request will include the timer manager table entry index and from the request, the timer manager acquires the timer table entry. It then uses the timer table entry obtained in step 1212 to obtain from its table in step 1214 the buffer pool storage address of the message and sends the buffer pool storage address of the message to the requester. The timer manager then exits.

Figure 46:
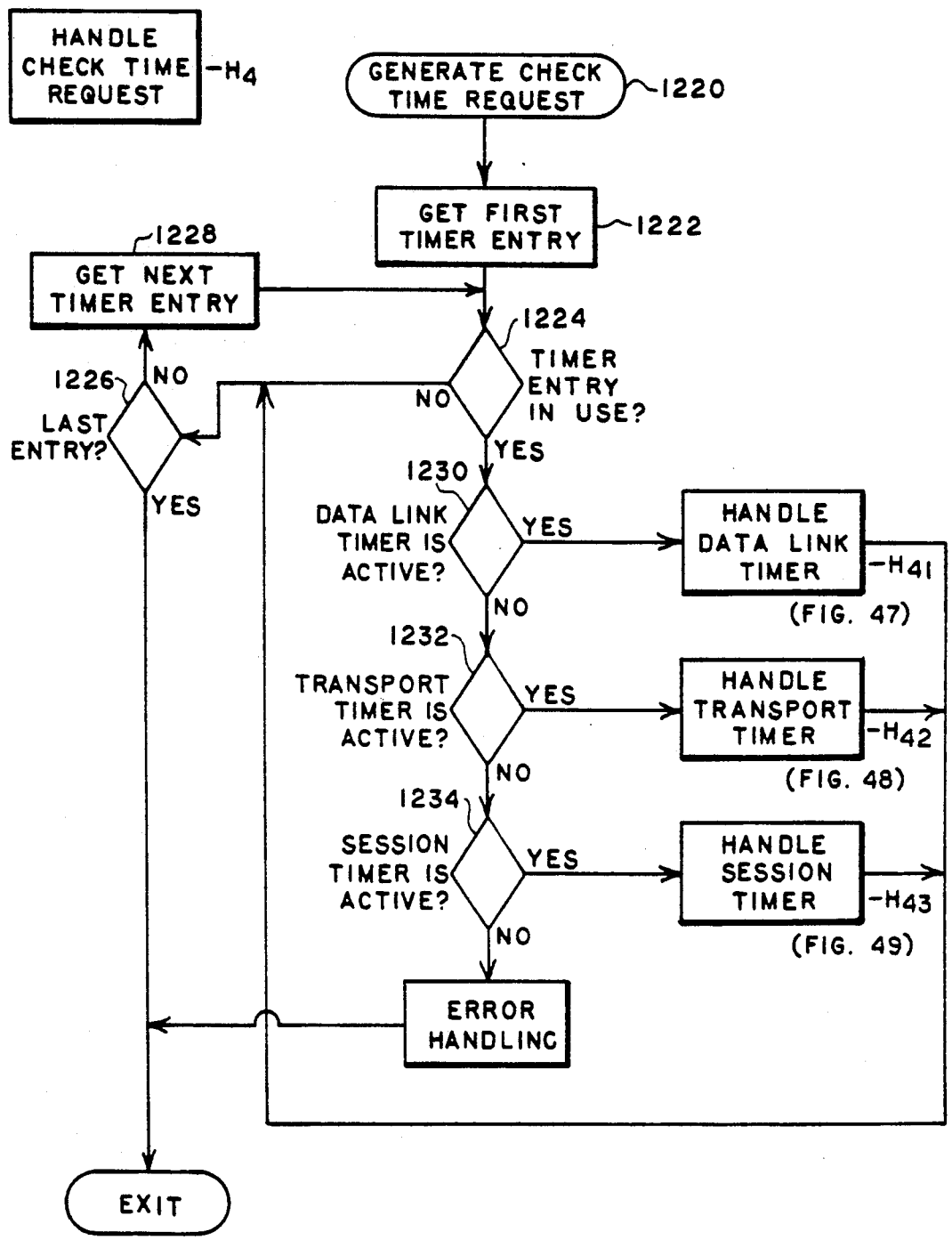
FIG. 46 is a flow diagram illustrating the manner in which the timer manager may be implemented in accordance with the present invention to check the condition of its timers.

Referring now to FIG. 46, it illustrates the manner in which the timer manager is implemented in accordance with this preferred embodiment for checking the condition of the various timers associated with timer entries in its table. The timer manager generates the check-time request at step 1220. In step 1222, the timer manager obtains the first timer entry in its table. It then determines in step 1224 if this timer entry is in use. If it is not, the timer manager then, in step 1226, determines if this entry is the last entry in its table. If it is, the timer manager exits. If it is not the last entry in its table, the timer manager will then obtain the next entry in its table in step 1228 and then return to repeat step 1224.

If it finds a timer entry in use, it will then determine in step 1230 if this timer entry is for an active data link timer. If it is, it will handle the data link timer in a manner to be described hereinafter with reference to FIG. 47. If the entry is not for an active data link timer, the timer manager will then determine in step 1232 if the timer entry is for an active transport timer. If it is, it will handle the active transport timer in a manner to be described hereinafter with reference to FIG. 48. If the entry is not for an active data link timer or an active transport timer, the timer manager then determines in step 1234 if the timer entry is for an active session timer. If it is, it handles the active session timer in a manner to be described hereinafter with reference to FIG. 49. If the timer entry is not an active data link timer, an active transport timer or an active session timer, it will enter an error handling routine and then exit.

Figure 47:
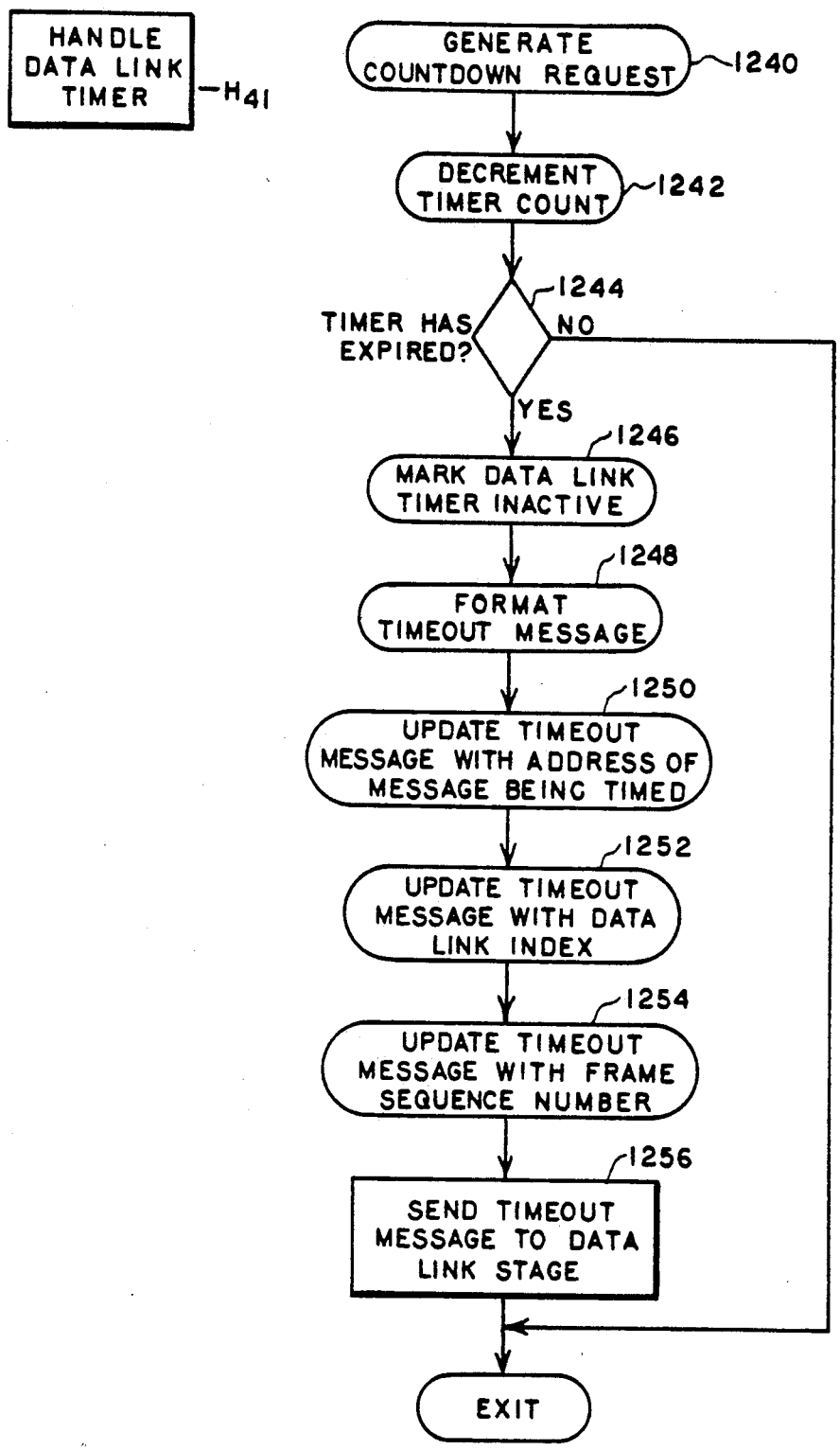
FIG. 47 is a flow diagram illustrating the manner in which the timer manager may be implemented in accordance with the present invention for decrementing a data link timer and responding to an expired data link timer.

Referring now to FIG. 47, it illustrates the manner in which the timer manager is implemented in accordance with this preferred embodiment for handling a data link timer entry. The timer manager first generates a countdown request in step 1240. In response to the countdown request, the timer manager then decrements the timer count associated with entry in step 1242. The timer manager then determines if the timer has expired in step 1244. If the timer has not expired, the timer manager exits. If the timer has expired, it will mark the data link timer entry inactive in step 1246. It will then, in step 1248, format a time-out message to be sent to the data link stage. In step 1250, it will then include in the time-out message the buffer pool storage address of the timed-out message. In step 1252, it will include into the time-out message the data link entry index of the message and its associated timer and in step 1254, it will include in the time-out message the frame sequence number assigned to the message. The timer message will thereafter in step 1256 send the time-out message to the data link stage. The timer manager then exits to generate the next countdown request.

Figure 48:
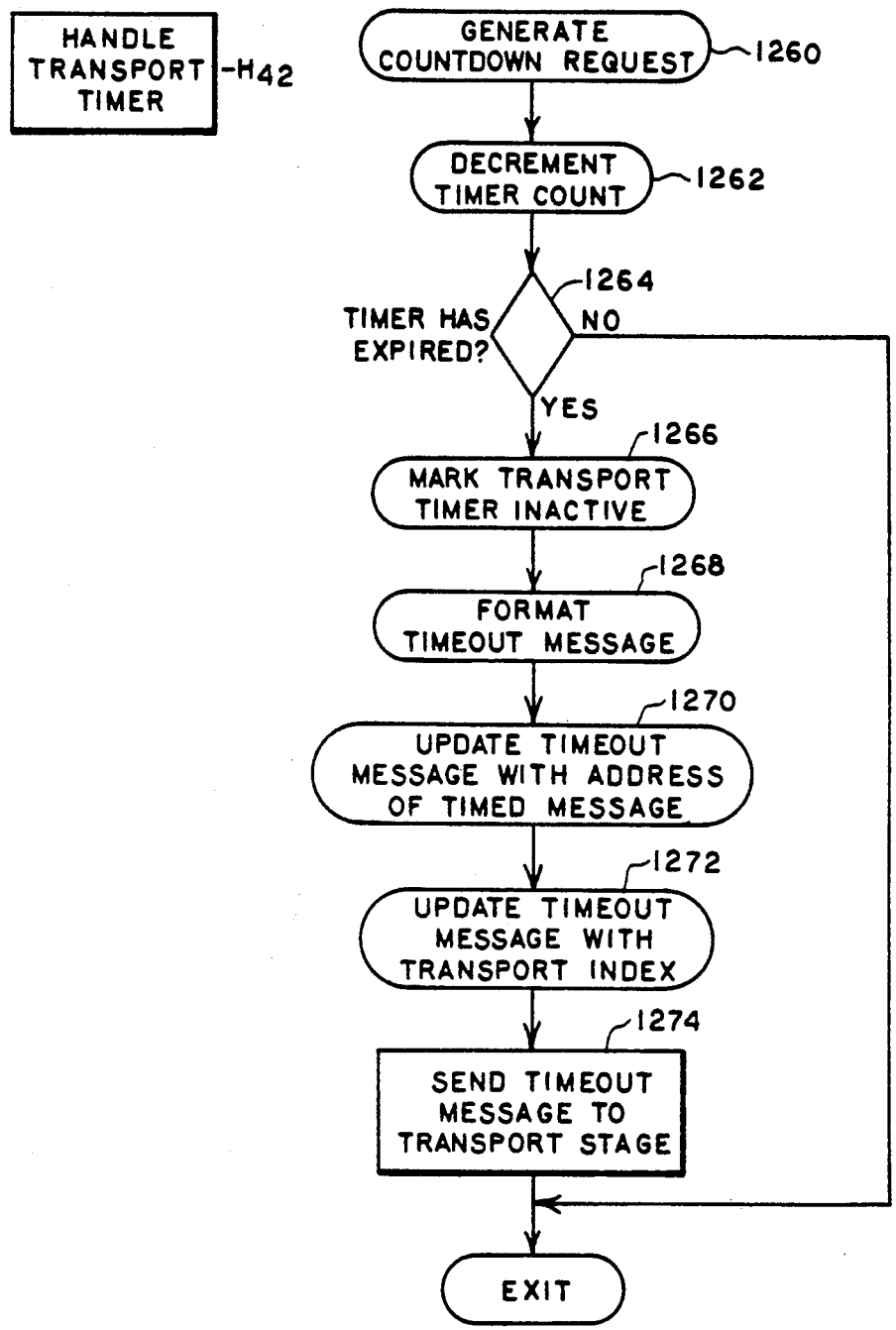
FIG. 48 is a flow diagram illustrating the manner in which the timer manager may be implemented in accordance with the present invention for decrementing a transport timer and responding to an expired transport timer.

Referring now to FIG. 48, it illustrates the manner in which the timer manager is implemented in accordance with this preferred embodiment in handling a transport timer. In step 1260, it generates a countdown request. Then, in step 1262, in response to the generated countdown request, will decrement the transport timer counter. In step 1264, the timer manager then determines if the timer has expired. If the timer has not expired, the timer manager exits. If the timer has expired, it will mark in step 1266 the transport timer entry inactive. It will then, in step 1268, format a time-out message. In step 1270, it includes in the time-out message the buffer pool storage address of the message associated with the timed-out timer, and then in step 1272, includes in the time-out message the transport timer entry index. It then, in step 1274, sends the time-out message to the transport stage. The timer manager then exits to generate the next countdown request.

Figure 49:
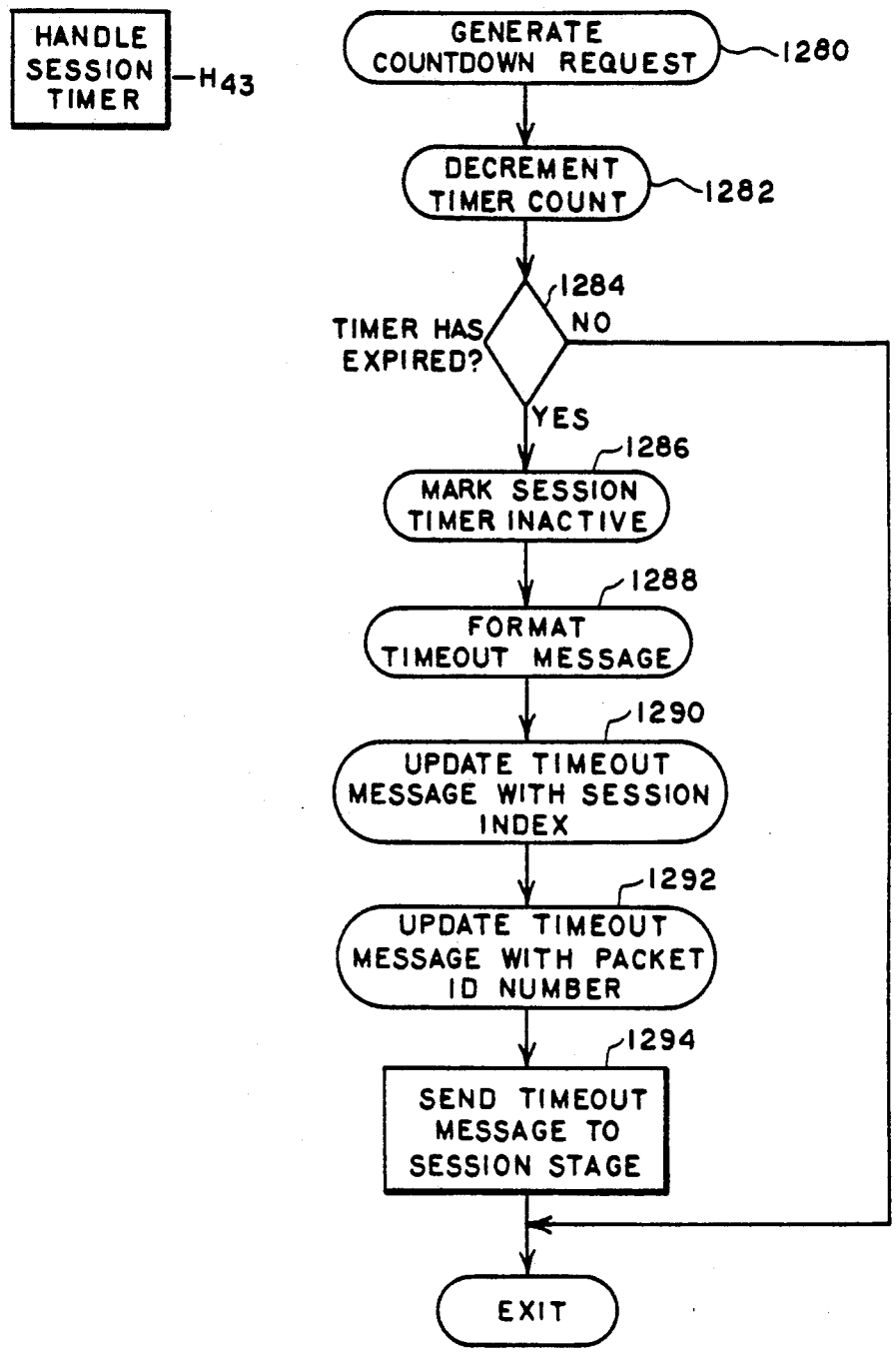
FIG. 49 is a flow diagram illustrating the manner in which the timer manager may be implemented in accordance with the present invention for decrementing a session timer and responding to an expired session timer.

Referring now to FIG. 49, it illustrates the manner in which the timer manager is implemented in accordance with this preferred embodiment for handling a session timer. In step 1280, the timer manager generates a countdown request. In response to the internally generated countdown request, the timer manager, in step 1282, decrements the session timer count. The timer manager then, in step 1284, determines if the timer has expired. If the timer has expired, the timer manager exits. If the timer has not expired, the timer manager then in step 1286 marks in its table that the session table is inactive. It then formats a time-out message in step 1288 and updates the time-out message with the session timer index in step 1290 and the packet identification number in step 1292. It then sends the time-out message to the session stage in step 1294. The timer manager then exits to generate the next session countdown request.

Figure 50:
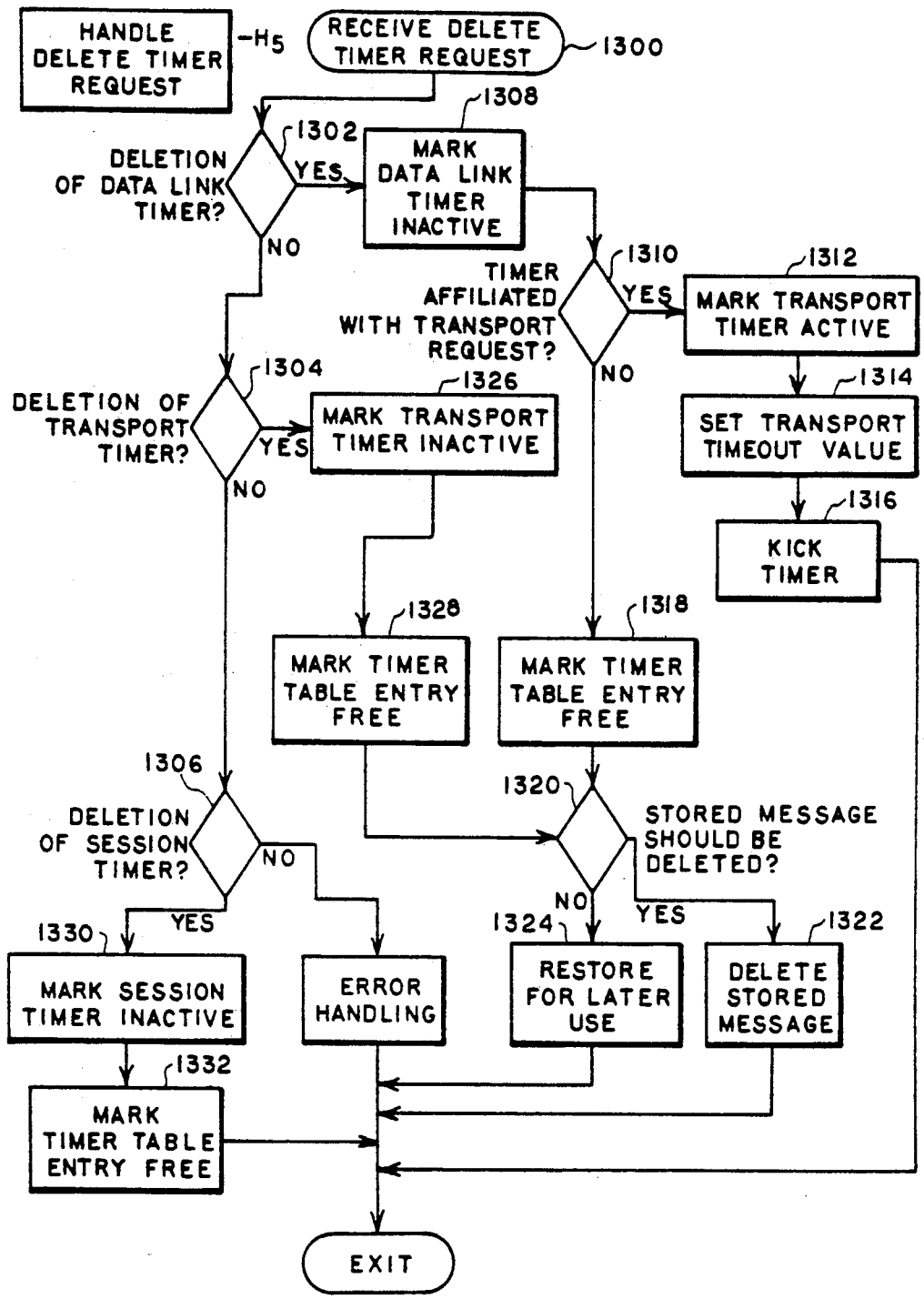
FIG. 50 is a flow diagram illustrating the manner in which the timer manager may be implemented in accordance with the present invention for acting upon a delete timer request.

Referring now to FIG. 50, it illustrates the manner in which the timer manager is implemented in accordance with this preferred embodiment for handling a delete timer request. A delete timer request may be received by the timer manager from the data link stage, the transport stage, or the session stage. These stages make such a request after one of these stages receives an acknowledgement response within the predetermined timer period established by the timer manager within the appropriate table entry after the associated message is placed onto the bus by the transmit/receive module 80.

The timer manager receives the delete timer request at step 1300. The timer manager first determines in step 1302 if the request is for the deletion of a data link timer. If the request is not for the deletion of a data link timer, the timer manager then determines in step 1304 if the request is for the deletion of a transport timer. If the message is not for the deletion of a data link timer or a transport timer, the timer manager then, in step 1306, determines if the request is for the deletion of a session timer. If the request is not for the deletion of a data link timer, a transport timer, or a session timer, the timer manager enters an error handling routine and exits.

If the request was for the deletion of a data link timer, the timer manager then, in step 1308, marks the data link timer inactive in its table entry. The timer manager then determines in step 1310 if this timer is affiliated with a transport request. If it is, it will mark the transport timer active in step 1312. Then, in step 1314, the timer manager enters the predetermined time-out value for the transport timer in its table entry and immediately thereafter on its own, starts the transport timer in step 1316. The timer manager then exits.

If it is determined in step 1310 that the timer is not affiliated with the transport request, the timer manager in step 1318 will mark in its table that the timer table entry is not free. It then proceeds to step 1320 wherein it determines if the message affiliated with the deleted timer should be deleted. If the message is to be deleted, the timer manager, in step 1322, will clear from the buffer pool the stored message and then exit. If the message is not to be cleared, the timer manager in step 1324 will restore the message for later use and then exit.

If it was determined in step 1304 that the request was for the deletion of a transport timer without the deletion of a data link timer, the timer manager then, in step 1326, marks the transport timer entry inactive. It will then in step 1328 mark in its table that this timer entry is now free. It then determines in step 1320 if the message associated with the deleted timer should be cleared from the buffer pool. If it is to be cleared from the buffer pool, the timer manager clears the message from the buffer pool in step 1322. If the message is not to be cleared, but to be used at a later time, the timer manager will then, in step 1324, restore the message for later use and then exit.

If it is determined in step 1306 that the request was for the deletion of a session timer, the timer manager will in step 1330 mark the session timer inactive, and in step 1332, will mark in its table that the timer entry is now free. The timer manager then exits.

As can be seen from the foregoing, if a timer is affiliated with a message for both data link stage and transport stage services, the timer associated with the data link stage will first be started. Once the data link timer is deleted, the timer manager automatically will set the transport timer time-out value in that same timer and then start the timer on its own. In this manner, the data link stage need not be advised about the transport stage timer. Also, as can be seen from the foregoing, a timer deletion is equivalent to a message deletion request. The timer manager maintains information within its dedicated portion of the buffer pool as to whether or not the message should be cleared after its associated timer is deleted.

What is claimed is:

1. In a communications network having a plurality of links, each link being coupled to a plurality of nodes, a network control system for controlling receipt of long and short received messages and transmission of long and short transmitted messages between at least a pair of nodes of said network, wherein said short received and transmitted messages have a length less than a predetermined number of bytes and said long received and transmitted messages have a length greater than said predetermined number of bytes, said network control system being located at least at one of said nodes and comprising:

a connectionless network control portion for controlling the receipt of said short received messages and transmission of said short transmitted messages and including a transport stage for providing confirmation of receipt for said short transmitted messages transmitted from said one node to nodes coupled to another link, a network stage for establishing a routing of said short transmitted messages transmitted from said one node, and a data link stage for providing confirmation of receipt for said short transmitted messages transmitted from said one node to a node coupled to the same link as said one node; and a connection-oriented network control portion coupled to said connectionless network control portion for establishing a connection between said pair of nodes for controlling the receipt of said long received messages and transmission of said long transmitted messages between said pair of nodes.

2. A system as defined in claim 1 wherein said communication network includes intermediary nodes coupling said links together and wherein said network stage is arranged to route said long and short transmitted messages originated at said one node and destined for a local node coupled to the same link as said one node directly to said local node and to route said long and short transmitted messages originated at said one node and destined for a distant node coupled to a link different than said link to which said one node is coupled to one of said intermediary nodes.

3. A system as defined in claim 1 wherein said connection-oriented network control portion is arranged for dividing said long transmitted messages into said short transmitted messages and transmitting said short transmitted messages in series to one of said pair of nodes after establishing said connection with said one of said pair of nodes.

4. A system as defined in claim 3 wherein said connection-oriented network control portion is arranged to terminate said connection established with said one of said pair of nodes after all of said short transmitted messages are received by said one of said pair of nodes.

5. A system as defined in claim 4 wherein said connection-oriented network control portion is associated with storage means and is arranged to receive a long received message and wherein said connection-oriented network control portion is arranged to acquire storage space within said storage means sufficient to store said long received message prior to establishing a connection with said one of said pair of nodes.

6. A system as defined in claim 5 wherein said connection-oriented network control portion is arranged to store said short received messages in said storage means upon receipt of said series of short received messages.

7. A system as defined in claim 6 wherein said connection-oriented network control portion is arranged for reassembling said short received messages stored in said storage means into said long received message.

8. A system as defined in claim 7 wherein said connection-oriented network control portion is arranged for providing an acknowledgement message after receipt of said long received message.

9. A network control system as defined in claim 1 wherein said communication network includes more than two of said nodes, and wherein said connectionless network control portion includes routing means for relaying a message received from one of said nodes to another one of said nodes.

10. A system as defined in claim 1 wherein said connectionless network control portion includes confirmation means for confirming receipt of messages between said one node and any one of said other nodes.

11. A system as defined in claim 10 wherein said confirmation means includes means for generating an acknowledgement message to confirm the receipt of a message received at said one node from one of said other nodes.

12. A system as defined in claim 1 wherein said nodes of said network are arranged to acknowledge receipt of received messages and wherein said connectionless network control portion is arranged to retransmit a message a given number of times in the absence of an acknowledgement thereto.

13. A system as defined in claim 1 wherein said network is arranged for synchronos transmission of said long and short transmitted messages and reception of said long and short received messages between said nodes and wherein said connectionless network control portion includes reset means for resynchronizing said one node with any one of said other nodes when said one node is not in synchronism with any one of said other nodes.

14. A system as defined in claim 13 wherein said reset means includes means for originating reset messages to be received by said any one of said other nodes which is not synchronized with said one node.

15. A system as define din claim 14 wherein said nodes of said network are arranged to acknowledge receipt of received messages, wherein said connectionless network control portion is arranged for retransmitting a message a given number of times in the absence of an acknowledgement thereto, and wherein said reset means originate said reset message after a message has been retransmitted said given number of times.

16. A system as defined in claim 1 wherein said nodes are coupled to a bi-directional bus and wherein said connectionless network control portion includes suspend means responsive to a suspend request message for suspending said one node to preclude said one node from transmitting messages onto said bus.

17. A system as defined in claim 16 wherein said connectionless network control portion further includes restart means responsive to a restart request for conditioning said one node to resume the transmission of messages onto said bus.

18. A communications network for receiving and transmitting long and short messages comprising:
   a bi-directional bus;
   a plurality of nodes coupled together over said bi-directional bus, each said node including a network control means for controlling the receipt of received long and short messages and the transmission of transmitted long and short messages at its corresponding node, wherein said received and transmitted short messages have a length less than a predetermined number of bytes and said received and transmitted long messages have a length greater than said predetermined number of bytes, each said network control means including:
   a connectionless network control portion for controlling the receipt of said received short messages received over said bus at its corresponding node and the transmission of said transmitted short messages transmitted onto said bus from its corresponding node, and
   a connection-oriented network control portion coupled to said connectionless network control portion for establishing a connection with another one of said nodes for controlling the receipt of a received long message received at its corresponding node and transmitted by said another one of said nodes over said bus and for controlling the transmission of a transmitted long message transmitted from its corresponding node to said another one of said nodes over said bus.

19. A network as defined in claim 18 wherein said connection-oriented network control portion of each said network control means is arranged for dividing a first long message into first short messages and transmitting said first short messages in series to said another one of said nodes after establishing said connection with said another one of said nodes.

20. A network as defined in claim 19 wherein each said connection-oriented network control portion is arranged to terminate said connection established with said another one of said nodes after all of said first short messages are received by said another one of said nodes.

21. A network as defined in claim 19 wherein each said connection-oriented network control portion is associated with storage means and wherein each said connection-oriented network control portion is arranged to acquire storage space within its associated said storage means sufficient to store said first long message prior to establishing a connection with said another one of said nodes.

22. A network as defined in claim 21 wherein each said connection-oriented network control portion is arranged to store said first short messages in its associated said storage means upon receipt of said series of short messages.

23. A network as defined in claim 22 wherein each said connection-oriented network control portion is arranged for reassembling said first short messages stored in said storage means into said first long message.

24. A network as defined in claim 18 wherein each said connectionless network control portion includes routing means for relaying a said short message received from another one of said nodes to still another one of said nodes.

25. A network as defined in claim 18 wherein each said connectionless network control portion includes confirmation means for confirming receipt of received short messages.

26. A network as defined in claim 25 wherein each said confirmation means includes means for generating an acknowledgement message to confirm the receipt of a said received short message.

27. A network as defined in claim 26 wherein each said connectionless network control portion is arranged to retransmit a said transmitted short message a given number of times in the absence of an acknowledgement thereto.

28. A network as defined in claim 26 wherein said network is arranged for synchronous transmission and reception of messages between said nodes and wherein each said connectionless network control portion includes reset means for resynchronizing its corresponding node with any one of said other nodes when its corresponding node is not in synchronism with said any one of said other nodes.

29. A network as defined in claim 28 wherein each said reset means includes means for originating reset messages to be received by said any one of said other nodes which is not synchronized with its corresponding node.

30. A network as defined in claim 18 wherein each said connectionless network control portion includes suspend means responsive to a suspend request message for suspending its corresponding node to preclude its corresponding node from transmitting messages onto said bus.

31. A network as defined in claim 30 wherein each said connectionless network control portion further includes restart means responsive to a restart request for conditioning its corresponding node to resume the transmission of messages onto said bus.

* * * * *